United States Patent
Kwon et al.

(10) Patent No.: US 9,948,417 B2
(45) Date of Patent: Apr. 17, 2018

(54) BROADCAST TRANSMISSION DEVICE, METHOD BY WHICH BROADCAST TRANSMISSION DEVICE PROCESSES DATA, BROADCAST RECEPTION DEVICE AND METHOD BY WHICH BROADCAST RECEPTION DEVICE PROCESSES DATA

(71) Applicant: LG ELECTRONICS INC., Seoul (KR)

(72) Inventors: Woosuk Kwon, Seoul (KR); Minsung Kwak, Seoul (KR); Sejin Oh, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/326,241

(22) PCT Filed: Jul. 17, 2015

(86) PCT No.: PCT/KR2015/007469
§ 371 (c)(1),
(2) Date: Jan. 13, 2017

(87) PCT Pub. No.: WO2016/010404
PCT Pub. Date: Jan. 21, 2016

(65) Prior Publication Data
US 2017/0207867 A1 Jul. 20, 2017

Related U.S. Application Data

(60) Provisional application No. 62/026,000, filed on Jul. 17, 2014.

(51) Int. Cl.
*H04N 7/10* (2006.01)
*H04H 20/59* (2008.01)
*H04N 21/81* (2011.01)

(52) U.S. Cl.
CPC .......... *H04H 20/59* (2013.01); *H04N 21/814* (2013.01)

(58) Field of Classification Search
CPC ........................... H04H 20/59; H04N 21/814
See application file for complete search history.

(56) References Cited

U.S. PATENT DOCUMENTS

2009/0268700 A1* 10/2009 Son .................... H04W 4/22
370/336
2010/0124898 A1  5/2010 Qu et al.
(Continued)

FOREIGN PATENT DOCUMENTS

KR   10-2009-0113165 A   10/2009
KR   10-2010-0073515 A    7/2010
(Continued)

*Primary Examiner* — John R Schnurr
(74) *Attorney, Agent, or Firm* — Birch, Stewart, Kolasch & Birch, LLP

(57) ABSTRACT

A broadcast transmission device and a method by which the broadcast transmission device processes data are disclosed. The method by which the broadcast transmission device processes data, according to one embodiment of the present invention, comprises the steps of: encapsulating emergency alert information as a link layer packet; error-correction-encoding data of the link layer packet in a physical layer; building a signal frame including the error-correction-encoded data; and transmitting a broadcast signal including the built signal frame, wherein the link layer packet includes a header and a payload, the header includes header information for signaling the payload, the payload includes the emergency alert information, and the header information includes indication information indicating that the link layer packet is a packet for an emergency alert and type information indicating the type of emergency alert information.

16 Claims, 47 Drawing Sheets

(56) References Cited

U.S. PATENT DOCUMENTS

| | | |
|---|---|---|
| 2010/0330951 A1 | 12/2010 | Chen et al. |
| 2011/0044401 A1 | 2/2011 | Ko et al. |
| 2012/0327879 A1 | 12/2012 | Stadelmeier et al. |
| 2013/0219431 A1* | 8/2013 | Hong ............... H04H 20/42 725/54 |
| 2015/0095943 A1* | 4/2015 | Lee ................. H04N 21/814 725/33 |
| 2016/0192033 A1* | 6/2016 | Kitahara ......... H04N 21/41415 725/33 |
| 2016/0219331 A1* | 7/2016 | Stewart ............. H04H 20/42 |
| 2016/0255416 A1* | 9/2016 | Yoshimochi ....... H04H 20/59 725/33 |
| 2017/0201337 A1* | 7/2017 | Michael ............. H04H 20/59 |

FOREIGN PATENT DOCUMENTS

| | | |
|---|---|---|
| KR | 10-2011-0124231 A | 11/2011 |
| KR | 10-2013-0117778 A | 10/2013 |

* cited by examiner

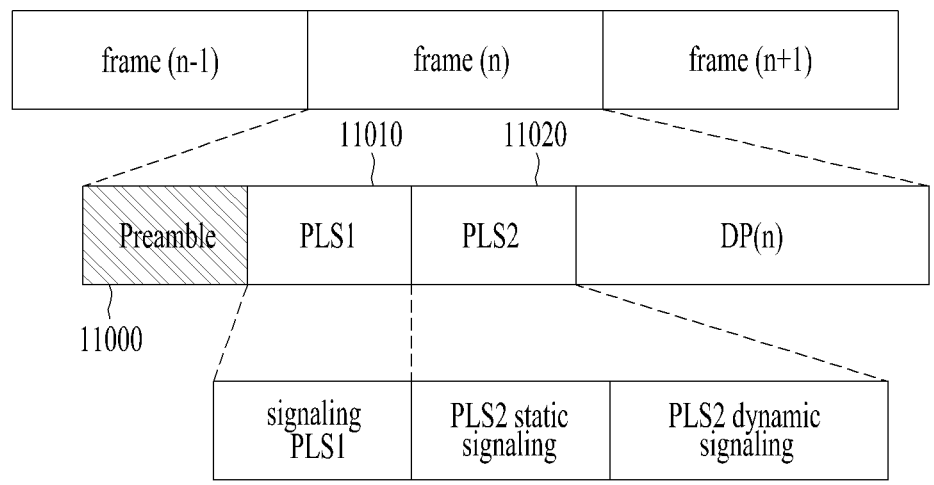

FIG. 12

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 13

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1: NUM_DP | | |
| | DP_ID | 6 |
| | DP_START | 15 (or 13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG == 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |

FIG. 25

| Syntax | No. Bits | Format |
|---|---|---|
| EAT_Information ( ) { | | |
|     EAT_protocol_version | var | uimsbf |
|     automatic_tuning_flag | var | bslbf |
|     num_EAS_messages | var | uimsbf |
| } | | |

FIG. 26

| Syntax | No. Bits | Format |
|---|---|---|
| Emergency_Alert_Message ( ) { | | |
|     EAS_message_id | 32 | uimsbf |
|     EAS_IP_version_flag | 1 | bslbf |
|     EAS_message_transfer_type | 3 | uimsbf |
|     EAS_message_encoding_type | 3 | uimsbf |
|     EAS_NRT_flag | 1 | bslbf |
|     if(EAS_message_transfer_type == 0x02) { | | |
|         reserved | 4 | '1111' |
|         EAS_message_length /* N */ | 12 | uimsbf |
|         EAS_message_bytes( ) | 8*N | var |
|     } | | |
|     else if (EAS_message_transfer_type == 0x03) { | | |
|         IP_address | 32 or 128 | uimsbf |
|         UDP_port_num | 16 | uimsbf |
|         DP_id | 8 | uimsbf |
|     } | | |
| } | | |

FIG. 27

| Syntax | No. Bits | Format |
|---|---|---|
| Automatic_Tuning_Info ( ) { | | |
|     automatic_tuning_channel_number | 8 | uimsbf |
|     automatic_tuning_DP_id | 8 | uimsbf |
|     automatic_tuning_service_id | 16 | uimsbf |
| } | | |

FIG. 28

| Syntax | No. Bits | Format |
|---|---|---|
| NRT_Service_Info () { | | |
|     EAS_NRT_service_id | 16 | uimsbf |
| } | | |

FIG. 29

| Syntax | No. Bits | Format |
|---|---|---|
| Emergency_Alert_Table ( ) { | | |
|     table_id | 8 | uimsbf |
|     section_syntax_indicator | 1 | '0' |
|     private_indicator | 1 | '1' |
|     reserved | 2 | '11' |
|     section_length | 12 | uimsbf |
|     table_id_extension { | | |
|         EAT_protocol_version | 8 | 0x0 |
|         reserved | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     automatic_tuning_flag | 1 | bslbf |
|     num_EAS_messages | 7 | uimsbf |
|     If (automatic_tuning_flag == '1') { | | |
|         Automatic_Tuning_Info () | var | var |
|     } | | |
|     for (m=0; m< num_EAS_messages; m++) { | | |
|         Emergency_Alert_Message () | var | var |
|         if(EAS_NRT_flag == '1') | | |
|             NRT_Service_Info () | var | var |
|     } | | |
| } | | |

FIG. 30

| Syntax | No. Bits | Format |
|---|---|---|
| Emergency_Alert_Table () { | | |
|     table_id | 8 | uimsbf |
|     section_syntax_indicator | 1 | '0' |
|     private_indicator | 1 | '1' |
|     reserved | 2 | '11' |
|     section_length | 12 | uimsbf |
|     table_id_extension { | | |
|         EAT_protocol_version | 8 | 0x0 |
|         reserved | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     automatic_tuning_flag | 1 | bslbf |
|     num_EAS_messages | 7 | uimsbf |
|     If (automatic_tuning_flag == '1') { | | |
|         automatic_tuning_channel_number | 8 | uimsbf |
|         automatic_tuning_DP_id | 8 | uimsbf |
|         automatic_tuning_service_id | 16 | uimsbf |
|     } | | |
|     for (m=0; m< num_EAS_messages; m++) { | | |
|         EAS_message_id | 32 | uimsbf |
|         EAS_IP_version_flag | 1 | bslbf |
|         EAS_message_transfer_type | 3 | uimsbf |
|         EAS_message_encoding_type | 3 | uimsbf |
|         EAS_NRT_flag | 1 | bslbf |
|         if(EAS_message_transfer_type == 0x02) { | | |
|             reserved | 4 | '1111' |
|             EAS_message_length /* N */ | 12 | uimsbf |
|             EAS_message_bytes() | 8*N | var |
|         } | | |
|         else if (EAS_message_transfer_type == 0x03) { | | |
|             IP_address | 32 or 128 | uimsbf |
|             UDP_port_num | 16 | uimsbf |
|             DP_id | 8 | uimsbf |
|         } | | |
|         if(EAS_NRT_flag == '1') { | | |
|             EAS_NRT_service_id | 16 | uimsbf |
|         } | | |
|     } | | |
| } | | |

FIG. 37

| Syntax | No. Bits | Format |
|---|---|---|
| Fast_Information_Chunk( ){ | | |
|     FIT_data_version | 8 | uimsbf |
|     num_broadcast | 8 | uimsbf |
|     emergency_alert_flag | 1 | bslbf |
|     reserved | 7 | bslbf |
|     If (emergency_alert_flag == '1') { | | |
|         automatic_tuning_flag | 1 | bslbf |
|         num_EAS_messages | 7 | uimsbf |
|         If (automatic_tuning_flag == '1') { | | |
|             Automatic_Tuning_Info ( ) | var | var |
|         } | | |
|         for (m=0; m< num_EAS_messages; m++) { | | |
|             Emergency_Alert_Message ( ) | var | var |
|             NRT_Service_Info ( ) | var | var |
|         } | | |
|     } | | |
|     for(i=0;i<num_broadcast;i++){ | | |
|         broadcast_id | 16 | uimsbf |
|         delivery_system_id | 16 | uimsbf |
|         base_DP_id | 8 | uimsbf |
|         base_DP_version | 5 | uimsbf |
|         reserved | 3 | '111' |
|         num_service | 8 | uimsbf |
|         for(j=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             num_component | 8 | uimsbf |
|             for(k=0;k<num_component;k++){ | | |
|                 component_id | 8 | bslbf |
|                 DP_id | 8 | bslbf |
|                 RoHC_init_descriptor( ) | var | |
|             } | | |
|         } | | |
|     } | | |
| } | | |

FIG. 39

| Syntax | No. Bits | Format |
|---|---|---|
| Fast_Information_Chunk( ){ | | |
|     FIT_data_version | 8 | uimsbf |
|     num_broadcast | 8 | uimsbf |
|     emergency_alert_flag | 1 | bslbf |
|     reserved | 7 | bslbf |
|     If (emergency_alert_flag == '1') { | | |
|         automatic_tuning_flag | 1 | bslbf |
|         num_EAS_messages | 7 | uimsbf |
|         If (automatic_tuning_flag == '1') { | | |
|             Automatic_Tuning_Info ( ) | var | var |
|         } | | |
|         for (m=0; m< num_EAS_messages; m++) { | | |
|             EAS_message_id | 32 | uimsbf |
|             EAS_DP_id | 8 | bslbf |
|         } | | |
|     } | | |
|     for(i=0;i<num_broadcast;i++){ | | |
|         broadcast_id | 16 | uimsbf |
|         delivery_system_id | 16 | uimsbf |
|         base_DP_id | 8 | uimsbf |
|         base_DP_version | 5 | uimsbf |
|         reserved | 3 | '111' |
|         num_service | 8 | uimsbf |
|         for(j=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             num_component | 8 | uimsbf |
|             for(k=0;k<num_component;k++){ | | |
|                 component_id | 8 | bslbf |
|                 DP_id | 8 | bslbf |
|                 RoHC_init_descriptor( ) | var | |
|             } | | |
|         } | | |
|     } | | |
| } | | |

FIG. 44

| Syntax | No. Bits | Format |
|---|---|---|
| Link_Layer_Packet_Header( ) { | | |
|     Packet_Type | 3 | '110' |
|     Payload_Config | 1 | bslbf |
|     if (Payload_Config =="0") { | | |
|         Count | 4 | uimsbf |
|         Signaling_Class | 3 | bslbf |
|         Information_Type | 3 | bslbf |
|         Signaling_Format | 2 | bslbf |
|         if (Signaling_Format =="1x") { | | |
|             for(i=0; i<Count; i++) { | | |
|                 Length | 16 | uimsbf |
|             } | | |
|         } | | |
|     } | | |
|     else { | | |
|         Last_Segment_Indicator | 1 | bslbf |
|         Segment_ID | 3 | uimsbf |
|         Segment_Sequence_Number | 4 | uimsbf |
|         if (Last_Segment_Indicator =="0") { | | |
|             Segment_Length_ID | 4 | bslbf |
|             if (Segment_Sequence_Number =="0000") { | | |
|                 Signaling_Class | 3 | bslbf |
|                 Information_Type | 3 | bslbf |
|                 Signaling_Format | 2 | bslbf |
|             } | | |
|         } | | |
|         else { | | |
|             Last_Segment_Length | 12 | uimsbf |
|         } | | |
|     } | | |
| } | | |

FIG. 45

| Signaling Class | Description |
|---|---|
| 000 | Signaling for Channel Scan and Service Acquisition |
| 001 | Signaling for Emergency Alert |
| 010 | Signaling for Header Compression |
| 011 | Reserved |
| 100 | Reserved |
| 101 | Reserved |
| 110 | Reserved |
| 111 | Various |

FIG. 46

| Information Type for Emergency Alert | Description |
|---|---|
| 000 | Emergency Alert Message |
| 001 | Link of Emergency Alert Message |
| 010 | Automatic Tuning Information |
| 011 | NRT Service Information |
| 100 | Reserved |
| 101 | Reserved |
| 110 | Reserved |
| 111 | Wake up indication |

FIG. 47

| Syntax | No. Bits | Format |
|---|---|---|
| Payload_for_Emergency_Alert_Message ( ) { | | |
|     EAS_message_id | 32 | uimsbf |
|     EAS_message_encoding_type | 4 | uimsbf |
|     EAS_message_version | 4 | uimsbf |
|     EAS_message_protocol | 4 | uimsbf |
|     EAS_message_length | 12 | uimsbf |
|     EAS_message_bytes() | 8*N | var |
| } | | |

FIG. 49

| Syntax | No. Bits | Format |
|---|---|---|
| Payload_for_Emergency_Alert_Message () { | | |
|     EAS_message_id | 32 | uimsbf |
|     EAS_message_encoding_type | 4 | uimsbf |
|     EAS_message_version | 4 | uimsbf |
|     EAS_message_protocol | 4 | uimsbf |
|     message_link_type | 4 | uimsbf |
|     if (message_link_type =="0000") { | | |
|         IP_address | 32 or 128 | uimsbf |
|         UDP_port_num | 16 | uimsbf |
|         DP_id | 8 | uimsbf |
|     } | | |
|     else if (message_link_type =="0001") { | | |
|         EAS_channel_number | 8 | uimsbf |
|         EAS_DP_id | 8 | uimsbf |
|         EAS_service_id | 16 | uimsbf |
|     } | | |
|     else if (message_link_type =="0010") { | | |
|         broadband_link_info() | var | uimsbf |
|     } | | |
|     else if (message_link_type =="0011") { | | |
|         external_network_information () | var | uimsbf |
|     } | | |
|     reserved | 4 | bslbf |
| } | | |

FIG. 51

| Syntax | No. Bits | Format |
|---|---|---|
| Payload_for_Automatic_Tuning ( ) { | | |
|     num_associated_EAS_messages | 8 | uimsbf |
|     for(i=0; i< num_associated_EAS_messages; i++) { | | |
|         associated_EAS_message_id | 32 | uimsbf |
|     } | | |
|     automatic_tuning_channel_number | 8 | uimsbf |
|     automatic_tuning_DP_id | 8 | uimsbf |
|     automatic_tuning_service_id | 16 | uimsbf |
| } | | |

| Syntax | No. Bits | Format |
|---|---|---|
| Payload_for_NRT_Service_Info ( ) { | | |
|     num_associated_EAS_messages | 8 | uimsbf |
|     for(i=0; i< num_associated_EAS_messages; i++) { | | |
|         associated_EAS_message_id | 32 | uimsbf |
|     } | | |
|     EAS_NRT_service_id | 16 | uimsbf |
| } | | |

BROADCAST TRANSMISSION DEVICE, METHOD BY WHICH BROADCAST TRANSMISSION DEVICE PROCESSES DATA, BROADCAST RECEPTION DEVICE AND METHOD BY WHICH BROADCAST RECEPTION DEVICE PROCESSES DATA

CROSS REFERENCE TO RELATED APPLICATIONS

This application is the National Phase of PCT International Application No. PCT/KR2015/007469, filed on Jul. 17, 2015, which claims priority under 35 U.S.C. 119(e) to U.S. Provisional Application No. 62/026,000, filed on Jul. 17, 2014, all of which are hereby expressly incorporated by reference into the present application.

TECHNICAL FIELD

The present disclosure relates to a broadcast transmission apparatus and a data processing method thereof, and a broadcast reception apparatus and a data processing method thereof, more particularly, to broadcast signal transmission/reception apparatuses and methods for processing emergency alert information.

BACKGROUND ART

The transmission of emergency alert information in a broadcast system serves to notify an emergency situation to users viewing broadcasts to take an immediate action. Especially, in broadcasting environments in North America, the delivery of emergency notification information like disaster is specified by Federal Emergency Management Agency (FEMA) and Federal Communications Commission (FCC). Accordingly, the next broadcast system needs to support the transmission of emergency alert information.

The emergency alert information of existing broadcast systems is mainly configured in a common alerting protocol (CAP) message format and the CAP suggests how to express a message format but a method of transmitting this depends on transport protocol. Accordingly, in order to deliver emergency alert information, the characteristics of a transmission system should be reflected and emergency alert information delivering method using the CAP and a transport protocol are required.

DISCLOSURE

Technical Problem

Embodiments provide a broadcast transmission apparatus and an operating method thereof, and a broadcast reception apparatus and an operating method thereof, which configure a signaling system for transmitting emergency alert information and apply this to a transport protocol.

Embodiments also provide a broadcast transmission apparatus and an operating method thereof, and a broadcast reception apparatus and an operating method thereof, which configure a signaling system for delivering emergency alert information.

Embodiments also provide a broadcast transmission apparatus and an operating method thereof, and a broadcast reception apparatus and an operating method thereof, which configure a section table for delivering emergency alert information.

Embodiments also provide a broadcast transmission apparatus and an operating method thereof, and a broadcast reception apparatus and an operating method thereof, which transmit/receive emergency alert information through a specific physical layer pipe in a physical layer.

Embodiments also provide a broadcast transmission apparatus and an operating method thereof, and a broadcast reception apparatus and an operating method thereof, which configure a link layer packet for delivering emergency alert information and transmit/receive the link layer packet.

Technical Solution

A method of processing data in a broadcast transmitting apparatus according to an embodiment of the present invention may include encapsulating emergency alert information to a link layer packet, performing error correction encoding on data of the link layer packet in a physical layer, building a signal frame that includes the error correction encoded data, and transmitting a broadcast signal that includes the built signal frame. Herein the link layer packet includes a header and a payload, the header includes header information for signaling the payload, the payload includes the emergency alert information, and the header information includes indication information indicating that the link layer packet is for emergency alert and type information indicating a type of the emergency alert information.

The header may include a first header having a fixed length and a second header having a variable length, and at least one of the indication information and the type information may be signaled to the second header.

According to an embodiment of the present invention, at least one of an emergency alert message that includes an emergency alert content, link information of the emergency alert message, emergency alert related automatic channel tuning information, emergency alert related non-real time service information, and wake-up indication information in accordance with the type information may be included in the payload of the link layer packet as the emergency alert information.

When the emergency alert message is included in the payload of the link layer packet, the payload of the link layer packet may further include at least one of message identification information of the emergency alert message, encoding type information of the emergency alert message, version information of the emergency alert message, and protocol information of the emergency alert message.

When the link information of the emergency alert message is included in the payload of the link layer packet, the link information may include link type information indicating a link type of the emergency alert message and access information of the emergency alert message according to the link type.

According to an embodiment of the present invention, the link information further includes at least one of message identification information of the emergency alert message, encoding type information of the emergency alert message, version information of the emergency alert message, and protocol information of the emergency alert message.

When the emergency alert related automatic channel tuning information is included in the payload of the link layer packet, the automatic channel tuning information may include channel information which will be tuned automatically, identification information of a data pipe that transmits emergency alert related contents, and identification information of a service that includes the contents.

According to an embodiment of the present invention, the automatic channel tuning information further includes message identification information for identifying each of the emergency alert related emergency alert messages.

When the emergency alert information is input by being segmented to a plurality of segments, the header further may include at least one of identification information of each segment, order information of each segment and length information of each segment.

A broadcast transmitting apparatus according to an embodiment of the present invention may include a link layer processor encapsulating emergency alert information to a link layer packet, an encoding module performing error correction encoding on data of the link layer packet in a physical layer, a frame builder building a signal frame that includes the error correction encoded data, and a transmitting module transmitting a broadcast signal that includes the built signal frame. Herein the link layer packet includes a header and a payload, the header includes header information for signaling the payload, the payload includes the emergency alert information, and the header information includes indication information indicating that the link layer packet is for emergency alert and type information indicating a type of the emergency alert information.

Advantageous Effects

According to an embodiment of the present invention, provided are a broadcast transmission apparatus and an operating method thereof, and a broadcast reception apparatus and an operating method thereof, which configure a signaling system for transmitting emergency alert information and apply this to a transport protocol.

According to an embodiment of the present invention, provided are a broadcast transmission apparatus and an operating method thereof, and a broadcast reception apparatus and an operating method thereof, which configure a signaling system for delivering emergency alert information.

According to an embodiment of the present invention, provided are a broadcast transmission apparatus and an operating method thereof, and a broadcast reception apparatus and an operating method thereof, which configure a section table for delivering emergency alert information.

According to an embodiment of the present invention, provided are a broadcast transmission apparatus and an operating method thereof, and a broadcast reception apparatus and an operating method thereof, which configure a packet for delivering emergency alert information and receive it.

According to an embodiment of the present invention, provided are a broadcast transmission apparatus and an operating method thereof, and a broadcast reception apparatus and an operating method thereof, which transmit/receive emergency alert information through a specific physical layer pipe in a physical layer.

According to an embodiment of the present invention, provided are a broadcast transmission apparatus and an operating method thereof, and a broadcast reception apparatus and an operating method thereof, which configure a link layer packet for delivering emergency alert information, transmit the link layer packet and receive the link layer packet.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a diagram illustrating a signaling hierarchy structure of a frame according to an embodiment of the present invention, FIG. 11 is a table illustrating preamble signaling data according to an embodiment of the present invention, FIG. 12 is a table illustrating PLS1 data according to an embodiment of the present invention, FIG. 13 is a table illustrating PLS2 data according to an embodiment of the present invention, FIG. 18(a) and FIG. 8(b) are diagrams illustrating a fast information channel (FIC) mapping according to an embodiment of the present invention.

FIG. 25 is a diagram illustrating a syntax for an Emergency Alert Table (EAT) information according to an embodiment of the present invention, FIG. 26 is a diagram illustrating a syntax for an emergency alert message according to an embodiment of the present invention, FIG. 27 is a diagram illustrating a syntax for automatic channel tuning information according to an embodiment of the present invention, FIG. 28 is a diagram illustrating a syntax for NRT service information related to an emergency alert message according to an embodiment of the present invention, FIG. 29 is a diagram illustrating a syntax of an EAT of a section format for transmitting an emergency alert message according to an embodiment of the present invention, FIG. 30 is a diagram illustrating a syntax of a section table for transmitting an emergency alert message according to another embodiment of the present invention, FIG. 37 is a diagram illustrating a syntax for transmitting an emergency alert message through a fast information channel (FIC) of signaling channels according to an embodiment of the present invention, FIG. 39 is a diagram illustrating a syntax for signaling an emergency alert transmitted through a signaling channel according to an embodiment of the present invention, FIG. 44 is a diagram illustrating a syntax for a link layer packet header of a link layer packet according to an embodiment of the present invention, FIG. 45 illustrates an example of a type of signaling information defined depending on a value of a signaling_class field according to the present invention.

FIG. 46 illustrates an example of meanings defined depending on a value of an information_type field of an emergency alert packet according to the present invention, FIG. 47 illustrates a syntax of a link layer packet payload of a link layer packet according to an embodiment of the present invention, FIG. 49 illustrates a syntax of a link layer packet payload of a link layer packet according to another embodiment of the present invention, FIG. 51 illustrates a syntax of a link layer packet payload of a link layer packet according to another embodiment of the present invention.

BEST MODE

Figure 1:
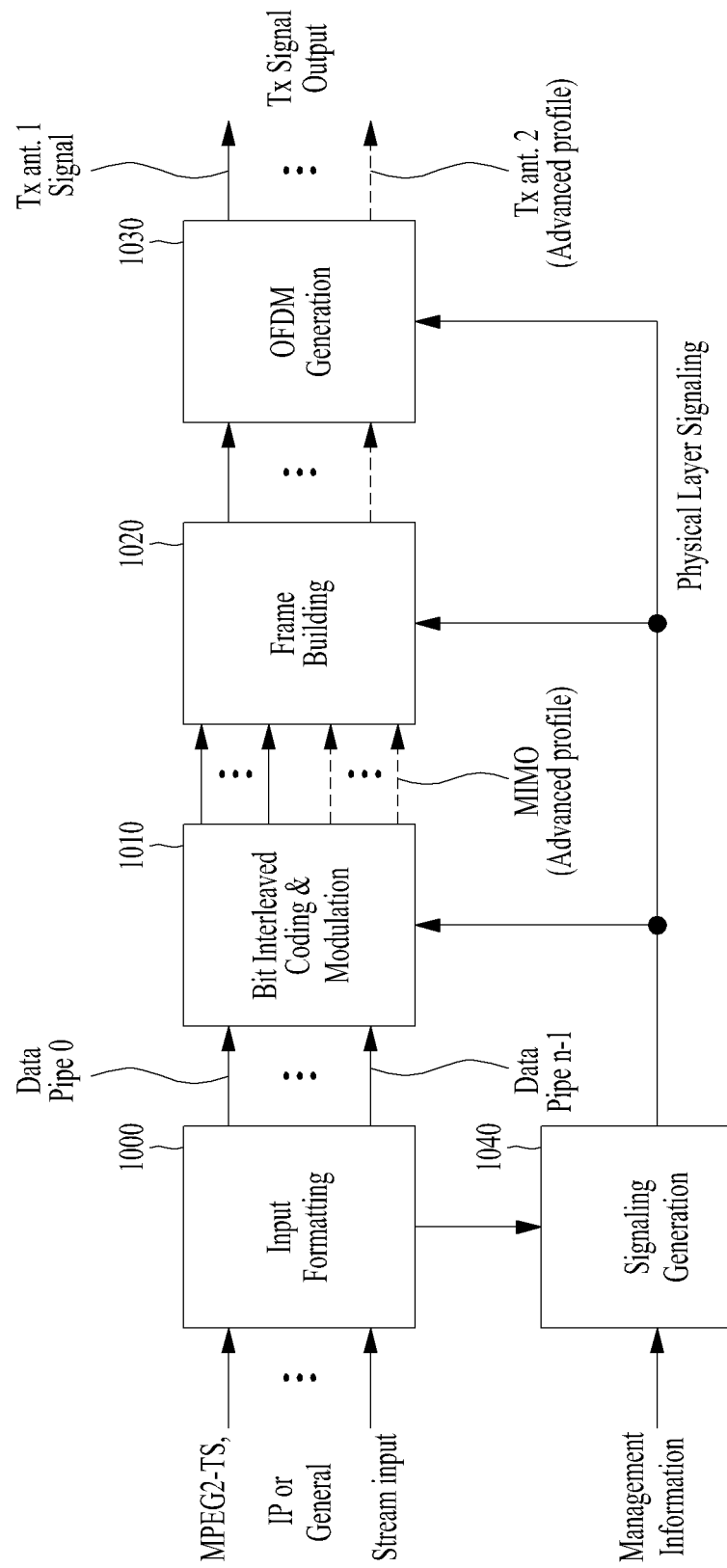
FIG. 1 is a block diagram illustrating a configuration of a broadcast signal transmission apparatus for future broadcast services according to an embodiment of the present invention.

Hereinafter, preferred exemplary embodiments of the present invention that can best carry out the above-described objects of the preset invention will be described in detail with reference to the accompanying drawings. At this point, the structure or configuration and operations of the present invention, which are illustrated in the drawings and described with respect to the drawings, will be provided in accordance with at least one exemplary embodiment of the present invention. And, it will be apparent that the technical scope and spirit of the present invention and the essential structure and operations of the present invention will not be limited only to the exemplary embodiments set forth herein.

In addition, although the terms used in the present invention are selected from generally known and used terms, the terms used herein may be varied or modified in accordance with the intentions or practice of anyone skilled in the art, or along with the advent of a new technology. Alternatively, in some particular cases, some of the terms mentioned in the description of the present invention may be selected by the applicant at his or her discretion, the detailed meanings of which are described in relevant parts of the description herein. Furthermore, it is required that the present invention is understood, not simply by the actual terms used but by the meaning of each term lying within.

Specific structural and functional description of the present invention respective to the exemplary embodiments, which are provided in accordance with the concept of the present invention disclosed in the description of the present invention, is merely an exemplary description provided for the purpose of describing the exemplary embodiments according to the concept of the present invention. And, therefore, the exemplary embodiment of the present invention may be realized in diverse forms and structures, and, it should be understood that the present invention is not to be interpreted as being limited only to the exemplary embodiments of the present invention, which are described herein.

Since diverse variations and modifications may be applied to the exemplary embodiments according to the concept of the present invention, and, since the exemplary embodiments of the present invention may be configured in diverse forms, specific embodiment of the present invention will hereinafter be described in detail with reference to the examples presented in the accompanying drawings. However, it should be understood that the exemplary embodiments respective to the concept of the present invention will not be limited only to the specific structures disclosed herein. And, therefore, it should be understood that all variations and modifications, equivalents, and replacements, which are included in the technical scope and spirit of the present invention, are included.

Additionally, in the description of the present invention, although terms such as first and/or second may be used to describe diverse elements of the present invention, it should be understood that the elements included in the present invention will not be limited only to the terms used herein. The above-mentioned terms will only be used for the purpose of differentiating one element from another element, for example, without deviating from the scope of the present invention, a first element may be referred to as a second element, and, similarly, a second element may also be referred to as a first element.

Moreover, throughout the entire description of the present invention, when one part is said to "include (or comprise)" an element, unless specifically mentioned otherwise, instead of excluding any other element, this may signify that the one part may further include other elements. Furthermore, the term "unit (or part)", which is mentioned in the description of the present invention, refers to a unit for processing at least one function or operation, and this may be realized in the form of hardware, software, or in a combination of both hardware and software.

The term "signaling" in the present invention may indicate that service information (SI) that is transmitted and received from a broadcast system, an Internet system, and/or a broadcast/Internet convergence system. The service information (SI) may include broadcast service information (e.g., ATSC-SI and/or DVB-SI) received from the existing broadcast systems.

The term "broadcast signal" may conceptually include not only signals and/or data received from a terrestrial broadcast, a cable broadcast, a satellite broadcast, and/or a mobile broadcast, but also signals and/or data received from bidirectional broadcast systems such as an Internet broadcast, a broadband broadcast, a communication broadcast, a data broadcast, and/or VOD (Video On Demand).

The term "PLP" may indicate a predetermined unit for transmitting data contained in a physical layer. Therefore, the term "PLP" may also be replaced with the terms 'data unit' or 'data pipe' as necessary.

A hybrid broadcast service configured to interwork with the broadcast network and/or the Internet network may be used as a representative application to be used in a digital television (DTV) service. The hybrid broadcast service transmits, in real time, enhancement data related to broadcast A/V (Audio/Video) contents transmitted through the terrestrial broadcast network over the Internet, or transmits, in real time, some parts of the broadcast A/V contents over the Internet, such that users can experience a variety of contents.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc.

The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

More specifically, the present invention provides a broadcast signal transmitting apparatus and a broadcast signal receiving apparatus and emergency alert information method for providing an emergency alert service as one of broadcast services.

Furthermore, the present invention provides a signaling method and an apparatus of emergency alert information for an emergency alert service. The emergency alert service of the present invention may be a broadcast related to an emergency alert that is broadcasted in a specific channel or a text informing an emergency status like a disaster in a specific channel. The broadcast related to the emergency alert includes at least one of a video or an audio according to an embodiment of the present invention. In this embodiment, a message containing text-type information for informing the emergency status like the disaster is referred to as an emergency alert message or emergency alert information for simplicity of description. The emergency alert message and/or emergency alert information may further include signaling information related to the emergency alert.

The present invention may defines three physical layer (PL) profiles (base, handheld and advanced profiles), each optimized to minimize receiver complexity while attaining the performance required for a particular use case. The physical layer (PHY) profiles are subsets of all configurations that a corresponding receiver (or broadcast reception apparatus or broadcast reception system) should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving apparatus that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver (or broadcast reception apparatus or broadcast reception system) complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | $\leq 2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | $\leq 2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | $\leq 2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data unit (or base physical layer pipe) that carries service signaling data baseband frame (or BBFRAME) (or baseband packet): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe (or physical layer pipe): logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period TS expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS (or Layer-1 signaling data): physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of N cells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s). The data pipe may be referred to as a physical layer pipe.

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
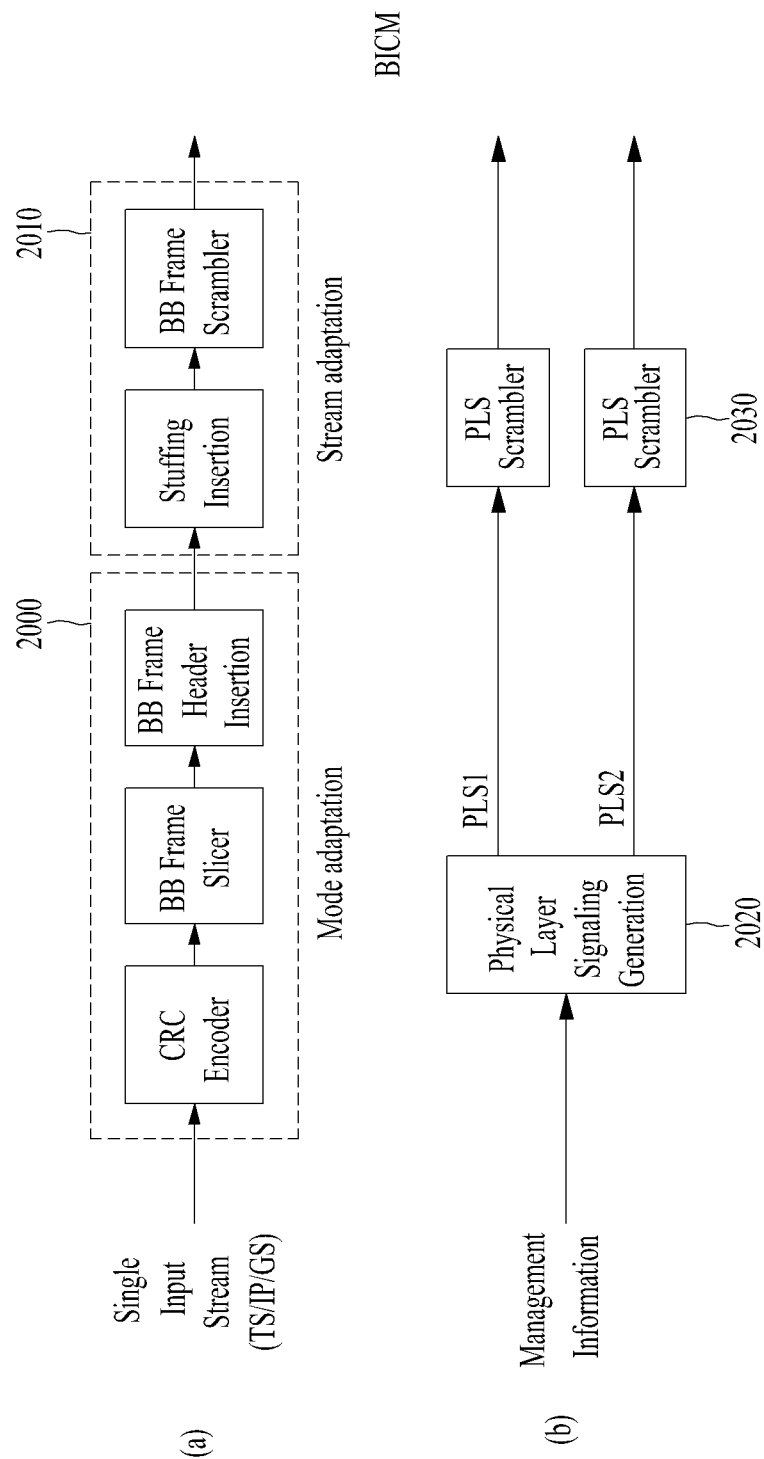
FIG. 2(a) and FIG. 2(b) are block diagrams illustrating an input formatting block according to an embodiment of the present invention.
Figure 3:
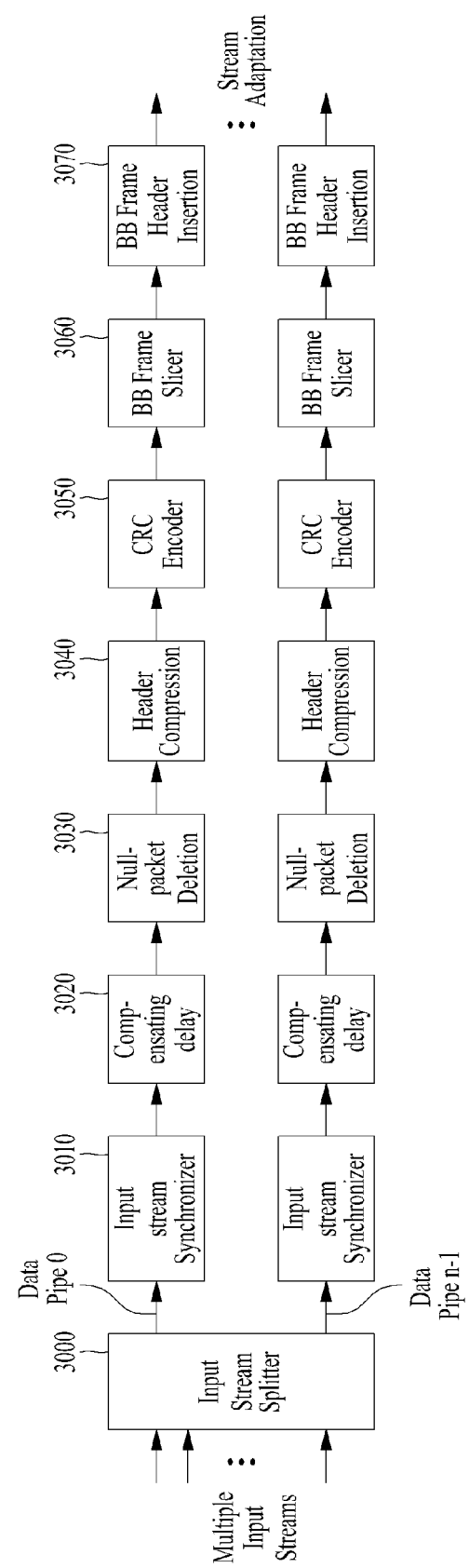
FIG. 3 is a block diagram illustrating an input formatting block according to another embodiment of the present invention.
Figure 4:
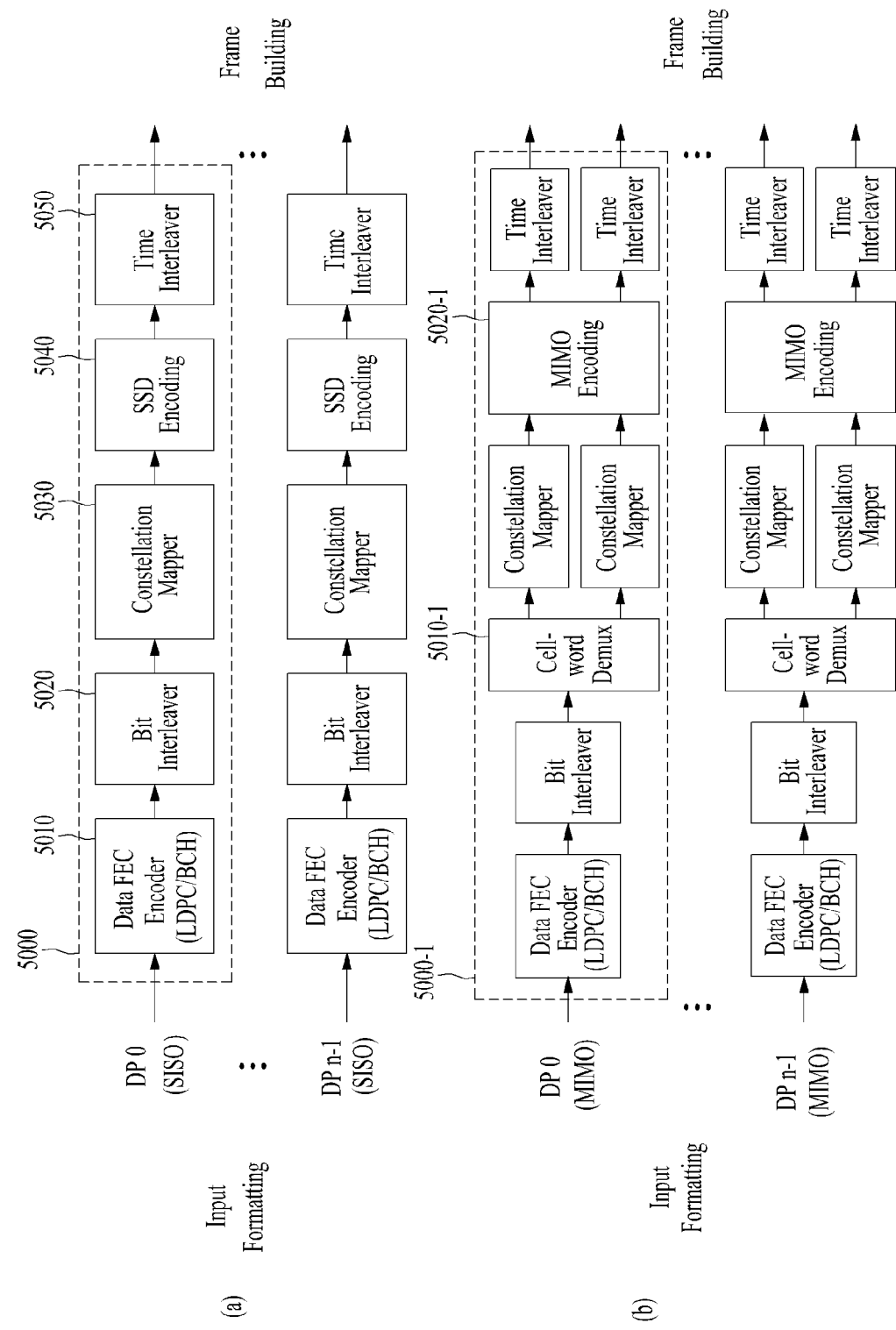
FIG. 4 is a block diagram illustrating a bit interleaved coding & modulation (BICM) block according to an embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signalled within IP packet headers. The system supports both IPv4 and IPv6 for the IP stream. GS may be composed of variable length packets or constant length packets, signaled within encapsulation packet headers.

FIG. 2(a) shows a mode adaptation block 2000 and a stream adaptation 2010 for signal DP and FIG. 2(b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame. Header Insertion block can insert fixed length BBF header of 2 bytes is inserted in front of the BB Frame. The BBF header is composed of STUFFI (1 bit), SYNOD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler. The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream. The above-described blocks may be omitted or replaced by blocks having similar or identical functions.

FIG. 4 illustrates a BICM block according to an embodiment of the present invention.

The BICM block illustrated in FIG. 4 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

FIG. 4(a) shows the BICM block shared by the base profile and the handheld profile and FIG. 4(b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using an MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol I of their respective TX antennas.

The above-described blocks may be omitted or replaced by blocks having similar or identical functions.

Figure 5:
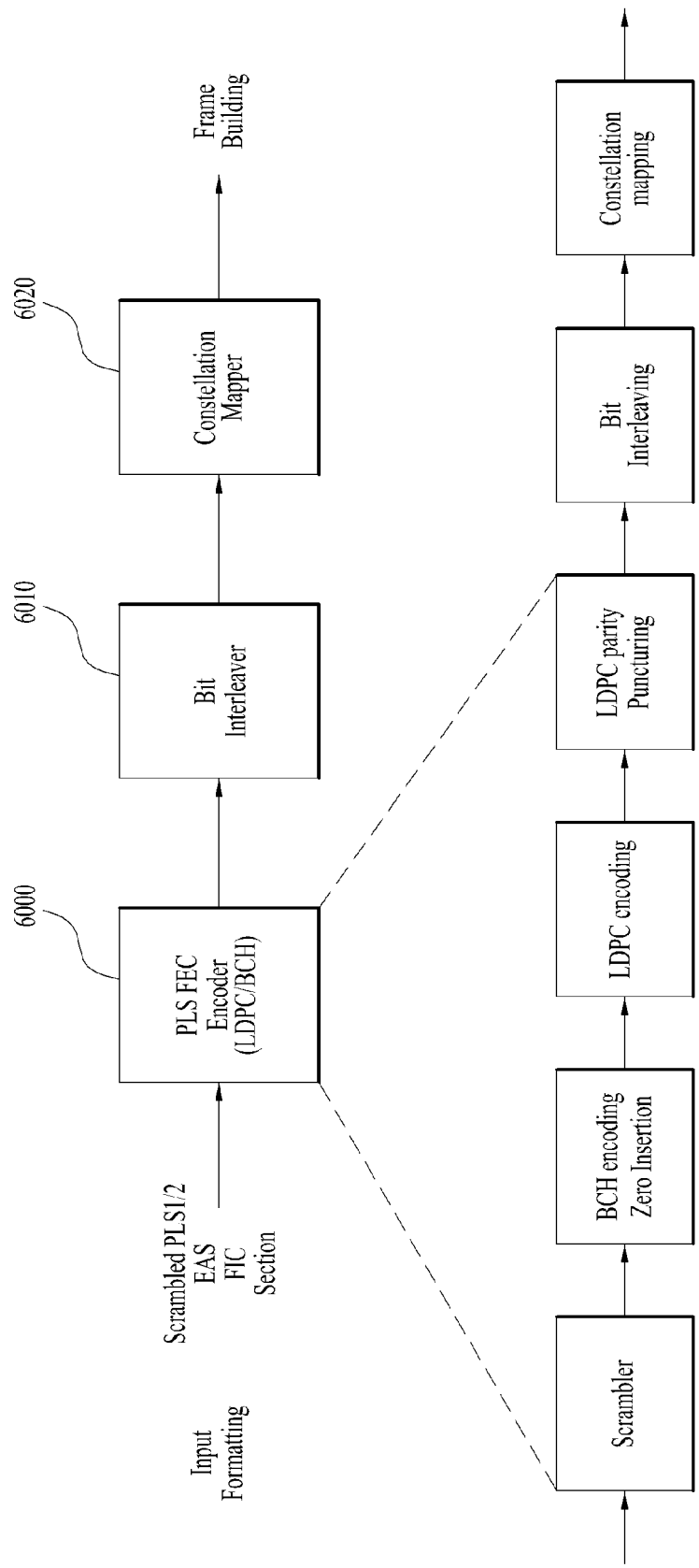
FIG. 5 is a block diagram illustrating a BICM block according to another embodiment of the present invention.

FIG. 5 illustrates a BICM block according to another embodiment of the present invention.

The BICM block illustrated in FIG. 5 corresponds to an embodiment of the BICM block 1010 described with reference to FIG. 1.

FIG. 5 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 5, the BICM block for protection of PLS, EAC and FIC can include a PLS FEC encoder 6000, a bit interleaver 6010, and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math Figure 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ ($=N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 |  |  |  |  |  |  |  |
|  | >1020 | 2100 |  | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

Figure 6:
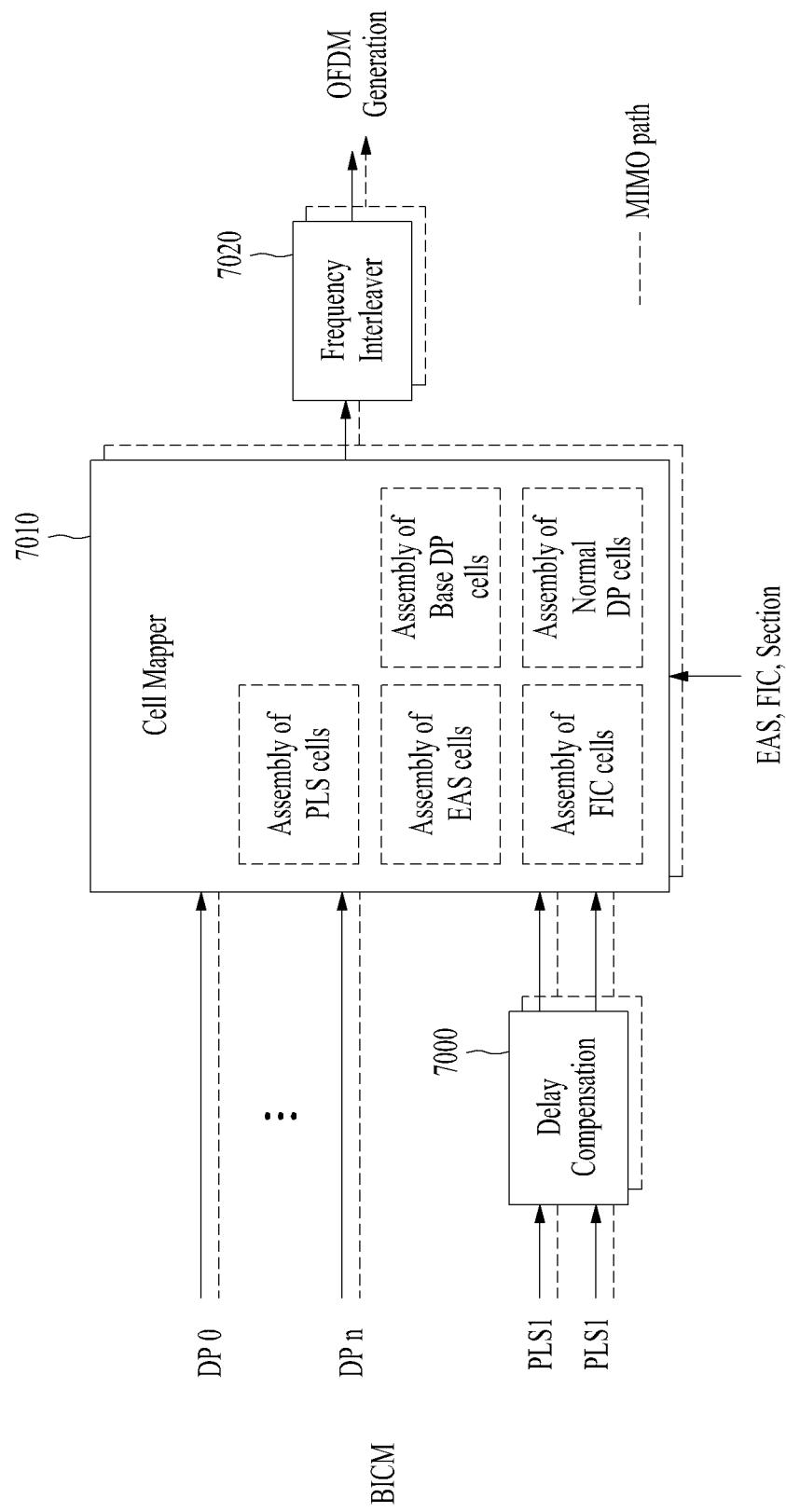
FIG. 6 is a block diagram illustrating a frame building (or frame generating) block according to an embodiment of the present invention.

FIG. 6 illustrates a frame building block according to one embodiment of the present invention.

The frame building block illustrated in FIG. 6 corresponds to an embodiment of the frame building block 1020 described with reference to FIG. 1.

Referring to FIG. 6, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the input Formatting block and BICM block. The delay of the BICM block is mainly due to the time interleaver. In-band signaling data carries information of the next TI group so that they are carried one frame ahead of the DPs to be signalled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 7:
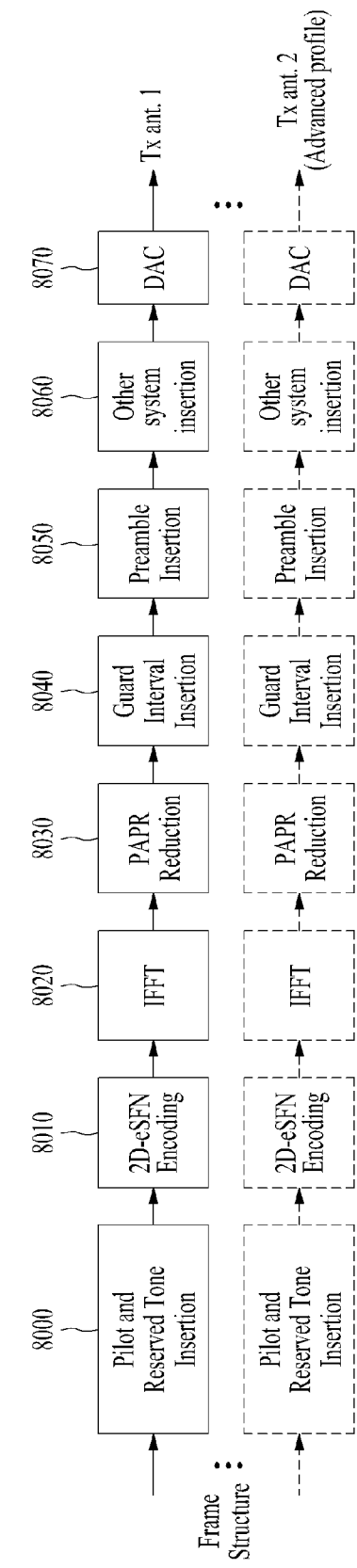
FIG. 7 is a block diagram illustrating an orthogonal frequency division multiplexing (OFDM) generation block according to an embodiment of the present invention.

FIG. 7 illustrates an OFMD generation block according to an embodiment of the present invention.

The OFDM generation block illustrated in FIG. 7 corresponds to an embodiment of the OFMD generation block 1030 described with reference to FIG. 1.

The OFDM generation block modulates the OFDM carriers by the cells produced by the Frame Building block, inserts the pilots; and produces the time domain signal for transmission. Also, this block subsequently inserts guard intervals, and applies PAPR (Peak-to-Average Power Radio) reduction processing to produce the final RF signal.

Figure 8:
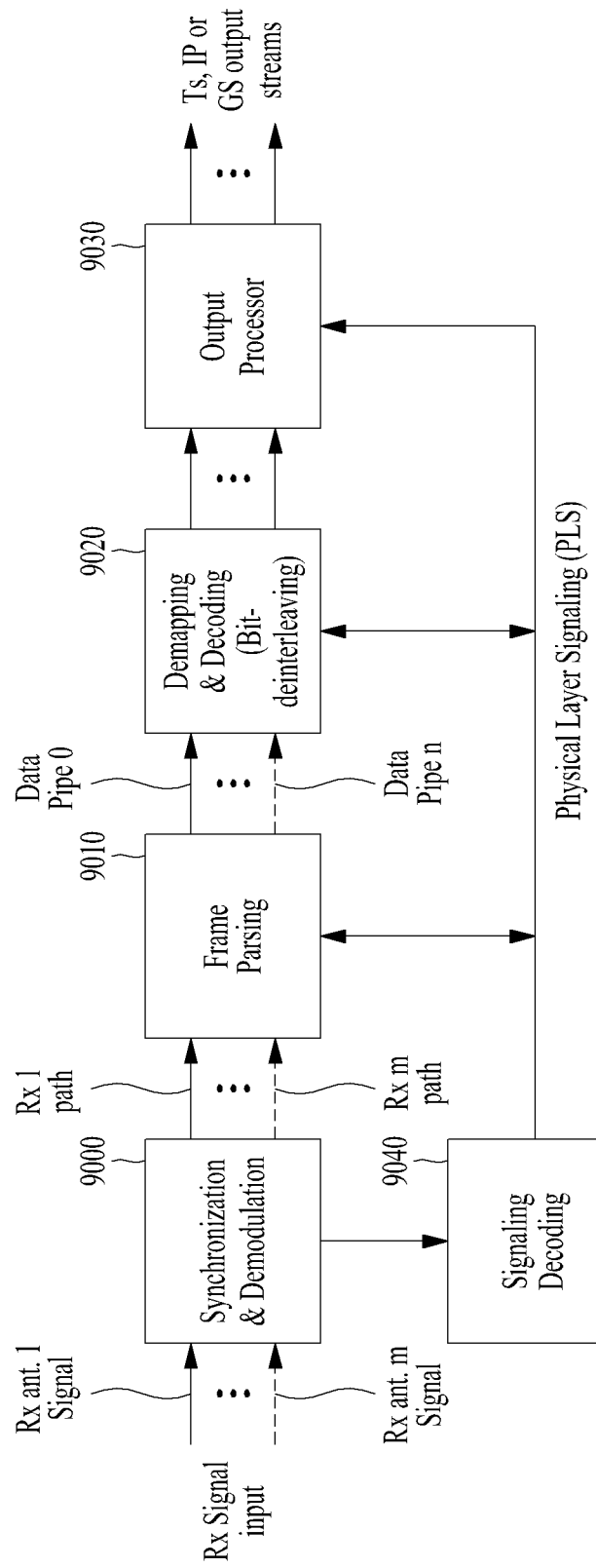
FIG. 8 is a block diagram illustrating a configuration of a broadcast signal reception apparatus for future broadcast services according to an embodiment of the present invention.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070.

The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

Figure 9:
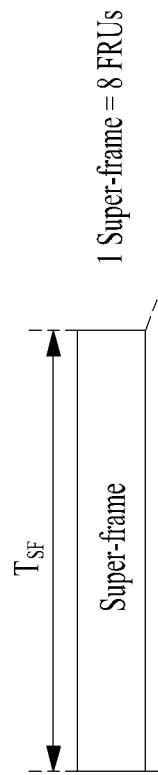
FIG. 9 is a diagram illustrating a structure of a frame according to an embodiment of the present invention.

FIG. 9 illustrates a frame structure according to an embodiment of the present invention.

FIG. 9 shows an example configuration of the frame types and FRUs in a super-frame. FIG. 9(a) shows a super frame according to an embodiment of the present invention, FIG. 9(b) shows FRU (Frame Repetition Unit) according to an embodiment of the present invention, FIG. 9(c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 10 illustrates a signaling hierarchy structure of the frame according to an embodiment of the present invention.

FIG. 10 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 11 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 12 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signalled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signalled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signalled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signalled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 13 illustrates PLS2 data according to an embodiment of the present invention.

FIG. 13 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signalled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signalled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signalled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signalled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signalled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver. If time interleaving is not used for a DP, it is set to Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signalled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signalled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signalled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signalled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signalled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |

TABLE 24-continued

| Value | ISSY mode |
|---|---|
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signalled according to the below table 25. HC_MODE_IP: This 2-bit field indicates the IP header compression mode when DP_PAYLOAD_TYPE is set to IP ('01'). The HC_MODE_IP is signalled according to the below table 26.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 14, 15:
FIG. 14 is a table illustrating PLS2 data according to another embodiment of the present invention.
FIG. 15 is a diagram illustrating a logical structure of a frame according to an embodiment of the present invention.

FIG. 14 illustrates PLS2 data according to another embodiment of the present invention.

FIG. 14 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signalled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 15 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 16:
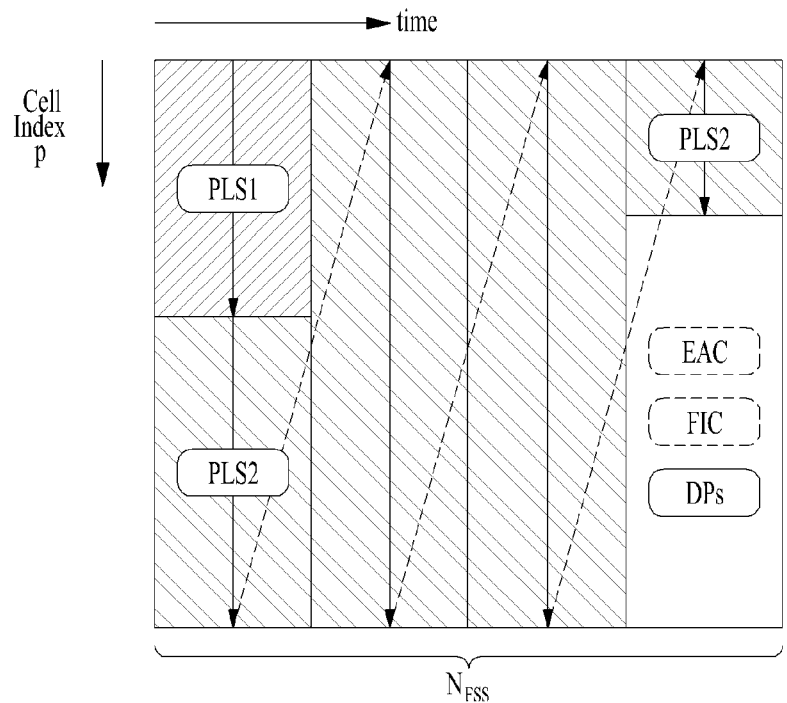
FIG. 16 is a diagram illustrating a PLS mapping according to an embodiment of the present invention.

FIG. 16 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 16. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 17:
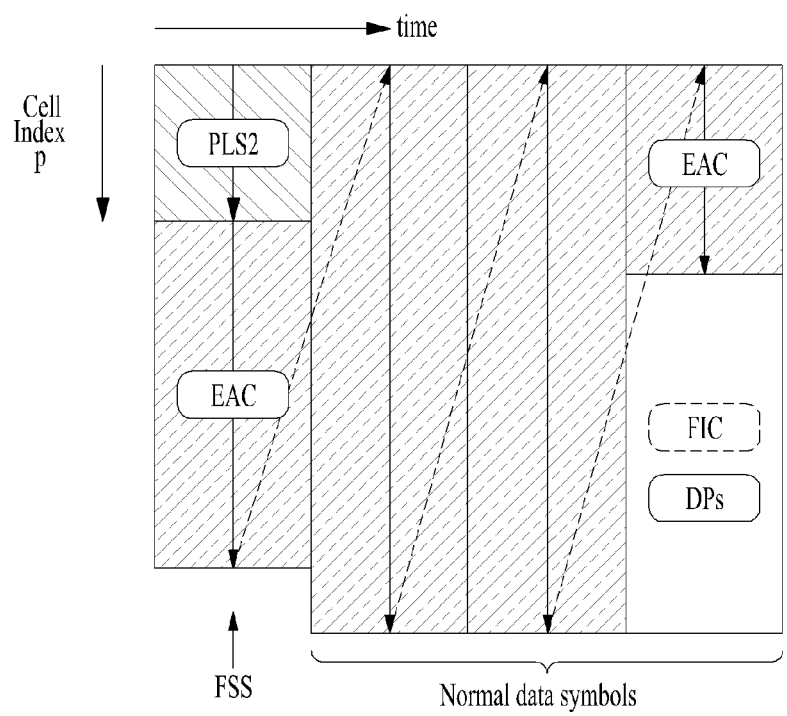
FIG. 17 is a diagram illustrating an emergency alert channel (EAC) mapping according to an embodiment of the present invention.

FIG. 17 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 17. Depending on the EAS message size, EAC cells may occupy a few symbols, as shown in FIG. 17.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 18:
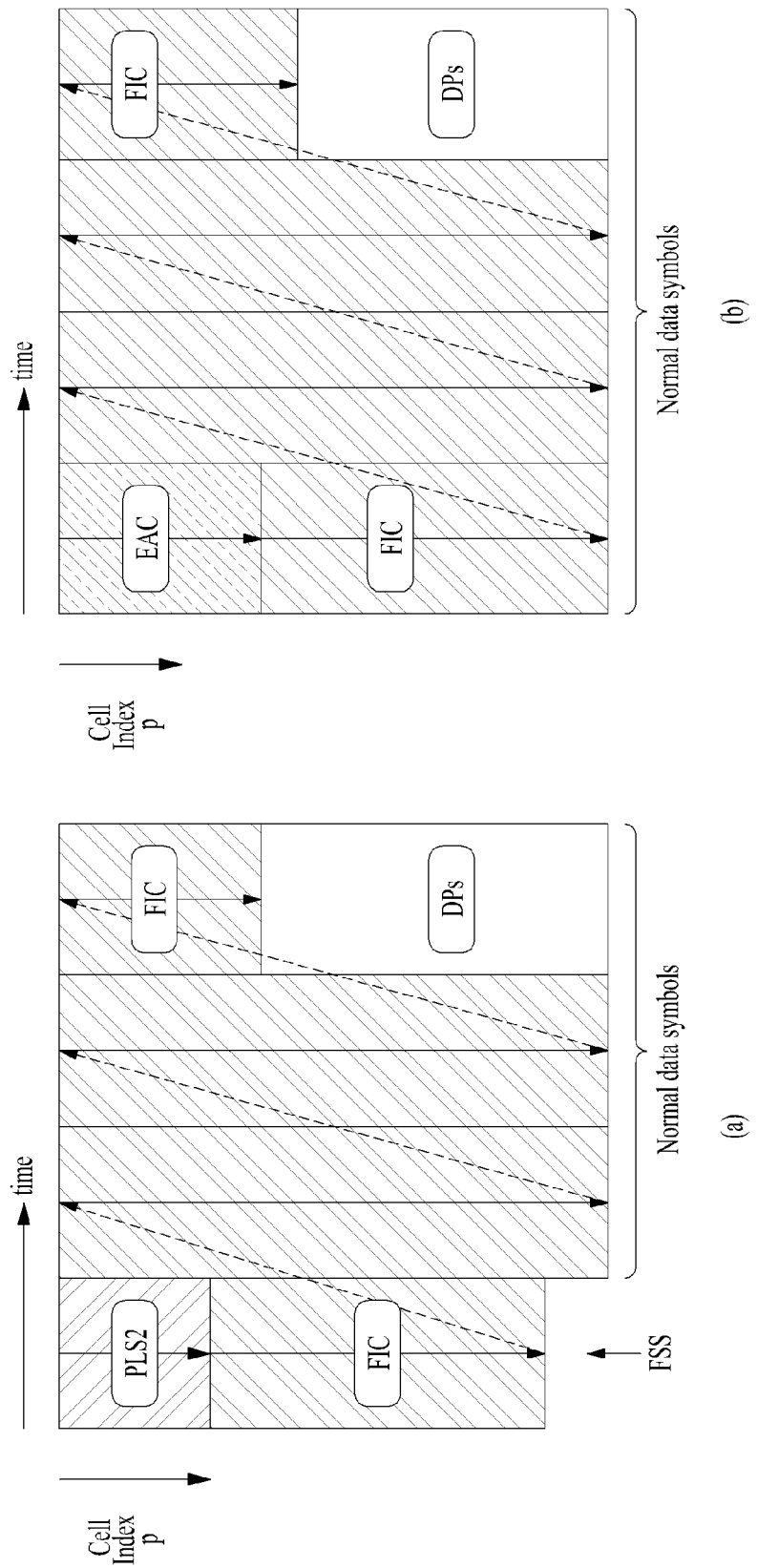

FIG. 18 illustrates FIC mapping according to an embodiment of the present invention.

FIG. 18(a) shows an example mapping of FIC cell without EAC and FIG. 18(b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signalled by the FIC_FLAG parameter in the static part of the PLS2. If FIC is used, FIC_FLAG is set to '1' and the signaling field for FIC is defined in the static part of PLS2. Signalled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 19:
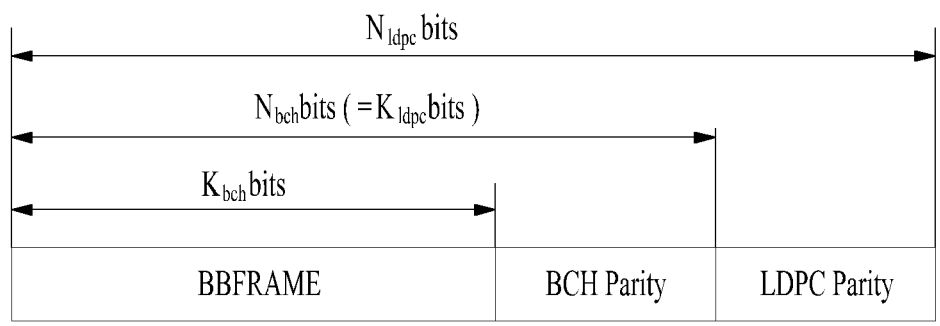
FIG. 19 is a diagram illustrating a structure of a Forward Error Correction (FEC) frame according to an embodiment of the present invention.

FIG. 19 illustrates an FEC structure according to an embodiment of the present invention.

FIG. 19 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 19.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 |  | 25920 | 25728 |  |  |

TABLE 28-continued

| LDPC Rate | $N_{ldpc}$ | $K_{ldpc}$ | $K_{bch}$ | BCH error correction capability | $N_{bch} - K_{bch}$ |
|---|---|---|---|---|---|
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow Math figure.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}] \quad \text{[Math Figure 2]}$$

The parameters for long FECBLOCK and short FECBLOCK are given in the above table 28 and 29, respectively.

The detailed procedure to calculate Nldpc–Kldpc parity bits for long FECBLOCK, is as follows:

1) Initialize the parity bits, $$p_0=p_1=p_2=\ldots=p_{N_{ldpc}-K_{ldpc}-1}=0 \quad \text{[Math Figure 3]}$$

2) Accumulate the first information bit—i0, at parity bit addresses specified in the first row of addresses of parity check matrix. The details of addresses of parity check matrix will be described later. For example, for rate 13/15:

$$p_{983} = p_{983} \oplus i_0 \quad p_{2815} = p_{2815} \oplus i_0 \quad \text{[Math Figure 4]}$$
$$p_{4837} = p_{4837} \oplus i_0 \quad p_{4989} = p_{4989} \oplus i_0$$
$$p_{6138} = p_{6138} \oplus i_0 \quad p_{6458} = p_{6458} \oplus i_0$$
$$p_{6921} = p_{6921} \oplus i_0 \quad p_{6974} = p_{6974} \oplus i_0$$
$$p_{7572} = p_{7572} \oplus i_0 \quad p_{8260} = p_{8260} \oplus i_0$$
$$p_{8496} = p_{8496} \oplus i_0$$

3) For the next 359 information bits, is, s=1, 2, . . . , 359 accumulate is at parity bit addresses using following Math figure.

$$\{x+(s \bmod 360) \times Q_{ldpc}\} \bmod(N_{ldpc}-K_{ldpc}) \quad \text{[Math Figure 5]}$$

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_1 \quad p_{2839} = p_{2839} \oplus i_1 \quad \text{[Math Figure 6]}$$
$$p_{4861} = p_{4861} \oplus i_1 \quad p_{5013} = p_{5013} \oplus i_1$$
$$p_{6162} = p_{6162} \oplus i_1 \quad p_{6482} = p_{6482} \oplus i_1$$
$$p_{6945} = p_{6945} \oplus i_1 \quad p_{6998} = p_{6998} \oplus i_1$$
$$p_{7596} = p_{7596} \oplus i_1 \quad p_{8284} = p_{8284} \oplus i_1$$
$$p_{8520} = p_{8520} \oplus i_1$$

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the Math Figure 5, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i=p_i \oplus p_{i-1}, \quad i=1,2,\ldots,N_{ldpc}-K_{ldpc}-1 \quad \text{[Math Figure 7]}$$

where final content of pi, i=0, 1, . . . $N_{ldpc}-K_{ldpc}-1$ is equal to the parity bit pi.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
| --- | --- |
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 20:
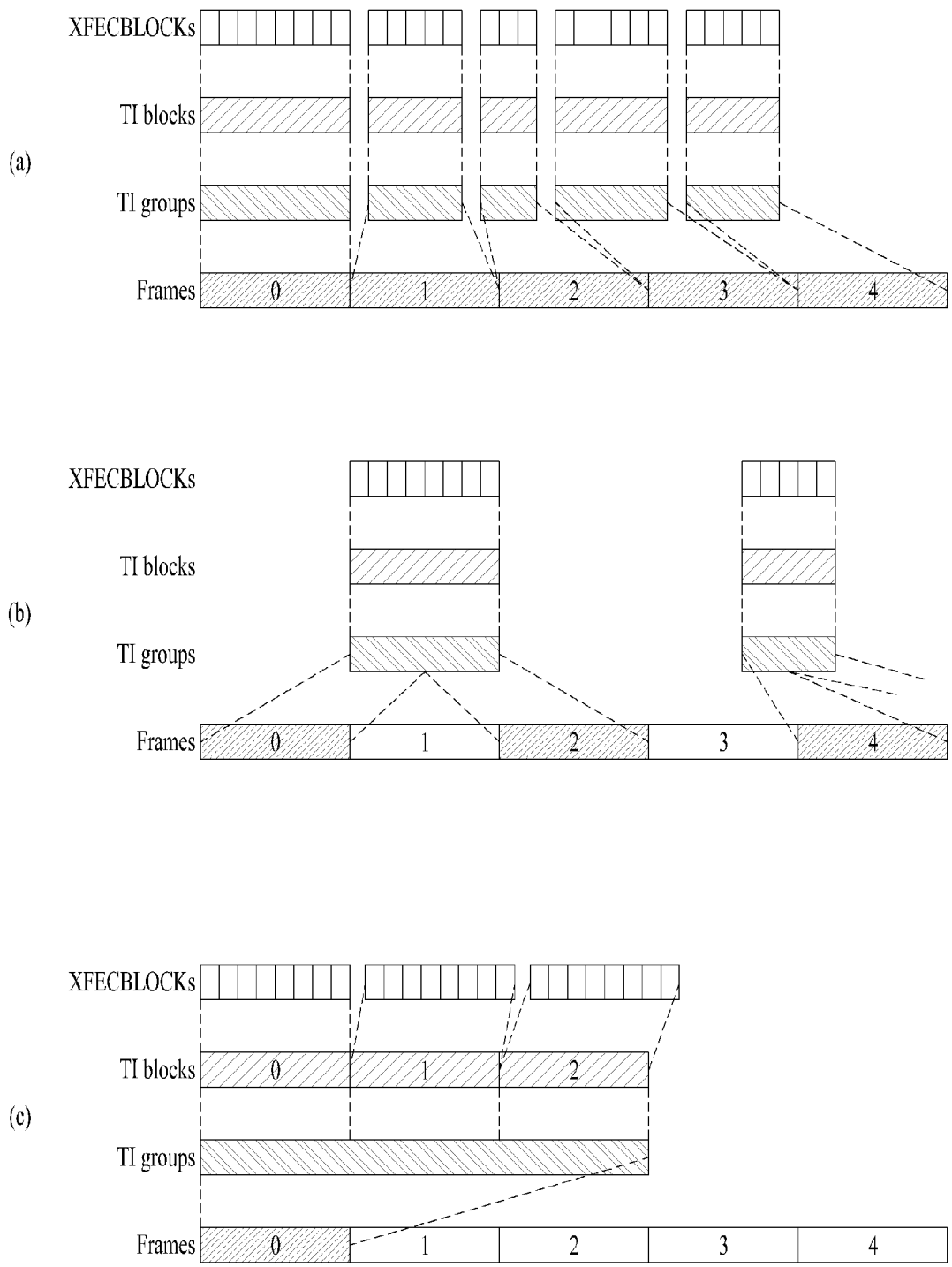
FIG. 20(a) to FIG. 20(c) are diagram illustrating time interleaving according to an embodiment of the present invention.

FIG. 20 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame.

There are three options for time interleaving (except the extra option of skipping the time interleaving) as shown in the below table 32.

TABLE 32

| Modes | Descriptions |
| --- | --- |
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$.

Figure 21:
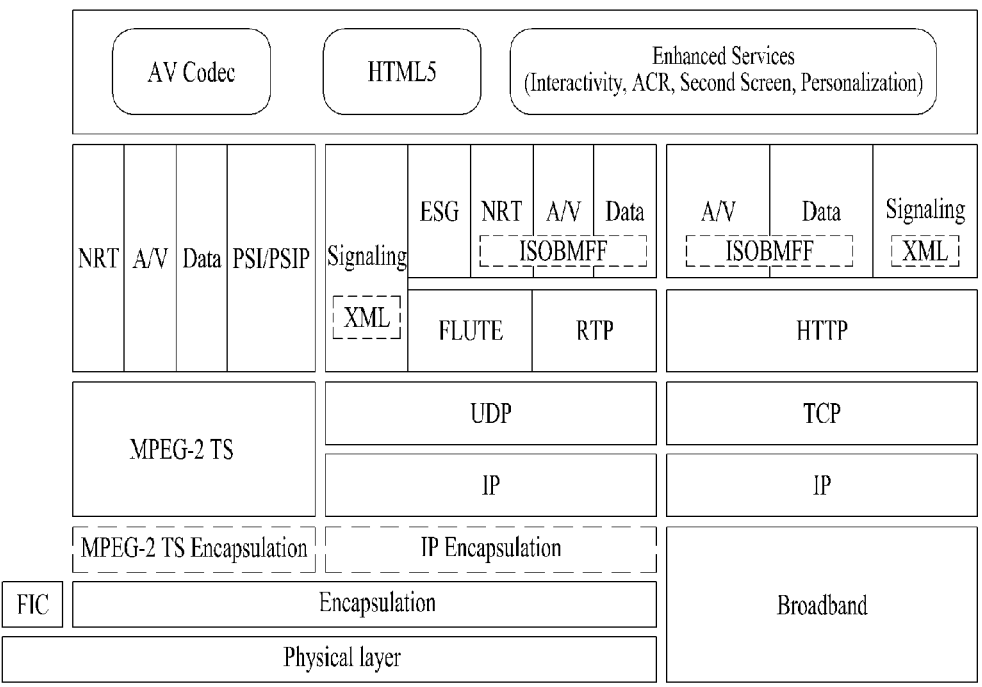
FIG. 21 is a diagram illustrating a protocol stack supporting a broadcast service according to an embodiment of the present invention.

FIG. 21 is a diagram illustrating a protocol stack for supporting a hybrid-based next-generation broadcast service according to an embodiment of the present invention.

In a broadcast transmitting apparatus, a data link (encapsulation) delivers an MPEG-2 transport stream (TS) and/or an Internet protocol (IP) packet transmitted from an upper layer to a physical layer. In addition, the data link layer may deliver signaling information required for an operation of a physical layer.

The data link layer may also be referred to as various terms such as an encapsulation layer, link layer, layer 2, and the like.

A broadcast system according to the present invention may correspond to a hybrid broadcast system obtained by combining an IP centric broadcast network and a broadband network. The broadcast system according to the present invention may be designed to maintain compatibility with a conventional MPEG-2-based broadcast system.

The broadcast system according to the present invention may correspond to a hybrid broadcast system based on combination of an IP centric broadcast network, a broadband network, and/or a mobile communication network or a cellular network.

And, the physical layer may use a physical protocol employed by a broadcast system such as an ATSC system and/or a DVB system.

The link layer in the broadcast receiving apparatus may acquire an IP datagram from information acquired from the physical layer or convert the acquired IP datagram into a specific frame (e.g., RS frame, general stream encapsulation (GSE)-Lite, GSE, or signal frame). Here, the frame may include a set such as a set of IP datagrams.

The broadcast service according to one embodiment of the present invention may provide not only audio/video (A/V) data but also additional services such as an HTML5 application, an interactivity service, an ACR service, a second screen service and a personalization service. Also, an emergency alert service may be provided as a broadcast service.

Such a broadcast service in the broadcast receiving apparatus may be received via a physical layer which is a broadcast network such as a terrestrial wave, a cable, and a satellite, etc. In addition, the broadcast service according to one embodiment of the present invention may be received via an Internet communication network (broadband).

MPEG2 TS Encapsulation may obtain a MPEG2 TS using information obtained from a physical layer. An FIC (Fast Information Channel) is signaling information called FIT (Fast Information Table) or SLT (Service List Table) and may include information required for acquisition of a service and/or a content and/or information required for channel scan.

The broadcast receiving apparatus may extract a user datagram protocol (UDP) datagram from the acquired IP datagram. The broadcast receiving apparatus may extract signaling information from the extracted UDP datagram. At this time, the signaling information may be in XML format. In addition, the broadcast receiving apparatus may extract an asynchronous layered coding/layered coding transport (ALC/LCT) packet from the extracted UDP datagram. The broadcast receiving apparatus may extract a file delivery over unidirectional transport (FLUTE) packet from the ALC/LCT packet. At this time, the FLUTE packet may include real-time audio/video/subtitle data, non-real time (NRT) data and electronic service guide (ESG) data. In addition, the broadcast receiving apparatus may extract a real-time transport protocol (RTCP) packet and an RTP control protocol (RTCP) packet from the extracted UDP datagram. The broadcast receiving apparatus may extract A/V data and supplementary data from the real-time transport packet such as the extracted RTP/RTCP packet. At this time, at least one of the NRT data, the A/V data and the supplementary data may be in ISO base media file format (BMFF). In addition, the broadcast receiving apparatus may extract NRT data, A/V data; signaling information such as PSI/PSIP from the MPEG-2 TS packet or the IP packet. At this time, the signaling information may be in XML or binary format and may include information for supporting effective acquisition of a service and/or a content.

When the broadcast service is transmitted via the Internet communication network (broadband), the broadcast receiving apparatus may receive an IP packet from the Internet communication network (broadband). The broadcast receiving apparatus may extract a TCP packet from the IP packet. The broadcast receiving apparatus may extract an HTTP packet from the extracted TCP packet. The broadcast receiving apparatus may extract A/V data, supplementary data, and signaling information, etc. from the extracted HTTP packet. At this time, at least one of the A/V data and the supplementary data may be in ISO BMFF. In addition, the signaling information may be in XML format.

The broadcast receiving apparatus may provide several enhanced services such as an interactive service, a second screen service, and an emergency alert service and so on by combining data delivered via the described protocol stack.

Figure 22:
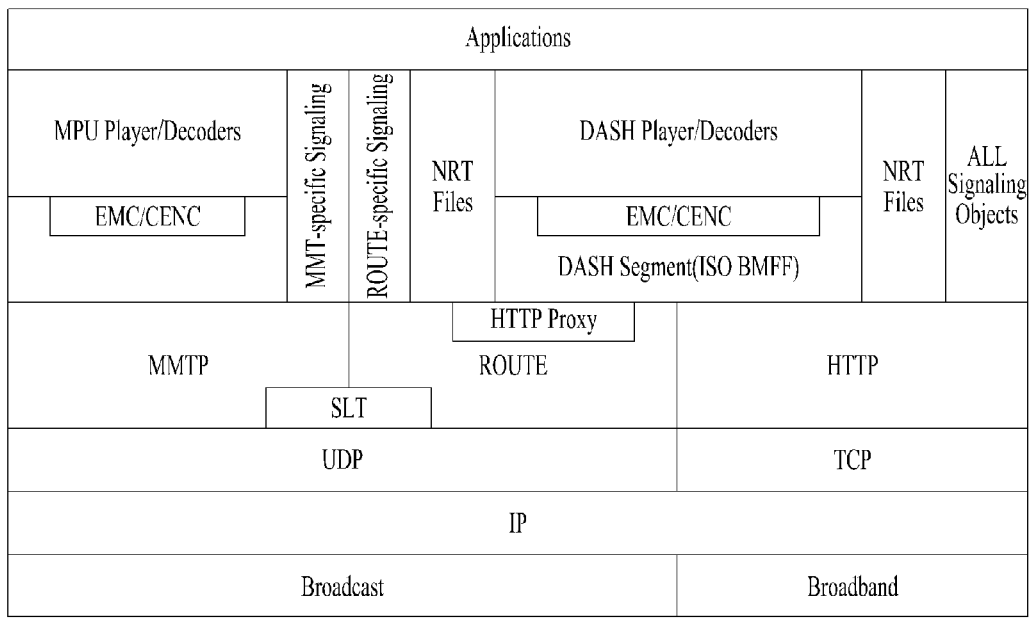
FIG. 22 is a diagram illustrating a protocol stack supporting a broadcast service according to another embodiment of the present invention.

FIG. 22 is a diagram illustrating a protocol stack supporting a broadcast service according to an embodiment of the present invention.

In FIG. 22, a broadcast service may be provided in an application form. In FIG. 22, a broadcast service may be transmitted through a broadcast network such as a terrestrial broadcast, a cable broadcast, a satellite broadcast, for example, a physical layer or may be transmitted through a broadband network.

When a broadcast service is received through a physical layer of a broadcast network, a broadcast receiving apparatus may acquire an IP datagram by using information acquired from the physical layer. Furthermore, the broadcast receiving apparatus may extract a UDP datagram from the acquired IP datagram and may extract at least one of MMTP (MPEG Media Transport Protocol) sessions, ROUTE (Real-Time Object Delivery over Unidirectional Transport) sessions, signaling information (for example, FIT, MMT specific signaling, ROUTE specific signaling) from the extracted UDP datagram. Moreover, the broadcast receiving apparatus may provide a corresponding service by decoding MPUs (Media processing units) received through the MMTP sessions or may provide a corresponding service by decoding MPEG-DASH (Dynamic Adaptive Streaming over HTTP) segments received through the ROUTE sessions based on the extracted signaling information.

Meanwhile, when a broadcast service is transmitted through a broadband, the broadcast receiving apparatus may receive IP packets from the broadband. The broadcast receiving apparatus may extract TCP packets from the received IP packets. And, the broadcast receiving apparatus may extract HTTP packets from the extracted TCP packets, may provide a corresponding service by decoding MPEG-DASH segments transmitted through the extracted HTTP packets or may provide a NRT service by processing NRT files. That is, in case of the broadband, data encapsulated in a ISO BMFF format may be transmitted to the broadcast receiving apparatus based on a streaming method.

At this point, video data, audio data, caption data, and so on of data for broadcast services may be encapsulated in the form of an ISO base media file (hereinafter, ISO BMFF). For example, the data encapsulated in the form of an ISO BMFF may have a form of a segment of moving picture expert group (MPEG)-dynamic adaptive streaming over HTTP (DASH) or a media processing unit (MPU) of MPEG media transport (MMT).

Herein, the ROUTE may be a protocol for transmitting files through an IP multicast networks. The ROUTE protocol may use asynchronous layered coding (ALC) and layered coding transport (LCT), as base protocols designed for massively scalable multicast distribution, and other well known Internet standards. The ROUTE may be an enhanced version or functional alternative formed by adding additional features to FLUTE. The ROUTE may transmit signaling messages, electronic service guide (ESG) messages, and NRT content. The ROUTE may be very appropriate to transmit streaming media, in particular, MPEG-DASH media segment files. Compared with FLUTE, the ROUTE may provide lower end-to-end latency through a delivery chain. The ROUTE may provide an easy MPEG-DASH combination. The MPEG-DASH combination may enable synergy between broadcast and broadband delivery modes of DASH.

A single ROUTE session may include at least one LCT transport session. LCT transport sessions may be a subset of the ROUTE session. For media delivery, one LCT transport session may typically transmit one media component (e.g. DASH representation). From a broadcast DASH point of view, the ROUTE session may be considered as a compound of the LCT transport session for transmitting at least one media component as at least one component of DASH media presentation. In each LCT transport session, at least one related object may be transmitted. For example, objects may be DASH segments related to one representation. Along with each object, metadata properties may be transmitted such that objects are used in applications. Applications may include DASH Media Presentations, HTML-5 Presentations, or other object-consuming applications but is not limited thereto. The ROUTE sessions may be bounded or unbounded from the temporal perspective. The ROUTE session may include at least one LCT transport session. Each transport session may be uniquely identified by a unique transport session identifier (TSI) in an LCT header.

Moreover, representation of MPEG-DASH may be concept corresponding to MMTP packet flow in an MMT protocol and may be mapped to asset identifier (asset ID or asset_id). In addition, segment of MPEG-DASH may be concept corresponding to MPU in an MMT protocol and may be mapped to information included in a mmpu box (or MPU identifier).

Signaling data (or signaling information) such as FIT, MMT specific signaling, ROUTE specific signaling and so on may be transmitted using the following method.

In the case of the broadcast network, the signaling data may be transmitted through a specific physical layer pipe, which is a specific data pipe of a physical layer frame (or frame) transmitted in a physical layer of a future broadcast transmitting system and the broadcast network, according to attributes of signaling. For example, a signaling form may be a form of a bit stream or an encapsulated form in IP/UDP datagram. In the case of the broadband, the signaling data may be returned and transmitted in response to a request of the broadcast receiving apparatus.

The FIT corresponds to a low level signaling and is referred to as FIC or SLT. The broadcast receiving apparatus enables to build a basic service list based on the FIT and bootstrap the discovery of service layer signaling (SLS) of each service. The FIT (or SLT) may be transmitted through a link layer signaling. In addition, the FIT (or SLT) may be transmitted within each physical layer frame for rapid acquisition. According to some embodiments, the FIT (or SLT) may be transmitted through at least one of a physical layer pipe transmitting a physical layer frame and signaling and/or a physical layer pipe transmitting data to be serviced actually. Hereinafter, embodiments of the present invention will be described in terms of the FIT.

The SLS such as the MMT specific signaling and the ROUTE specific signaling may enable the broadcast receiving apparatus to discover and access at least one service and/or at least one content component. When being transmitting through a broadcast network, the SLS may be transmitted in at least one LCT transport session included in a ROUTE session by ROUTE/UDP/IP. In this case, the SLS may be transmitted at a suitable carousel rate for supporting rapid channel join and switching. When being transmitted through the broadband, the SLS may be transmitted by HTTP(S)/TCP/IP.

ESG data and NRT content data may be transmitted using the following method.

In the case of the broadcast network, the ESG data and the NRT content data may be encapsulated in an application layer transport protocol packet. Then, the data encapsulated in the application layer transport protocol packet may be transmitted in the same way as the above description.

In the case of the broadband, the ESG data and the NRT content data may be returned and transmitted in response to a request of the broadcast receiving apparatus.

A relationship between the ROUTE/LCT session and the MMTP session for transmitting at least one content component of a service will now be described.

For broadcast delivery of a linear service without app-based enhancement, a content component of a service may be transmitted through 1) at least one ROUTE/LCT session and/or 2) at least one MMTP session.

For broadcast delivery of a linear service with app-based enhancement, a content component of a service may be transmitted through only 1) at least one ROUTE/LCT session. Alternatively, a content component of a service may be transmitted through 2) at least one ROUTE/LCT session and/or at least one MMPT session.

For broadcast delivery of an app-based service, a content component of a service may be transmitted through at least one ROUTE/LOT session.

Each ROUTE session may include at least one LCT session. Each LCT session may include an entire or portion of each content component included in a service.

In transmission of streaming services, the LOT session may transmit a separate component of a user service such as audio, video, and/or closed caption stream. The streaming media may be formatted in at least one DASH segment by MPEG-DASH.

Each MMTP session may include at least one MMTP packet flow. Each MMTP packet flow may transmit an MPEG media transport (MMT) signaling message. In addition, each MMTP packet flow may include an entire or portion of each content component included in a service.

The MMTP packet flow may transmit at least one content component formatted in at least one MPU by MMT signaling message and/or MMT.

For the delivery of NRT User Services or system metadata, an LCT session may carry at least one file-based content item. The at least one file-based content item may include continuous (time-based) or discrete (non-time-based) media components of an NRT service. In addition, the at least one file-based content item may include service signaling and/or electronic service guide (ESG) fragments.

A broadcast stream is the abstraction for an RF channel, which is defined in terms of a carrier frequency centered within a specified bandwidth. The RF channel may be defined by the pair [geographic area, frequency]. The geographic area and frequency information may be defined and/or maintained by administrative authority along with a broadcast stream ID (BSID). A physical layer pipe (PLP or DP) corresponds to a portion of the RF channel.

Each PLP (or DP) has certain modulation and coding parameters. It is identified by a PLP identifier (PLPID), which is unique within the broadcast stream it belongs to.

Each service is identified by two forms of service identifier: a compact form that is used in the SLT and is unique only within the broadcast area; and a globally unique form that is used in the SLS and the ESG.

A ROUTE session may be identified by a source IP address, destination IP address, and/or destination port number. An LCT session may be identified by a transport session identifier (TSI) which is unique within the scope of the parent ROUTE session.

A service-based transport session instance description (S-TSID) may include in properties common to at least one LOT session and/or certain properties unique to at least one individual LCT session. The S-TSID may be an ROUTE signaling structure or a part of the service layer signaling.

Each LCT session is carried over a single physical layer pipe (PLP or DP). Different LCT sessions in one ROUTE session may be included in different PLPs or included in the same PLP.

The properties described in the S-TSID may include the TSI value and PLP ID for each LCT session, descriptors for at least one delivery object or file and/or at least one application layer FEC parameter.

A MMTP session may be identified by a source IP address, a destination IP address, and/or destination port number. A MMTP packet flow may be identified by a packet_id which is unique within the scope of the parent MMTP session.

The S-TSID may include information on properties common to each MMTP packet flow and certain properties of at least one individual MMTP packet flow.

At least one property of each MMTP session may be transmitted through an MMT signaling message transmitted in the MMTP session.

Each MMTP packet flow may be transmitted through one PLP (or DP). Different MMTP packet flows in one MMTP session may be included in different PLPs (DPs) or included in the same PLP (or DP).

At least one property described in the MMT signaling message may include packet_id and/or a PLPID for each MMTP packet flow.

Figure 23:
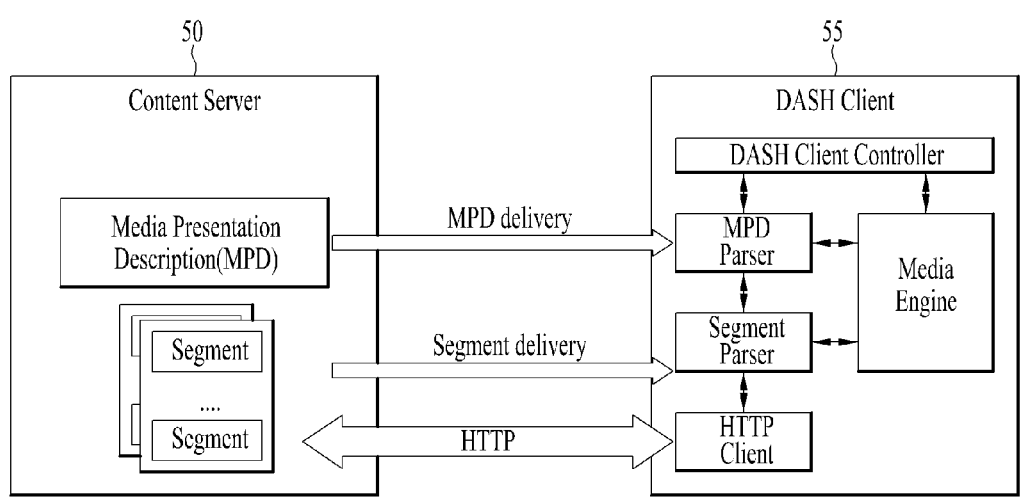
FIG. 23 is a diagram illustrating a transport layer of a broadcast service according to an embodiment of the present invention.

FIG. 23 is a block diagram showing media contents transmission/reception system through an IP network (i.e., broadband) according to an embodiment of the present invention.

Transmission and reception of a media content via the IP network according to an embodiment of the present invention is divided into transmission and reception of a transport packet including actual media content and transmission and reception of media content presentation information. The broadcast receiving apparatus 55 receives media content presentation information and receives a transport packet including media content. At this time, the media content presentation information indicates information necessary for media content presentation. The media content presentation information may include at least one of spatial information and temporal information necessary for media content presentation. The broadcast receiving apparatus 55 presents the media content based on the media content presentation information.

In a detailed embodiment, the media content may be transmitted and received via the IP network according to the MPEG-DASH standard. At this time, the content server 50 transmits a Media Presentation Description, MPD) including the media content presentation information. According to a detailed embodiment, the MPD may be transmitted by a different external sever other than the content server 50. In addition, the content server 50 may transmit a segment including media content according to a request of the broadcast receiving apparatus 55. The broadcast receiving apparatus receives the MPD. The broadcast receiving apparatus requests the media content to the content server based on the MPD. The broadcast receiving apparatus receives a transport packet including the media content based on the request. The broadcast receiving apparatus represents the media content based on the MPD. For this, the broadcast receiving apparatus may include a DASH client. The DASH client may include an MPD parser parsing an MPD, a segment parser parsing a segment, an HTTP client that transmits an HTTP request message through IP transmission/reception units (not shown) and received an HTTP response message, and a media engine representing the media.

In another detailed embodiment, the media content may be transmitted and received via the IP network according to the MMT standard. The content server 50 transmits a Presentation Information document, PI document) including the media content presentation information. The content server 50 also transmits a MMT protocol (MMTP) packet including the media content according to a request of the broadcast receiving apparatus 55. The broadcast receiving apparatus 55 receives the PI. The broadcast receiving apparatus 55 receives the transport packet including the media content. The broadcast receiving apparatus 55 extracts the media content from the transport packet including the media content. The broadcast receiving apparatus 55 represents the media content based on the PI document.

Meanwhile, the broadcast receiving apparatus may receive emergency information for disaster situations such as natural disasters, terrorism, and war through a broadcast network. Additionally, the broadcast receiving apparatus may notify this to users. Through this, many people can recognize national disaster situations quickly and efficiently. However, if a user cannot stare at the broadcast receiving apparatus all the time, there may be an emergency alert situation that is not recognized by the user. Even when a user cannot stare at the broadcast receiving apparatus all the time, it is highly possible for the user to carry a companion device such as a mobile phone or a tablet all the time. Accordingly, if the broadcast receiving apparatus transmits an emergency alert to the companion device and the companion device displays the emergency alert, a national disaster situation can be quickly notified to a user efficiently.

In a broadcast transmitting apparatus, an emergency alert message may be generated in a form of a section table or a packet and transmitted the generated emergency alert message via the physical layer. Furthermore, the emergency alert message may be input directly to the physical layer without go through the link layer. In the physical layer, the emergency alert message may be assigned to a data pipe symbol which is a physical layer pipe symbol within a frame and may be transmitted. Herein, the physical layer pipe may be a data pipe transmitting signaling information or a data pipe transmitting actual data, or a general data pipe that its use is not specified. Moreover, in the physical layer, the emergency alert message may be assigned and transmitted between a PLS symbol and a data pipe symbol within the frame as shown in FIG. 15 to FIG. 18. In addition, signaling information related to the emergency alert may be transmitted through a physical layer pipe within the frame or may be transmitted through a preamble symbol or a PLS symbol after being included in transmission parameters of a physical layer as shown in FIG. 11 and FIG. 14. The emergency alert-related signaling information that is transmitted through the preamble symbol or the PLS symbol may be signaled in at least one of an EAC_FLAG field, an EAC_WAKE_UP_VERSION_NUM field, an EAC_LENGTH_BYTE field, an EAC_COUNTER field, and an EA_WAKE_UP field. At this point, information transmitted through a link layer or a upper layer may be or may not be referenced. The description of each field is the same as the above and thus is omitted.

The following will be described embodiments transmitting an emergency alert message in a broadcast transmitting apparatus according to the present invention and receiving the emergency alert message in a broadcast receiving apparatus according to the present invention. More specifically, the broadcast receiving apparatus needs signaling information to receive and decode the emergency alert message for receiving the emergency alert message and providing an emergency alert service to users.

Figure 24:
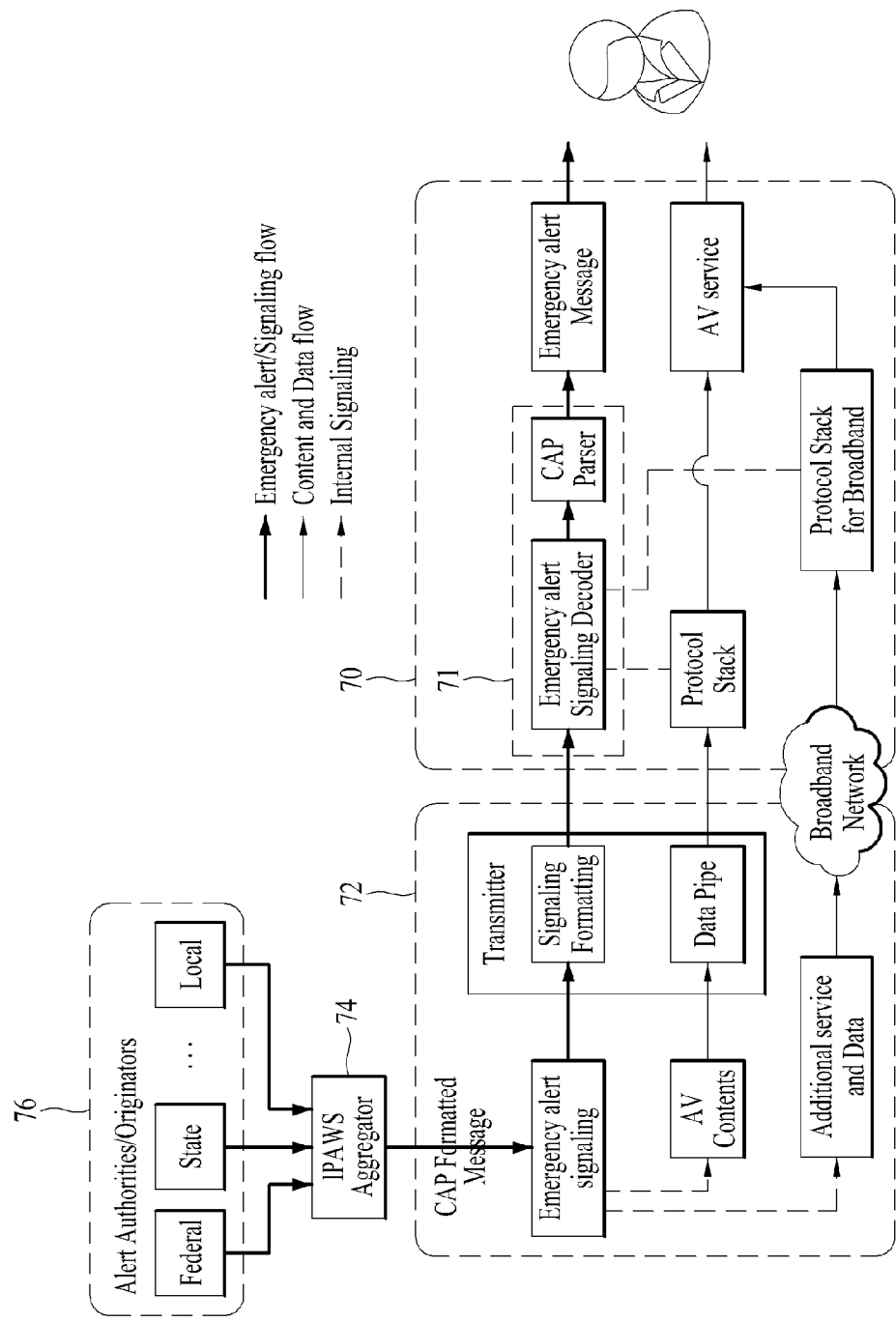
FIG. 24 is a block diagram illustrating an entire configuration of an emergency alert system according to an embodiment of the present invention.

FIG. 24 is a block diagram illustrating an emergency alert system according to an embodiment of the present invention. The emergency alert system according to an embodiment of the present invention may include a broadcast transmitting apparatus 72 (for example, a broadcaster) transmitting an emergency alert message, a broadcast receiving apparatus 70 receiving and processing the emergency alert message. The emergency alert system may further include alert authorities 76 and an information collection device 74.

At this point, the emergency alert message means that an emergency alert message to inform emergency situations to broadcast viewers is converted in a transmittal form through a broadcast network. Transmission of the emergency alert information is performed by the government in general and a detailed structure may be changed according to a country to which a broadcast system is applied. Accordingly, in a method transmitting through broadcast network emergency alert information, the present invention will explain about a configuration method of an applicable emergency alert message in common, transmitting/receiving methods, and transmitting/receiving apparatuses.

The alert authorities 76 may include agencies concerned in countries or corresponding areas. When emergency alert information needs to be transmitted through a broadcast network, the alert authorities 76 generate an emergency alert and deliver it to the information collection device 74 (or an agency). At this point, the information collection device 74 may be an Integrated Public Alert Warning System (IPAWS) aggregator.

The information collection device 74 may configure emergency alert information to be delivered through a broadcast network, with a common alerting protocol (CAP) based message and may then deliver it to the broadcast transmitting apparatus 72. Herein, the CAP may be in XML file for warning an emergency situation and exchanging information. The CAP may propagate a warning message through a plurality of emergency alert systems simultaneously.

Hereinafter, according to an embodiment of the present invention, a process after a CAP message is delivered to the broadcast transmitting apparatus 72 will be described mainly.

When the CAP message is delivered to the broadcast transmitting apparatus 72, the broadcast transmitting apparatus 72 that processes a corresponding message may transmit related audio/video contents and additional service together with the CAP message. In more detail, the broadcast transmitting apparatus 72 inserts related audio/video contents or additional service together with a CAP message into a broadcast signal and transmits it to the broadcast receiving apparatus 70. In an embodiment, emergency alert related data including the CAP message may be transmitted through another path according to each purpose and format. In a specific example, the other path may be one of a signaling channel, a physical layer pipe (or data pipe), and a broadband.

The broadcast receiving apparatus 70 receives a broadcast signal including emergency alert related data from the broadcast transmitting apparatus 72. Then, the broadcast receiving apparatus 70 decodes the received broadcast signal through an emergency alert signaling decoder. The broadcast receiving apparatus 70 receives audio/video service according to information obtained by decoding a broadcast signal. In more detail, the broadcast receiving apparatus 70 may obtain physical layer pipe information transmitting audio/video service from a broadcast signal. At this point, the physical layer pipe may be a data which is included a physical layer frame. Then, the broadcast receiving apparatus 70 may receive audio/video service data relating to an emergency alert message through a physical layer pipe (or physical layer frame).

Additionally, the broadcast receiving apparatus 70 may extract NRT service information relating to an emergency alert from the information obtained by decoding a broadcast signal. In more detail, the NRT service information may be address information through which NRT service is obtained. For example, NRT service is delivered through a broadband and address information may be URI information for obtaining NRT service.

The broadcast transmitting apparatus 72 according to an embodiment of the present invention may transmit an emergency alert message through a protocol layer included in a protocol stack: In this case, the protocol layer may be a link layer. The broadcast transmitting apparatus 72 according to an embodiment of the present invention may format an emergency alert message in a table form according to a transport protocol. At this point, the emergency alert message may be formatted in the table form in the link layer included in the protocol stack. Moreover, the emergency alert message may include information signaling a link layer and physical layer operation.

The broadcast transmitting apparatus 72 according to another embodiment of the present invention may packetize the emergency alert message according to a transport protocol. In more detail, the broadcast transmitting apparatus 72 may encapsulate the emergency alert message to a physical layer frame. This may prevent the emergency alert message from being signaled to the broadcast receiving apparatus 70 through several layers.

In order to transmit the emergency alert message, it needs to be configured in a transmissible form for a broadcast system. To this end, in an embodiment of the present invention, a section table form for transmission of the emergency alert message is generally used. In another embodiment of the present invention, the emergency alert message may be transmitted as a portion of another section table in the form of a descriptor. In another embodiment of the present invention, the emergency alert message may be transmitted in a packet form. In more detail, the emergency alert message may be transmitted in a packet form through a data pipe which is a physical layer pipe. In this case, the emergency alert message may be included in a payload configuring a packet and transmitted.

FIG. 25 is a diagram illustrating a syntax for an Emergency Alert Table (EAT) information according to an embodiment of the present invention. At this point, an EAT may be in one format of an emergency alert message. According to an embodiment of the present invention, when an emergency alert message (or EAS message) is transmitted in a payload of a packet, EAT information corresponding to signaling information of the emergency alert message may be included in a header of the packet. According to another embodiment of the present invention, the EAT information may be included in an extended header (or header extension) of the packet.

As shown in FIG. 25, EAT information may include version information of a protocol that the EAT has. According to a specific embodiment, corresponding information may be an EAT_protocol_version field.

Additionally, the EAT information may include information for notifying whether to perform switching of a channel automatically to the broadcast receiving apparatus 70. For example, the EAT information may include information for notifying whether to perform switching of a channel automatically to the broadcast receiving apparatus 70 through a channel for notifying detailed information on an emergency alert. According to a specific embodiment, information for notifying whether to perform switching of a channel automatically may be an automatic_tuning_flag field.

Additionally, the EAT information may include information on the number of messages included in an EAT. According to a specific embodiment, message count information may be a num_EAS_message field.

FIG. 26 is a diagram illustrating a syntax for emergency alert message according to an embodiment of the present invention. An emergency alert message according to an embodiment of the present invention may directly include a CAP message. According to another embodiment, an emergency alert message may include information on a path through which a CAP message is delivered. Also, the emergency alert message may be included in the EAT and transmitted.

As shown in FIG. 26, an emergency alert message according to an embodiment of the present invention may include identifier information for identifying an EAS message. According to a specific embodiment, identifier information may be an EAS_message_id field. In this case, the EAS_message_id field may be 32 bits.

Additionally, a syntax for emergency alert message may include information representing the version of IP. In this case, the version information may be an EAS_IP_version_flag field. According to a specific embodiment, when a value of the EAS_IP_version_flag field is 0, this represents that an IP version is IPv4. According to another embodiment, when a value of the EAS_IP_version_flag field is 1, this represents that an IP version is IPv6. The EAS_IP_version_flag field may be 1 bit.

Additionally, the emergency alert message may include information representing a transfer type of an EAS message. In this case, the EAS message transfer type may be an EAS_message_transfer_type field. The EAS_message_transfer_type field may be 3 bits.

According to a specific embodiment, the EAS_message_transfer_type field may represent that the transfer type of an EAS message (i.e., emergency alert message) is not specified. In this case, the EAS_message_transfer_type field may have a value of 000(2).

According to another embodiment, the EAS_message_transfer_type field may represent that the transfer type of an EAS message is a type that does not include an alert message. That is, an EAT transmitted through a broadcast signal may represent that it includes only information on audio/video contents without an alert message. In this case, the EAS_message_transfer_type field may have a value of 001(2).

According to another embodiment, the EAS_message_transfer_type field may represent that an EAS message is included in an EAT and transferred. In this case, the EAS_message_transfer_type field may have a value of 010(2).

Furthermore, when the EAS_message_transfer_type field has a value of 010(2), a table including an EAS message may represent the length of an EAS message. In this case, information representing the length of an EAS message may be an EAS_message_length field. The EAS_message_length field may be 12 bits. Additionally, when the EAS_message_transfer_type field has a value of 010(2), a table including an EAS message may additionally include information on an EAS message.

According to another embodiment, the EAS_message_transfer_type field may represent that an EAS message is transferred in an IP datagram format through a data pipe corresponding to a physical layer pipe. In this case, the EAS_message_transfer_type field may have a value of 011(2). Furthermore, when the EAS_message_transfer_type field has a value of 011(2), a table including an emergency alert message may additionally include at least one of IP address information for obtaining an IP datagram, UDP port information, and information on a transferred physical layer frame.

Additionally, an emergency alert message may include information representing the encoding type of an EAS message. In this case, information on the encoding type of an EAS message may be an EAS_message_encoding_type field. The EAS_message_encoding_type field may be 3 bits.

According to a specific embodiment, the EAS_message_encoding_type field may represent that the encoding type of an EAS message is not specified. In this case, the EAS_message_encoding_type field may have a value of 000(2).

According to another embodiment, the EAS_message_encoding_type field may represent that an EAS message is not encoded. In this case, the EAS_message_encoding_type field may have a value of 001(2).

According to another embodiment, the EAS_message_encoding_type field may represent that an EAS message is encoded by a DEFLATE algorithm. The DEFLATE algorithm is a lossless compression data format. In this case, the EAS_message_encoding_type field may have a value of 010(2).

Additionally, an emergency alert message may represent whether information on NRT content relating to a received EAS message and additional data is included in an emergency alert table. In this case, information representing whether NRT content and additional content exist may be an EAS_NRT_flag field. The EAS_NRT_flag field may be 1 bit.

In a specific embodiment, when the EAS_NRT_flag field is set to 0, this represents that NRT content information relating to the received EAS message is not included in an emergency alert table. In another embodiment, when the EAS_NRT_flag field is set to 1, this represents that NRT content information relating to the received EAS message is included in an emergency alert table.

FIG. 27 is a diagram illustrating a syntax for automatic channel tuning information according to an embodiment of the present invention. When related audio/video content is transmitted simultaneously with an emergency alert message, the automatic channel tuning information includes information for automatically tuning to a channel thorough which audio/video content related to an emergency alert is transmitted. That is, when a channel displayed on the current broadcast receiving apparatus 70 does not include content including an emergency alert message, automatic channel tuning information is information for automatically tuning to a channel through which audio/video content related to an emergency alert is transmitted. In a specific embodiment, when the automatic_tuning_flag field of FIG. 25 is enabled, an emergency alert table includes automatic channel tuning information. For example, when the automatic_tuning_flag field is 1, an emergency alert table includes automatic channel tuning information.

In an embodiment, a table for automatic channel tuning information may represent information on a channel number for channel tuning. In more detail, it may represent information on a channel including content relating to emergency alert information. In this case, tuning channel number information may be an automatic_tuning_channel_number field. According to a specific embodiment, the automatic_tuning_channel_number field may be 8 bits.

In another embodiment, a table for automatic channel tuning information may represent path information for receiving content relating to an emergency alert message. In more detail, a table for automatic channel tuning information may represent information for identifying a physical layer frame including audio/video content relating to an emergency alert message. In this case, corresponding information may be an automatic_tuning_DP_id field. The automatic_tuning_DP_id field may be 8 bits.

In another embodiment, a table for automatic channel tuning information may represent identification information on content relating to an emergency alert message. In more detail, it may represent service ID information on content relating to an emergency alert message. In this case, corresponding information may be an automatic_tuning_service_id field. The automatic_tuning_service_id field may be 16 bits.

FIG. 28 is a diagram illustrating a syntax for NRT service information related to an emergency alert message according to an embodiment of the present invention. Herein, the NRT service information includes information for obtaining NRT data relating to an emergency alert message. When the EAS_NRT_flag field of FIG. 26 is enabled, the NRT service information may be included in an EAT. For example, when the EAS_NRT_flag field has a value of 1, the NRT service information may be included in an EAT.

When NRT content and data relating to an emergency alert message are transmitted to the broadcast receiving apparatus 70, the NRT service information includes identifier information on a corresponding NRT service. At this point, the identifier information on NRT service may be an EAS_NRT_service_id field. The EAS_NRT_service_id field may be 16 bits.

FIG. 29 illustrates the syntax structure of an EAT of a section format for transmitting an emergency alert message according to one embodiment of the present invention. While the EAT section is illustrated as being drafted in the form of an MPEG-2 private section, the format of the data in the EAT section may have any form.

Hereinafter, the fields transmittable through the EAT section will be described.

The table_id field (8 bits) is a field to identify the type of the table. Through this field, it may be confirmed that the table is the EAT.

The section_syntax_indicator field (1 bit) is an indicator to define the section form of the EAT. The section format may be, for example, short-form syntax ('0') of MPEG.

The private_indicator field (1 bit) indicates whether the EAT follows the private section.

The section_length field (12 bits) indicates the section length of the remaining EAT subsequent to a corresponding field.

The table_id_extension field (16 bits) is table-dependent, and is a logical portion of the table_id field which provides the range of the remaining fields. The table_id_extension field includes an EAT_protocol_version field.

The EAT_protocol_version field (8 bits) indicates a protocol version to allow the EAT that parameters having a different structure over those defined in a current protocol transmit.

The version_number field (5 bits) indicates the version number of the EAT.

The current_next_indicator field (1 bit) indicates whether the EAT section is currently applicable.

The section_number field (8 bits) indicates the number of a current EAT section.

The last_section_number field (8 bits) indicates the number of the last section configuring the EAT.

The automatic_tuning_flag field (1 bit) indicates whether a channel change is performed automatically.

The num_EAS_message field (7 bits) indicates the number of emergency alert messages in an EAT section.

If the automatic_tuning_flag field is '1', that is, indicates automatic channel change, the EAT further include an automatic_tuning_info( ) field. The automatic_tuning_info( ) field includes information for automatic channel change. For example, the automatic_tuning_info( ) field may include channel information transmitting contents related to emergency alert information, information to identify a physical layer pipe that transmits audio/video contents related to an emergency alert message, and service identification information of contents related to an emergency alert message. Therefore, when it is necessary to tune to a channel number broadcasting an emergency alert message by force, the automatic_tuning_info( ) field can be referred.

Moreover, the emergency_alert_message ( ) field of FIG. 29 is included in 'for' loop, and transmits the number of emergency alert messages corresponding to the value of the num_EAS_messages field. If the EAS_NRT_flag field is '1', the 'for' loop further includes NRT_service_info ( ) field. The NRT_service_info ( ) field transmits NRT service information related to an emergency alert.

FIG. 30 illustrates the syntax structure of a section table for transmitting an emergency alert message according to another embodiment of the present invention.

The table_id field in the emergency alert table of FIG. 30 identifies the type of the current table. The broadcast receiving apparatus may identify that the table is the EAT using the table_id field.

The table_id_extension field includes an EAT_protocol_version field. The EAT_protocol_version field indicates a protocol version to allow the EAT that parameters having a different structure over those defined in a current protocol transmit. Since the fields of the section header correspond to those of FIG. 29, detailed description of the same will be omitted for simplicity.

The automatic_tuning_flag field (1 bit) indicates whether the broadcast reception apparatus automatically performs channel tuning.

The num_EAS_messages field (7 bits) indicates the number of emergency alert messages included in the EAT.

If the automatic_tuning_flag field is "1", that is, indicates automatic channel change, the EAT further include an automatic_tuning_info( ) field. The automatic_tuning_info( ) field includes an automatic_tuning_channel_number field, an automatic_DP_id field, and an automatic_service_id field.

The automatic_tuning_channel_number field (8 bits) indicates channel information including contents related to emergency alert information.

The automatic_DP_id field (8 bits) indicates information to identify a data pipe (i.e., a physical layer pipe) that audio/video contents related to an emergency alert message is included.

The automatic_service_id field (16 bits) indicates service identification information of contents related to an emergency alert message.

Furthermore, 'for' loop may include an EAS_message_id field, an EAS_IP_version_flag field, an EAS_message_t- ransfer_type field, an EAS_message_encoding_type field, and an EAS_NRT_flag field, which are collectively repeated as many times as the num_EAS_messages field.

The EAS_message_id field (32 bits) indicates a unique identification for identify each EAS message. The value of the field may be changed when a previous emergency alert message is changed or cancelled. According to another embodiment of the present invention, the EAS_message_id field may extracted from a CAP message ID.

The EAS_IP_version_flag field (1 bit) indicates an IP version transmitting the EAT. For example, the IP address field includes an IPv4 address when the EAS_IP_version_flag field has a value of '0' and the IP address field includes an IPv6 address when the EAS_IP_version_flag field has a value of '1'.

The EAS_message_transfer_type field (3 bits) indicates an EAS message transfer type. According to an embodiment, the EAS_message_transfer_type field may represent that the transfer type of an EAS message is not specified. In this case, the EAS_message_transfer_type field may have a value of 000(2).

According to another embodiment, the EAS_message_transfer_type field may represent that the transfer type of an EAS message is a type that does not include an alert message. In this case, the EAS_message_transfer_type field may have a value of 001(2).

According to another embodiment, the EAS_message_transfer_type field may represent that an EAS message is included in an EAT and transferred. In this case, the EAS_message_transfer_type field may have a value of 010(2).

Furthermore, when the EAS_message_transfer_type field has a value of 010(2), an EAT including an EAS message may represent the length of an EAS message. In this case, information representing the length of an EAS message may be an EAS_message_length field. The EAS_message_length field may be 12 bits. The EAS_message_length followed by the EAS_message_bytes( ) field transmits an emergency alert message including emergency alert contents and having a length corresponding to the value of the EAS_message_length field.

According to another embodiment, the EAS_message_transfer_type field may represent that an EAS message is transferred in an IP datagram format through a data pipe (or physical layer pipe). In this case, the EAS_message_transfer_type field may have a value of 011(2).

Furthermore, when the EAS_message_transfer_type field has a value of 011(2), an EAT including an emergency alert message may additionally include at least one of an IP_address field (32 or 128 bits) that indicates IP address information for obtaining an IP datagram transmitting the EAS message, a UDP_port_num field (16 bits) that indicates UDP port information transmitting the EAS message, and a DI_id field (8 bits) that indicates identification information of a physical layer frame (i.e., PLP or DP) transmitting the EAS message.

Meanwhile, the EAS_message_encoding_type field (3 bits) indicates information about encoding type of an emergency alert message. According to an embodiment, the EAS_message_encoding_type field may represent that the encoding type of an EAS message is not specified. In this case, the EAS_message_encoding_type field may have a value of 000(2).

According to another embodiment, the EAS_message_encoding_type field may represent that an EAS message is not encoded. In this case, the EAS_message_encoding_type field may have a value of 001(2).

According to another embodiment, the EAS_message_encoding_type field may represent that an EAS message is encoded by a DEFLATE algorithm. The DEFLATE algorithm is a lossless compression data format. In this case, the EAS_message_encoding_type field may have a value of 010(2).

If the EAS_NRT_flag field in the EAT is the EAT further includes an NRT_service_id field. The NRT_service_id field (16 bits) indicates identification information to identify an NRT service related to an emergency alert.

Figure 31:
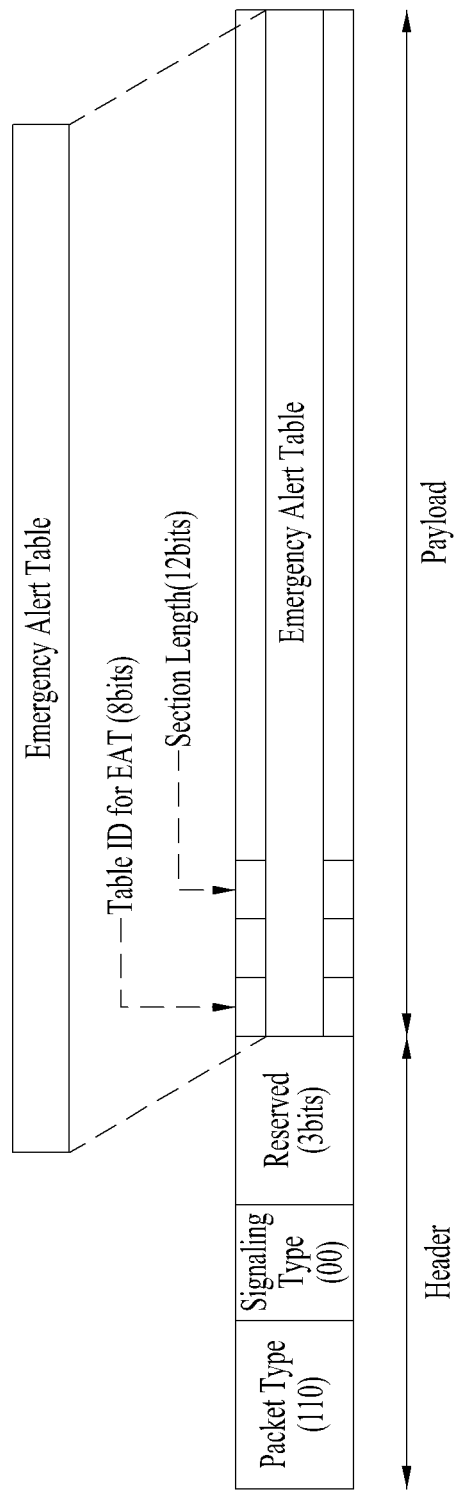
FIG. 31 is a diagram illustrating a payload of a packet without modifying a format of an emergency alert table according to an embodiment of the present invention.
Figure 32:
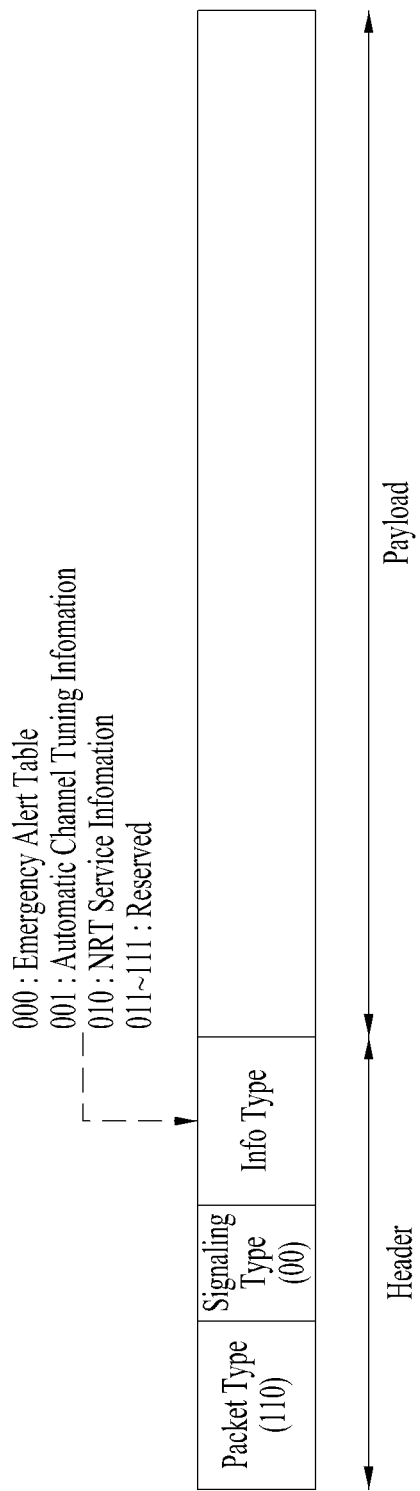
FIG. 32 is a diagram illustrating an emergency alert message inserted as individual information instead of a section table format.

FIGS. 31 and 32 are diagrams of transmitting an emergency alert table in a packet format through a physical layer frame (i.e., a physical layer pipe) according to an embodiment of the present invention.

In general, a broadcast packet includes a packet payload into which data to be transmitted through a corresponding packet is inserted and a packet header into which information for signaling the packet payload is inserted. Therefore, according to an embodiment of the present invention, a broadcast transmitting apparatus may insert an emergency alert message to be transmitted into the payload of a packet and may insert signaling information for signaling the emergency alert message into the header of the packet.

FIG. 31 is a diagram illustrating the payload of a packet without modifying the format of an emergency alert table according to an embodiment of the present invention. As shown in FIG. 31, an emergency alert table is included in the packet payload as it is and additionally, an identifier for the emergency alert table and length information on the emergency alert table.

Additionally, the packet header may include information representing the type of a packet. According to an embodiment, the packet type information may represent that the payload of a packet includes data for emergency alert signaling. In a specific embodiment, the information representing a packet type may be 110(2).

Additionally, the packet header may include information representing the type of signaling data included in the payload of packet. In one embodiment, the signaling data type information may represent that corresponding signaling data is in a section table format. In a specific embodiment, when the signaling data type information has a value of 00(2), it may represent that corresponding signaling data is in a section table format.

FIG. 32 is a diagram illustrating an emergency alert message inserted as individual information instead of a section table format. At this point, the section table refers to an intermediate format for configuring a final table. In more detail, the broadcast receiving apparatus 70 may collect packets to configure a section table and also may collect section tables again to configure a final table. Accordingly, the embodiment of FIG. 32 represents packetizing each field included in an emergency alert message into an additional packet. Accordingly, the broadcast receiving apparatus 70 may obtain completed information from one packet without collecting at least one packet to configure a section table. For example, this may be the case that one packet payload includes only EAT protocol version information or only automatic channel tuning information.

In this case, information representing a packet type may represent that the payload of a packet includes data for emergency alert signaling. In this case, the information representing a packet type may be set to 110(2). Additionally, the information representing a signaling type may represent that data included in a packet payload is in an individual information format. In this case, the information representing a signaling type may be set to 10(2).

Additionally, unlike FIG. 31, since data for an emergency alert included in a packet payload varies, a packet header may additionally include information for identifying this. The corresponding information may be a Info. Type field.

In a specific embodiment, when the Info Type field has a value of 000(2), data for an emergency alert included in a packet payload may be an emergency alert message. In another embodiment, when the Info Type field has a value of 001(2), data for an emergency alert included in a packet payload may be automatic channel tuning information. In another embodiment, when the Info Type field has a value of 010(2), data for an emergency alert included in a packet payload may be NRT service information.

Hereinafter, FIGS. 33 to 39 illustrate diagrams of transmitting an Emergency Alert Table (EAT) according to various embodiments of the present invention. In a specific embodiment, a PLP (or DP) for transmitting an EAT may vary according to an embodiment. This will be described with reference to FIGS. 33 to 39. When the broadcast transmitting apparatus 300 transmits emergency alert information through a physical layer pipe, a broadcast receiving apparatus 70 extracts the emergency alert information from physical layer directly. As a result, the broadcast receiving apparatus 70 obtains emergency alert information promptly.

Figure 33:
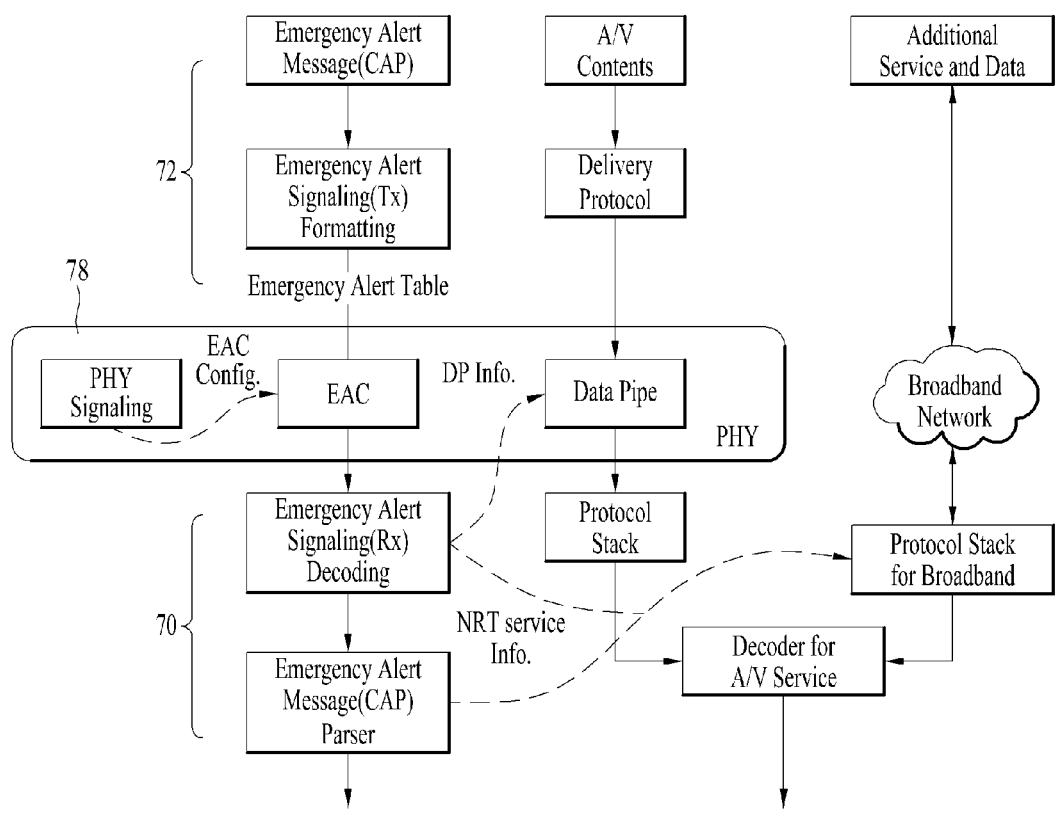
FIG. 33 is a diagram illustrating when a broadcast transmission apparatus transmits an emergency alert message through a dedicated PLP according to an embodiment of the present invention.

FIG. 33 is a diagram when the broadcast transmitting apparatus 300 transmits emergency alert message through a dedicated PLP according to an embodiment of the present invention. Emergency alert message through a dedicated PLP (or DP) includes at least one of an EAT and an transmission packet.

In FIG. 33, a reference number 70 means a broadcast receiving apparatus, a reference number 72 means a broadcast transmitting apparatus, and a reference number 78 means a physical layer processor included in the broadcast transmitting apparatus 72 and the broadcast receiving apparatus 70, respectively. When the physical layer processor 78 is included in the broadcast transmitting apparatus 72, an emergency alert signaling formatting block for the emergency alert message and a delivery protocol block for A/V contents correspond to the physical layer processor 78 according to an embodiment of the present invention. When the physical layer processor 78 is included in the broadcast receiving apparatus 70, an emergency alert signaling decoding block and a parser block for the emergency alert message and a protocol stack and decoder block for A/V contents correspond to the physical layer processor 78 according to an embodiment of the present invention.

According to an embodiment, the broadcast transmitting apparatus 72 may transmit an EAT through a dedicated PLP. At this point, a PLP dedicated for transmitting an EAT may be referred to as an Emergency Alert Channel (EAC). That is, the EAC may be a dedicated PLP for transmitting only an emergency message. Herein, the PLP may be a unit of data transmitted through a physical layer frame. The physical layer may include at least one physical layer frame and a physical layer pipe may be transmitted through the physical layer frame. Hereinafter, this embodiment will be described in more detail with reference to FIG. 33.

The broadcast transmitting apparatus 72 generates an EAT on the basis of emergency information collected from the alert authorities 76. Herein, the emergency alert information received by the broadcast transmitting apparatus 72 may be a CAP message received from an information collection device 74.

Herein, a dedicated PLP, as mentioned above, may be an EAC for transmitting only an EAT or a transmission packet including the EAT. The physical layer processor 78 of the broadcast transmitting apparatus 72 generates a broadcast signal, including the generated EAT. In more detail, a broadcast signal may include a transmission packet including an EAT or a transmission packet including the EAT. Then, the broadcast transmitting apparatus 72 transmits a broadcast signal including an EAC. In more detail, the broadcast transmitting apparatus 72 may transmit a broadcast signal through a dedicated PLP for only a transmission packet including an EAT. The physical layer processor 78 of the broadcast receiving apparatus 70 receives the broadcast signal through the designated PLP. As described above, a PLP may be a dedicated physical layer pipe for transmitting only emergency alert information in a physical layer. Dedicated physical layer pipe may be emergency alert channel. The broadcast receiving apparatus 70 may extract an EAT from a physical layer pipe. Additionally, the decoding and parser block of the broadcast receiving apparatus 70 may obtain from a physical layer, information on whether a physical layer includes an EAC. At this point, information representing whether a physical layer delivering a physical layer frame includes an EAC may be referred to as PHY signaling. The broadcast receiving apparatus 70 may determine a data pipe transmitting emergency alert information on the basis of the PHY signaling. The decoding block of the broadcast receiving apparatus 70 decodes the physical layer pipe including an EAT. At this point, the broadcast receiving apparatus 70 may obtain a CAP message, related content information, and related NRT service information through a physical layer pipe.

The parser block of the broadcast receiving apparatus 70 may parse the obtained CAP message to obtain emergency alert information. In a specific embodiment, the parser block (i.e., a CAP parser) may parse the CAP message. In this case, the broadcast receiving apparatus 70 may obtain related NRT service information together with emergency alert information. If there is overlapping information in the EAT and CAP messages, the broadcast transmitting apparatus 72 may adjust this while configuring an EAT.

The protocol stack block of the broadcast receiving apparatus 70 may receive audio/video content on the basis of obtained related content information. In more detail, the obtained related content information may be information for identifying a PLP that transmits audio/video content. Furthermore, the obtained related content information may be information for identifying audio/video content.

The protocol stack block of the broadcast receiving apparatus 70 identifies a PLP including related content on the basis of related content information. Then, the decoding block of the broadcast receiving apparatus 70 obtains audio/video content by decoding the identified PLP. At this point, a PLP for transmitting related content may be distinguished from a PLP for transmitting emergency alert information. Additionally, the broadcast receiving apparatus 70 may obtain an NRT service relating to emergency alert information on the basis of the obtained NRT service information. In more detail, the broadcast receiving apparatus 70 may obtain address information for obtaining NRT service from the NRT service information. At this point, the broadcast receiving apparatus 70 may receive NRT service through broadband.

The broadcast receiving apparatus 70 provides the obtained emergency alert message together with audio/video content. If information on automatic channel tuning is transmitted, the broadcast receiving apparatus 70 may provide an emergency alert message as changing automatically a channel included in information on automatic channel change.

Figure 34:
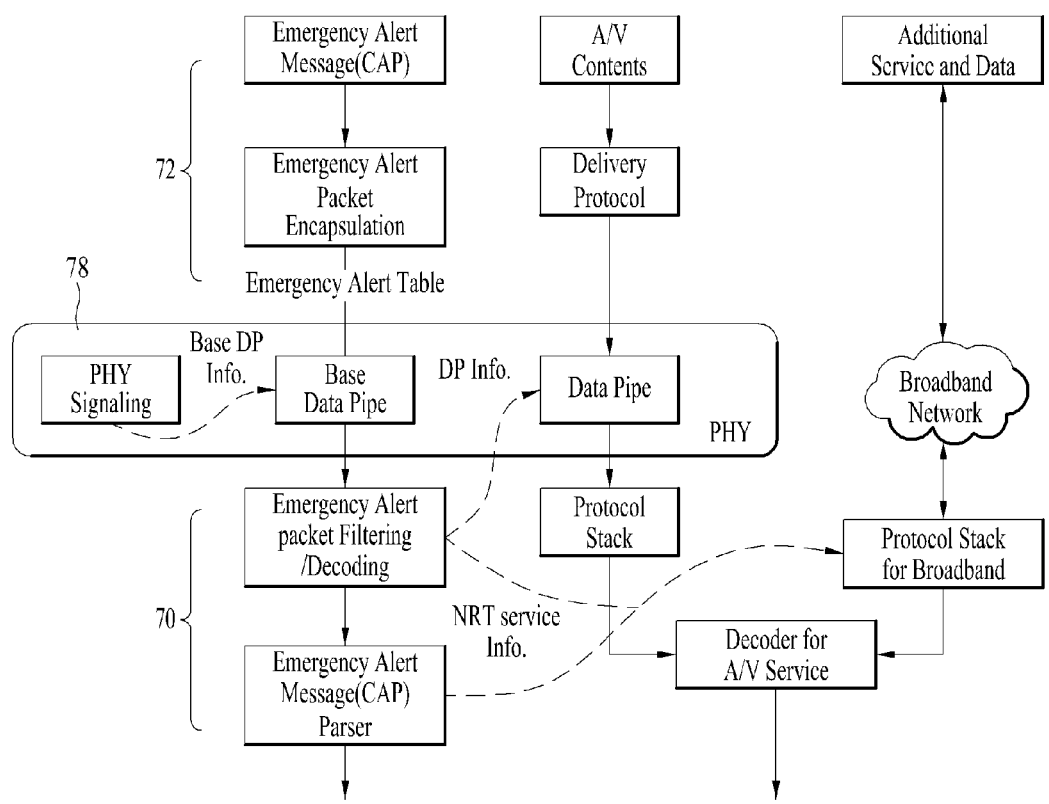
FIG. 34 is a diagram illustrating when a broadcast transmission apparatus transmits an emergency alert message through a dedicated PLP according to another embodiment of the present invention.
Figure 35:
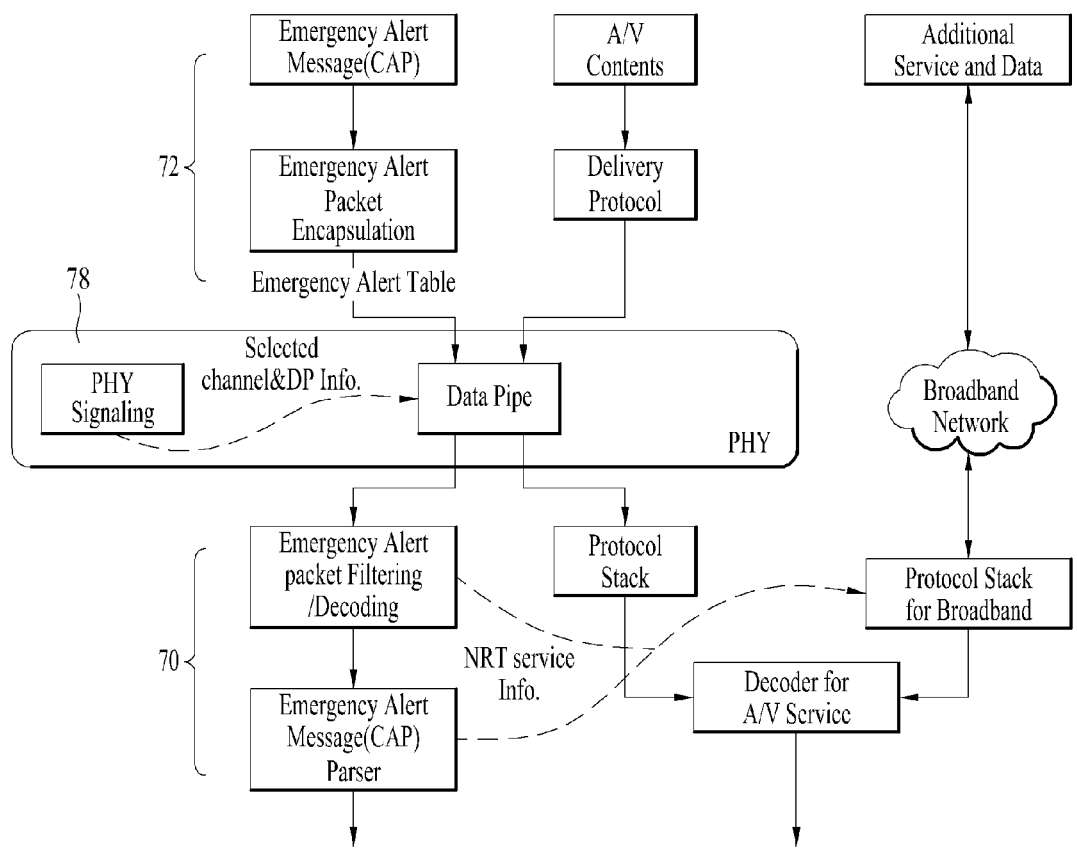
FIG. 35 is a diagram illustrating when a broadcast transmission apparatus transmits an EAT through a normal PLP according to another embodiment of the present invention.

FIGS. 34 and 35 are diagrams when the broadcast transmitting apparatus 72 encapsulates an ET in a packet and transmits the packet according to an embodiment of the present invention. A packet including an ET may be referred to as an emergency alert packet.

In an embodiment, a PLP included in a physical layer of a broadcast signal may exist in plurality. Additionally, there may be an additional PLP for transmitting specific information on a plurality of broadcast services transmitted through a plurality of PLPs included in a physical layer of a broadcast signal. At this point, an additional PLP for transmitting broadcast service information may be referred to as a basic data pipe. In more detail, the broadcast transmitting apparatus 72 may transmit signaling information on a broadcast service or common data applied to a plurality of broadcast services through a basic data pipe. Herein, the signaling information or the common data may be information for signaling a physical layer pipe transmitted through a physical layer or data commonly applied to a physical layer pipe.

FIG. 34 illustrates that the broadcast transmitting apparatus 72 transmits the emergency alert message through a basic data pipe according to an embodiment of the present invention.

In FIG. 34, a reference number 70 means a broadcast receiving apparatus, a reference number 72 means a broadcast transmitting apparatus, and a reference number 78 means a physical layer processor included in the broadcast transmitting apparatus 72 and the broadcast receiving apparatus 70, respectively. When the physical layer processor 78 is included in the broadcast transmitting apparatus 72, an emergency alert packet encapsulation block for the emergency alert message and a delivery protocol block for A/V contents correspond to the physical layer processor 78 according to an embodiment of the present invention. When the physical layer processor 78 is included in the broadcast receiving apparatus 70, a filtering/decoding block and a CAP parser block for the emergency alert message and a protocol stack and decoder block for A/V contents correspond to the physical layer processor 78 according to an embodiment of the present invention.

The emergency alert packet encapsulation block of the broadcast transmitting apparatus 72 generates a packet to be transmitted through a physical layer by encapsulating emergency information collected from the alert authorities 76. At this point, the emergency alert information encapsulated packet may be referred to as an emergency alert packet. Herein, the emergency alert information received by the broadcast transmitting apparatus 72 may be a CAP message received from an information collection device 74.

In an embodiment, the emergency alert packet may include a packet header and a packet payload. In a specific embodiment, the packet payload may include an EAT as it is. In a specific embodiment, the packet payload may include some information in an EAT. Herein, the some information may be information of which importance is high in the EAT.

Additionally, the packet header may include signaling information representing the data included in the packet payload is emergency alert information. Additionally, the packet header may signal that a transmission packet includes emergency alert information. In more detail, the packet header may represent that a transmission packet includes emergency alert information, by including different type information than a general packet. That is, the packet header may represent that a transmission packet is an emergency alert packet.

The physical layer processor 78 of the broadcast transmitting apparatus 72 transmits an EAT encapsulated packet through a PLP for transmitting signaling information on broadcast service or common data. That is, the broadcast transmitting apparatus 72 transmits an emergency alert packet through a basic data pipe. In this case, the basic data pipe, as one format of a PLP, may be distinguished from another PLP (or a data pipe).

On the other hand, a physical layer including a basic data pipe may transmit information for signaling that a basic data pipe exists in the physical layer. At this point, the information for signaling that a basic data pipe exists may be referred to as PHY signaling. The broadcast receiving apparatus 70 may determine that a data pipe exists in a physical layer of a broadcast signal on the basis of the PHY signaling. Then, the physical layer processor 78 of the broadcast receiving apparatus 70 may obtain emergency alert information through a basic data pipe that is one format of a PLP. At this point, the obtained emergency alert information may be in a format of an emergency alert packet. The broadcast receiving apparatus 70 receives the broadcast signal through the basic data pipe. That is, the broadcast receiving apparatus 70 receives an emergency alert packet through a basic data pipe.

The filtering and decoding block of the broadcast receiving apparatus 70 may extract a physical layer pipe including an emergency alert packet from the received broadcast signal. At this point, physical layer pipe included in a emergency alert packet may be base data pipe. Then, the filtering and decoding block of the broadcast receiving apparatus 70 may obtain emergency alert information by decoding the extracted physical layer pipe. In more detail, the emergency alert information may be obtained by decoding an emergency alert packet included in a physical layer pipe.

At this point, the emergency alert packet may include a packet payload having an EAT inserted and a packet header signaling the packet payload. In a specific embodiment, the broadcast receiving apparatus 70 may determine whether a corresponding packet includes emergency alert information from the packet header. That is, the broadcast receiving apparatus 70 may determine whether a corresponding packet is an emergency alert packet on the basis of information extracted from a packet header.

Additionally, the broadcast receiving apparatus 70 may determine the type of emergency alert information included in a packet payload from a packet header. For example, a determination may be made on whether a packet payload includes an entire EAT.

The broadcast receiving apparatus 70 may obtain emergency alert information from a packet payload on the basis of information obtained from a packet header. Herein, the obtained emergency alert information may be an EAT or a CAP message. Additionally, it may be content information related to an emergency alert or NRT service information related to an emergency alert.

The CAP parser block of the broadcast receiving apparatus 70 may obtain emergency alert information by parsing the obtained CAP message. In this case, the broadcast receiving apparatus 70 may obtain related NRT service information together with emergency alert information. If there is overlapping information in the EAT and CAP messages, the broadcast transmitting apparatus 72 may omit the overlapping part while configuring an EAT. Hereinafter, a process of obtaining related service on the basis of emergency alert information is the same as the above and thus is omitted.

FIG. 35 is a diagram when the broadcast transmitting apparatus 72 transmits an EAT through a normal PLP according to an embodiment of the present invention. Herein, the normal PLP is a PLP of which purpose is not specified.

This embodiment is the case that a basic data pipe is not included in a physical layer unlike the embodiment of FIG. 34 and a difference compared to FIG. 34 will be mainly described below. That is, the physical layer processor 78 of FIG. 34 is different from that of FIG. 34

In this embodiment, the emergency alert packet encapsulation block of the broadcast transmitting apparatus 72 configures a packet header differently from a normal packet header while encapsulating emergency alert information. In more detail, the broadcast transmitting apparatus 72 may differently set a value representing a packet type included in a packet header. For example, a normal packet sets a corresponding value to 000(2) and an emergency alert packet sets a corresponding value to a value of 110(2) so that each packet may be identified.

On the other hand, the physical layer processor 78 of the broadcast transmitting apparatus 72 may transmit information that signals a physical layer pipe within a physical layer. At this point, the information for signaling a PLP may be referred to as PHY signaling.

The physical layer processor 78 of the broadcast receiving apparatus 70 may obtain information on a PLP included in a received physical layer on the basis of the PHY signaling.

In the embodiment of FIG. 35, the broadcast receiving apparatus 70 may receive a packet including an emergency alert and a packet including broadcast content through a plurality of PLPs included in a physical layer. Additionally, the broadcast receiving apparatus 70 may obtain emergency alert information from a packet including emergency information. Additionally, the broadcast receiving apparatus 70 identifies another PLP for transmitting a broadcast content relating to an emergency alert on the basis of the emergency alert information. Additionally, the broadcast receiving apparatus 70 may obtain path information for receiving an NRT content relating to an emergency alert on the basis of the emergency alert information.

Figure 36:
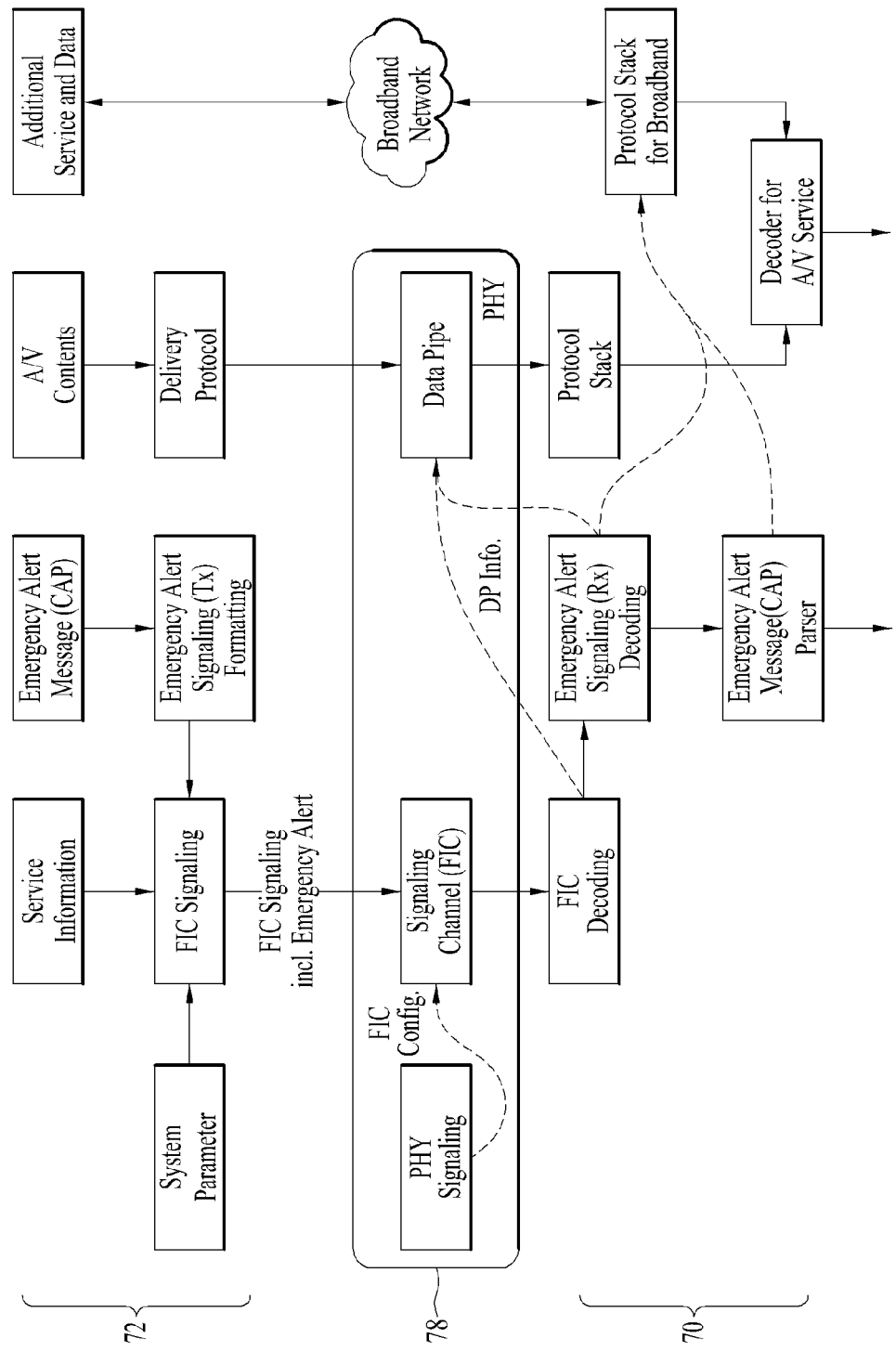
FIG. 36 is a block diagram illustrating an emergency alert system for directly transmitting an emergency alert message through a signaling channel according to an embodiment of the present invention.

FIGS. 36 and 39 are diagrams when the broadcast transmitting apparatus 72 transmits emergency alert information through a PLP according to another embodiment of the present invention. In this case, the other PLP may be a PLP for broadcast service scan included in a physical layer of a broadcast signal. In more detail, the broadcast transmitting apparatus 72 may transmit service signaling information for broadcast service scan to a physical layer of a broadcast signal through a PLP without going through another layer. At this point, the PLP for broadcast service scan may be referred to as a signaling channel. The broadcast receiving apparatus 70 may obtain at least one of configuration information on broadcast stream, simple broadcast service information, and component information from a signaling channel. In a specific embodiment, the signaling channel may be one of a Fast Information Channel (FIC) and Low Layer Signaling (LLS). The FIC may be referred to as an FIT or an SLT.

In an embodiment of the present invention, the broadcast transmitting apparatus 72 may transmit a CAP message based emergency alert message through a signaling channel. This embodiment will be described in more detail with reference to FIGS. 36 and 37.

In FIG. 36, a reference number 70 means a broadcast receiving apparatus, a reference number 72 means a broadcast transmitting apparatus, and a reference number 78 means a physical layer processor included in the broadcast transmitting apparatus 72 and the broadcast receiving apparatus 70, respectively. When the physical layer processor 78 is included in the broadcast transmitting apparatus 72, an emergency alert signaling formatting block for the emergency alert message, an FIC signaling block for signaling channel information, and a delivery protocol block for A/V contents correspond to the physical layer processor 78 according to an embodiment of the present invention. When the physical layer processor 78 is included in the broadcast receiving apparatus 70, an emergency alert signaling decoding block and a CAP pars block for the emergency alert message, an FIC decoding block for the signaling channel information, and a protocol stack and decoder block for A/V contents correspond to the physical layer processor 78 according to an embodiment of the present invention.

Figure 38:
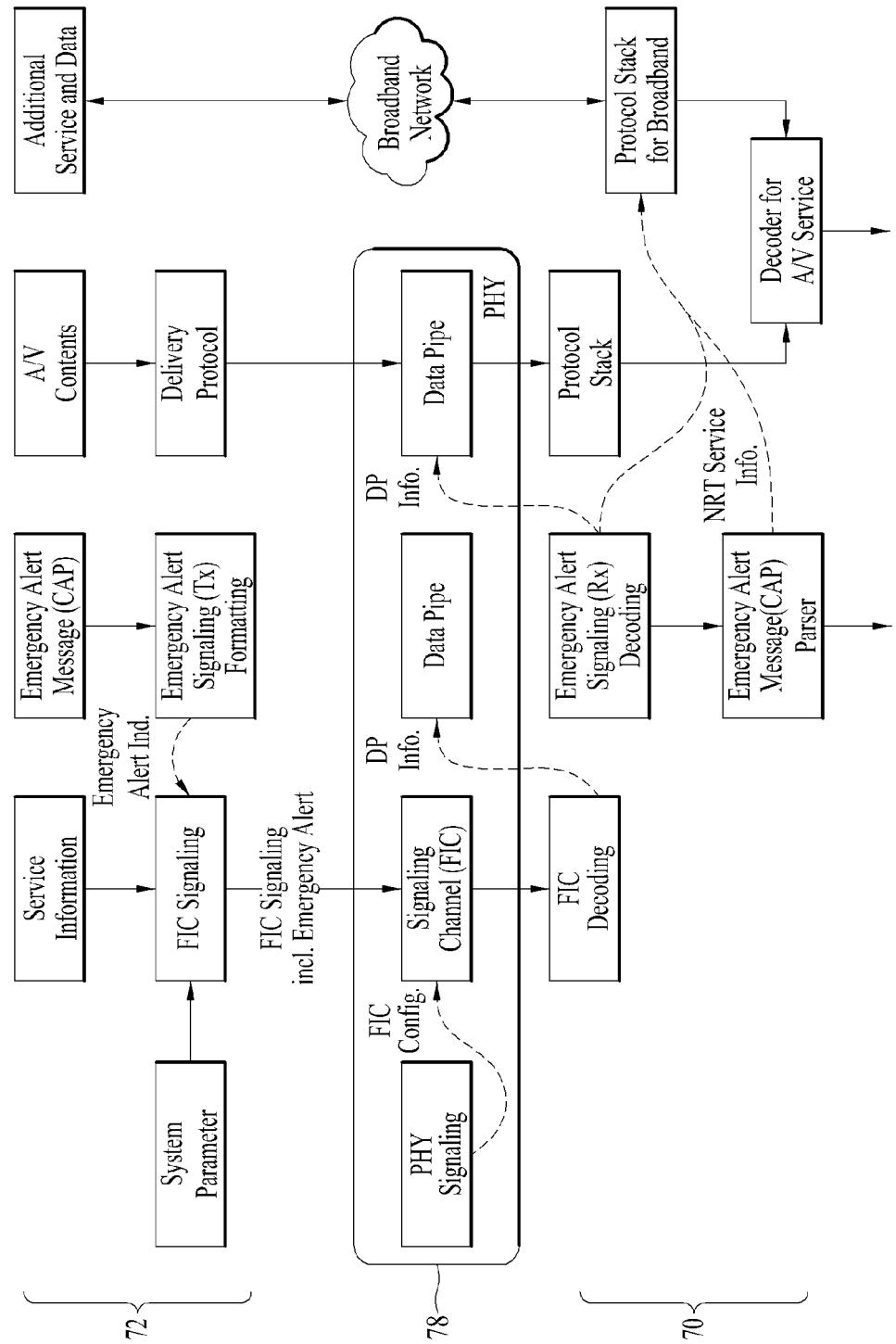
FIG. 38 is a block diagram illustrating an emergency alert system for transmitting/receiving only a delivery path of emergency alert information through a signaling channel according to an embodiment of the present invention.

In another embodiment of the present invention, the broadcast transmitting apparatus 72 may transmit the minimum information for indicating an emergency alert through a signaling channel and may transmit an actual emergency alert message (for example, an EAT) through a PLP distinguished from a signaling channel. This embodiment will be described in more detail with reference to FIGS. 38 and 39. That is, the physical layer processor 78 of FIG. 38 is different from that of FIG. 36.

FIG. 36 is a block diagram illustrating an emergency alert system for directly transmitting an emergency alert message through a signaling channel according to an embodiment of the present invention.

The emergency alert signaling formatting block of the broadcast transmitting apparatus 72 generates an EAT on the basis of emergency information collected from the alert authorities 76. Herein, the emergency alert information received by the broadcast transmitting apparatus 72 may be a CAP message received from an information collection device 74.

The physical layer processor 78 of the broadcast transmitting apparatus 72 generates a broadcast signal including the generated EAT. In more detail, an EAT may be transmitted through a signaling channel that is one format of a PLP of a broadcast signal. At this point, the signaling channel may refer to a general signaling channel that is not the dedicated signaling channel described in the embodiment of FIG. 33. Then, the broadcast transmitting apparatus 72 transmits a broadcast signal including emergency alert information through a signaling channel.

The physical layer processor 78 of the broadcast receiving apparatus 70 may obtain emergency alert information from a broadcast signal received through a signaling channel. In more detail, the obtained emergency alert information may be an EAT. The decoding block of the broadcast receiving apparatus 70 decodes the signaling channel. At this point, the broadcast receiving apparatus 70 may obtain a CAP message, content information related to an emergency alert, and NRT service information related to an emergency alert from a signaling channel.

The CAP parser block of the broadcast receiving apparatus 70 may obtain emergency alert information by parsing the obtained CAP message. In this case, the broadcast receiving apparatus 70 may obtain NRT service information related to an emergency alert together with emergency alert information. If there is overlapping information in the EAT and CAP messages, the broadcast transmitting apparatus 72 may omit the overlapping part while configuring an EAT. Hereinafter, a process of obtaining related service on the basis of emergency alert information is the same as the above and thus is omitted.

FIG. 37 is a diagram illustrating a syntax for transmitting an emergency alert message through a fast information channel (FIC) of signaling channels according to an embodiment of the present invention.

The FIT_data_version field (8 bits) may indicate version information about syntax and semantics contained in the fast information table. The receiver may determine whether signaling contained in the corresponding fast information table is processed, using the FIT_data_version field. The receiver may determine whether information of pre-stored FIC is updated, using the information.

The num_broadcast field (8 bits) may indicate the number of broadcasters that transmit a broadcast service and/or content through a corresponding frequency or a transmitted transport frame.

The emergency_alert_flag field (1 bit) indicates whether signaling information related to an emergency alert is included in a corresponding FIC. For example, when the emergency_alert_flag field is '0', the field indicates that the corresponding FIC does not include signaling information related to an emergency alert. When the emergency_alert_flag field is '1', the field indicates that the corresponding FIC includes signaling information related to an emergency alert.

The signaling information related to an emergency alert may include information related to automatic channel change. Furthermore, when the emergency_alert_flag field is '1', an emergency alert message and/or NRT service information related to an emergency alert may be transmitted through the corresponding FIC. For this, when the emergency_alert_flag field is '1', the corresponding FIC includes an automatic_tuning_flag field and a num_EAS_messages field, and information for automatic channel change, an emergency alert message, and NRT service information and so on.

The automatic_tuning_flag field (1 bit) indicates whether the broadcast reception apparatus automatically performs channel tuning.

The num_EAS_messages field (7 bits) indicates the number of emergency alert messages included in the FIC.

If the automatic_tuning_flag field is '1', that is, indicates automatic channel change, the FIC further include an automatic_tuning_info( ) field. The automatic_tuning_info( ) field includes information for automatic channel change. For example, the automatic_tuning_info( ) field may include at least one of channel information transmitting contents related to emergency alert information, information to identify a physical layer pipe that transmits audio/video contents related to an emergency alert message, and service identification information of contents related to an emergency alert message. Therefore, when it is necessary to tune to a channel number broadcasting an emergency alert message by force, the automatic_tuning_info( ) field can be referred.

Moreover, the emergency_alert_message ( ) field transmits the number of emergency alert messages corresponding to the value of the num_EAS_messages field. The NRT_service_info ( ) field transmits NRT service information related to an emergency alert.

Meanwhile, the broadcast_id field (16 bits) may indicate a unique identifier of a broadcaster that transmits a broadcast service and/or content through a corresponding frequency or a transmitted transport frame. In the case of a broadcaster that transmits MPEG-2 TS-based data, the broadcast_id field may have a value such as transport_stream_id of MPEG-2 TS.

The delivery_system_id field (16 bits) may indicate an identifier for a broadcast transmission system that applies and processes the same transmission parameter on a broadcast network that performs transmission.

The base_DP_id field (8 bits) is information for identification of a base DP (or PLP) in a broadcast signal. The base DP may refer to a DP that transmits service signaling including overhead reduction and/or program specific information/system information (PSI/SI) of a broadcaster corresponding to the broadcast_id field. Alternatively, the base_DP_id information may refer to a representative DP (or PLP) that can decode a component included in a broadcast service in the corresponding broadcaster.

The base_DP_version field (5 bits) may refer to version information about data transmitted through a base DP. For example, when service signaling such as PSI/SI and so on is transmitted through the base DP, if service signaling is changed, a value of the base_DP_version field may be increased one by one.

The num_service field (8 bits) may refer to the number of broadcast services transmitted from a broadcaster corresponding to the broadcast_id field in a corresponding frequency or a transport frame.

The service_id field (16 bits) may be used as an identifier for identification of a broadcast service.

The service_category field (8 bits) may refer to a category of a broadcast service. According to a value of a corresponding field, the service_category field may have the following meaning. When a value of the service_category field is 0x01, the service_category field may refer to a basic TV, when the value of the service_category field is 0x02, the service_category field may refer to a basic radio, when the value of the service_category field is 0x03, the service_category field may refer to an RI service, when the value of the service_category field is 0x08, the service_category field may refer to a service guide, and when the value of the service_category field is 0x09, the service_category field may refer to emergency alerting.

The service_hidden_flag field (1 bit) may indicate whether a corresponding broadcast service is hidden. When the service is hidden, the broadcast service may be a test service or a self-used service and may be processed to be disregarded or hidden from a service list by a broadcast receiver.

The SP_indicator field (1 bit) may indicate whether service protection is applied to one or more components in a corresponding broadcast service.

The num_component field (8 bits) may indicate the number of components included in a corresponding broadcast service.

The component_id field (8 bits) may be used as an identifier for identification of a corresponding component in a broadcast service.

The DP_id field (16 bits) may be used as an identifier indicating a DP (or PLP) that transmits a corresponding component.

The RoHC_init_descriptor ( ) may include information associated with overhead reduction and/or header recovery. When a corresponding component in a broadcast service is compressed, more particularly, the header of the packet that transmits a corresponding component is compressed by the RoHC scheme, the RoHC_init_descriptor may include compression information for decompression the corresponding component in the broadcast reception apparatus.

FIG. 38 is a block diagram illustrating an emergency alert system for transmitting/receiving only a delivery path of emergency alert information through a signaling channel according to an embodiment of the present invention. That is, the emergency alert message is not transmitted through the signaling channel.

For this, the broadcast transmitting apparatus 72 signals emergency alert information collected from the alert authorities 76 in a transmittable format.

In more detail, the broadcast transmitting apparatus 72 may configure emergency alert information (for example, a CAP message and related data) with a table, a descriptor, or a packet. At this point, when the broadcast transmitting apparatus 72 does not include a module for additional emergency alert signaling, it may signal emergency alert information (or emergency alert signaling information) in a transmittable format through a general signaling module.

The broadcast transmitting apparatus 72 may insert information on whether to transmit an emergency alert message and information on a path through which the emergency alert message is transmitted, together with the emergency alert information, in to a table or a transmission packet including the table. At this point, the information on whether to transmit an emergency alert message and a transmission path may be referred to as an emergency alert indicator. A descriptor included in a table or a transmission packet may include an emergency alert indicator. Additionally, a table included in a physical layer frame may include an emergency alert indicator as one field. Information in an emergency alert indicator may be included as an individual field if necessary and information having a high priority may be included according to a priority. Herein, the priority may be defined by each information according to the importance in transmitting an emergency alert message.

The physical layer processor 78 of the broadcast transmitting apparatus 72 transmits an emergency alert indicator and related data through a signaling channel. Additionally, the physical layer processor 78 of the broadcast transmitting apparatus 72 may transmit information relating to an emergency alert through a PLP instead of a signaling channel. At this point, the PLP that is not a signaling channel may be referred to as a general PLP.

Additionally, emergency alert related data transmitted by the broadcast transmitting apparatus 72 may be path information for obtaining emergency alert information from a physical layer pipe. In more detail, the emergency alert related data may be information for identifying a data pipe corresponding to a general PLP for transmitting emergency alert information.

The physical layer processor 78 of the broadcast receiving apparatus 70 receives an emergency alert indicator and related data through a signaling channel. Additionally, a physical layer may include information representing whether there is a signaling channel for transmitting emergency alert information in a physical layer of a broadcast signal. At this point, the information representing whether there is a signaling channel may be referred to as PHY signaling. The broadcast receiving apparatus 70 checks whether there is a signaling channel in a physical layer on the basis of the PHY signaling and receives an emergency alert indicator and related data from a signaling channel.

The broadcast receiving apparatus 70 may decode a signaling channel through an emergency alert signaling decoder and may obtain an emergency alert indicator and related data from the signaling channel.

The broadcast receiving apparatus 70 obtains delivery path information of an emergency alert message on the basis of an emergency alert indicator and related data obtained from a signaling channel. In more detail, the broadcast receiving apparatus 70 may obtain information on a PLP for transmitting an emergency alert message from an emergency alert indicator. In more detail, the broadcast receiving apparatus 70 may obtain identification information for identifying a PLP for transmitting an emergency alert message from an emergency alert indicator.

The broadcast receiving apparatus 70 decodes a packet transmitted through the identified PLP on the basis of an emergency alert indicator.

In a specific embodiment, the broadcast receiving apparatus 70 may determine whether a corresponding packet includes emergency alert information on the basis of the packet header. Additionally, the broadcast receiving apparatus 70 may determine the type of emergency alert information included in a packet payload from a packet header. For example, the broadcast receiving apparatus 70 may determine whether a packet payload includes an entire EAT.

The broadcast receiving apparatus 70 may obtain emergency alert information from a packet payload on the basis of information obtained from a packet header. Herein, the obtained emergency alert information may be an EAT or a CAP message. Additionally, the emergency alert information may include related content information or NRT service information.

The CAP parser block of the broadcast receiving apparatus 70 may obtain emergency alert information by parsing the obtained CAP message. In this case, the broadcast receiving apparatus 70 may obtain related NRT service information together with emergency alert information. If there is overlapping information in the EAT and CAP messages, the broadcast transmitting apparatus 72 may omit the overlapping part while configuring an EAT.

The broadcast receiving apparatus 70 may receive audio/video content on the basis of obtained related content information. In more detail, the obtained related content information may be information for identifying a data pipe that transmits audio/video content. Furthermore, the obtained related content information may be information for identifying audio/video content. The broadcast receiving apparatus 70 may identify a data pipe transmitting audio/video content on the basis of related content information. Then, the broadcast receiving apparatus 70 may obtain audio/video content through the identified data pipe and may obtain a content relating to emergency alert information in the obtained audio/video content. At this point, a PLP for transmitting content may be distinguished from a PLP for transmitting emergency alert information. Additionally, the broadcast receiving apparatus 70 may obtain an NRT service relating to emergency alert information on the basis of the obtained NRT service information. In more detail, the broadcast receiving apparatus 70 may obtain address information for obtaining NRT service from the NRT service information. At this point, the broadcast receiving apparatus 70 may receive NRT service through broadband.

The broadcast receiving apparatus 70 provides the obtained emergency alert message together with audio/video content. If information on automatic channel tuning is transmitted together with an emergency alert message, the broadcast receiving apparatus 70 may provide an emergency alert message as changing a channel automatically.

FIG. 39 is a diagram illustrating a syntax for signaling an emergency alert transmitted through a signaling channel according to an embodiment of the present invention: In a specific embodiment, the emergency alert message may be part of a table transmitted through a signaling channel. Additionally, a field shown in FIG. 39 may be changed according to a need in the future.

FIG. 39 shows another example transmitting the emergency alert signaling information transmitted through the FIC of the signaling channels.

The FIC of FIG. 39 are the same as those of the FIC of FIG. 37 except that the FIC of FIG. 39 includes an EAS_message_id field and an EAS_DP_id field instead of an emergency_alert_message ( ) field and an NRT_service_info ( ) field of FIG. 37. Accordingly, a description of the fields of FIG. 39 identical to those of FIG. 37 will be omitted.

The EAS_message_id field (32 bits) of FIG. 39 indicates an identifier for identify an emergency alert message that is transmitted through a data pipe (or PLP) identified by the EAS_DP_id field.

The EAS_DP_id field (16 bits) indicates an identifier for identify a data pipe (or PLP) that transmits an emergency alert message identified by the EAS_message_id field.

Meanwhile, the EAS_message_id field and the EAS_DP_id field of FIG. 39 may be used as an emergency alert indicator that indicates information on whether to transmit an emergency alert message and a transmission path.

Figure 40:
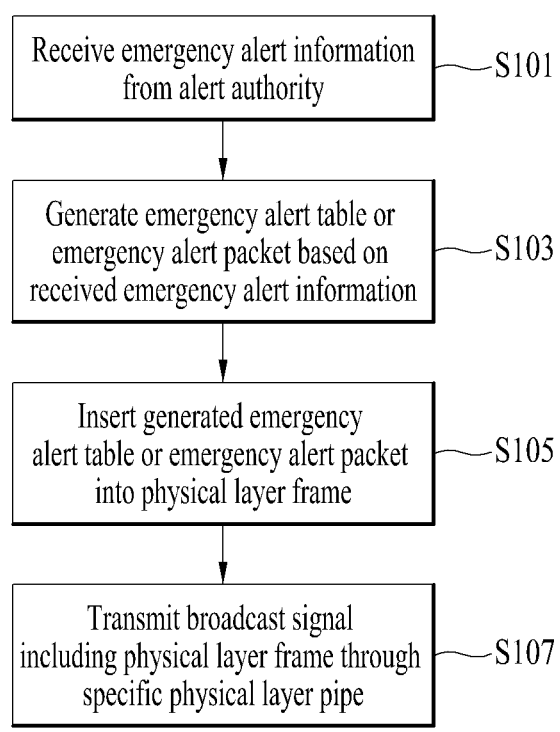
FIG. 40 is a flowchart illustrating an operating method of a broadcast transmission apparatus according to an embodiment of the present invention.

FIG. 40 is a flowchart illustrating an operating method of the broadcast transmitting apparatus 72 according to an embodiment of the present disclosure.

The broadcast transmitting apparatus 72 receives emergency alert information from the alert authorities 76 in operation S101. Herein, the alert authorities 76 may be one of emergency management authorities and agencies concerned. Additionally, the broadcast transmitting apparatus 72 may receive emergency alert information from the information collection device 74. In this case, the broadcast transmitting apparatus 72 may receive emergency alert information processed as a CAP message.

The broadcast transmitting apparatus 72 generates an emergency alert packet including a table with emergency alert information or an EAT on the basis of the received emergency alert information in operation S103. In more detail, the broadcast transmitting apparatus 72 may generate an EAT or an emergency alert packet according to a PLP transmitting emergency alert information.

In an embodiment, when emergency alert information is transmitted through a dedicated PLP, the broadcast transmitting apparatus 72 may generate an EAT including emergency alert information. In this case, according to a first embodiment, an EAT may include all emergency alert information. Additionally, according to a second embodiment, an EAT may include only part of emergency alert information. Herein, part of emergency alert information may include only the minimum information for transmitting entire emergency alert information.

According to another embodiment, the broadcast transmitting apparatus 72 may encapsulate emergency alert information as a packet when the emergency alert information is transmitted through a PLP for packet transmission. The emergency alert information encapsulated packet may be referred to as an emergency alert packet. In an embodiment, the broadcast transmitting apparatus 72 may encapsulate emergency alert information into the payload of a packet. In another embodiment, the broadcast transmitting apparatus 72 may encapsulate the EAT into the payload of a packet.

Additionally, the broadcast transmitting apparatus 72 may encapsulate information for identifying the data of the packet payload into the header of a packet. Additionally, information encapsulated into the header of a packet may be information for notifying that a corresponding packet is a packet including emergency alert information.

The broadcast transmitting apparatus 72 may insert a generated EAT or an emergency alert packet into a physical layer pipe in operation S105. In more detail, the broadcast transmitting apparatus 72 inserts an EAT or an emergency alert packet into a physical layer pipe. At this point, the physical layer may include information representing that the physical layer includes emergency alert information.

When physical alert information is inserted into a physical layer pipe, the broadcast transmitting apparatus 72 transmits a broadcast signal including a physical layer pipe in operation S107. In an embodiment, a specific PLP may be a dedicated PLP for transmitting only emergency alert information. In another embodiment, a specific PLP may be a PLP for transmitting signaling information on broadcast service or common data applied to a plurality of broadcast services. In another embodiment, a specific PLP may be a PLP for transmitting information necessary for service scan including at least one of configuration information on broadcast service, simple broadcast service information, and component information. In another embodiment, a specific PLP may be a normal PLP of which purpose is not specified.

Figure 41:
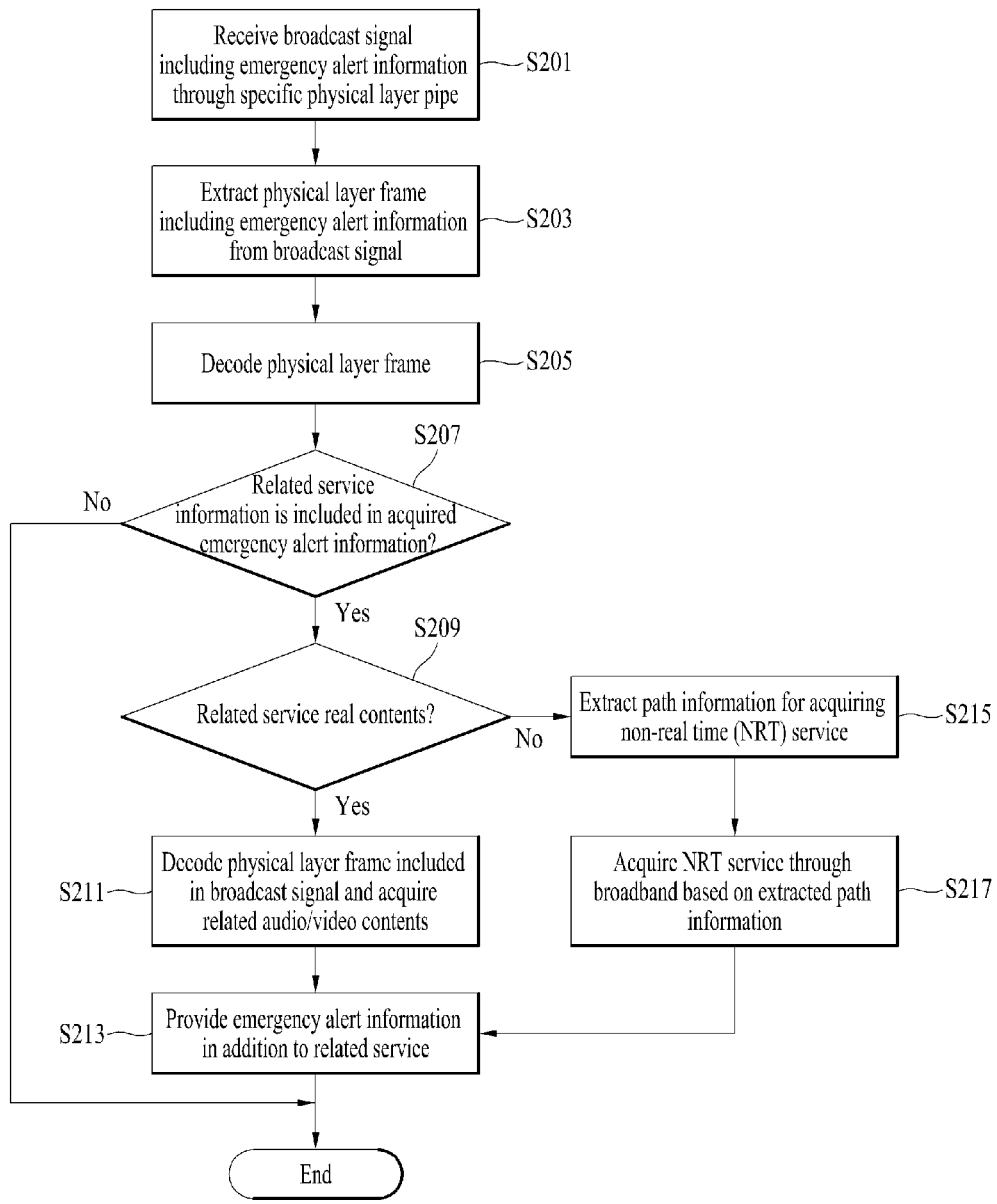
FIG. 41 is a flowchart illustrating an operating method of a broadcast reception apparatus according to an embodiment of the present invention.

FIG. 41 is a flowchart illustrating an operating method of the broadcast receiving apparatus 70 according to an embodiment of the present disclosure.

The broadcast receiving apparatus 70 receives a broadcast signal including emergency alert information through a PLP in operation S201. In an embodiment, a PLP may be a dedicated PLP for transmitting only emergency alert information. In another embodiment, a specific PLP may be a PLP for transmitting signaling information on broadcast service or common data applied to a plurality of broadcast services. In another embodiment, a specific PLP may be a PLP for transmitting at least one of configuration information on broadcast service, simple broadcast service information, and component information. In another embodiment, a specific PLP may be a normal PLP of which purpose is not specified.

The broadcast receiving apparatus 70 may extract a transmission packet including emergency alert information from the received broadcast signal in operation S203. In an embodiment, a transmission packet may include an EAT. In this case, an EAT may include only the minimum information for obtaining emergency alert information. In another embodiment, a transmission packet may include an emergency alert packet. The broadcast receiving apparatus 70 may obtain emergency alert information by decoding the extracted transmission packet in operation S205. In other words, the broadcast receiving apparatus 70 extracts emergency alert information from a transmission packet. In more detail, the emergency alert information may be obtained by decoding an EAT or an emergency alert packet included in a transmission packet. In an embodiment, the broadcast receiving apparatus 70 may decode a transmission packet on the basis of specific information on an EAT or the header of an emergency alert packet. In another embodiment, the broadcast receiving apparatus 70 may decode a transmission packet on the basis of information obtained by decoding an EAT. In more detail, a physical layer pipe transmitting emergency alert information may be identified from an EAT or an identified physical layer pipe may be decoded.

The broadcast receiving apparatus 70 may determine whether related service information is included in the obtained emergency alert information in operation S207. In more detail, the broadcast receiving apparatus 70 determines whether information on related content relating to emergency alert information is included. Herein, the related content may be one of real time content and NRT content.

If it is determined that there is related content, the broadcast receiving apparatus 70 may determine whether the obtained related content information is real time content in operation S209. In more detail, it is determined whether the emergency alert information related content is real time content or NRT content. Herein, the real time content may be audio/video content. Whether it is real time content is determined according to specific information on an EAT. Alternatively, it is determined according to information in the packet header.

When it is determined that related content is real time content, the broadcast receiving apparatus 70 obtains related content by decoding a physical layer pipe transmitting a content in operation S211. In more detail, the emergency alert information may include path information for obtaining related content. Accordingly, the broadcast receiving apparatus 70 may obtain content by identifying a physical layer pipe transmitting related content on the basis of corresponding information.

However, when it is determined that related content is NRT content, the broadcast receiving apparatus 70 extracts path information for obtaining NRT content in operation S215. The information for obtaining NRT content may be address information. For example, it may be URI information.

The broadcast receiving apparatus 70 obtains NRT service through an IP communication unit on the basis of the extracted path information in operation S217. In more detail, the broadcast receiving apparatus 70 obtains NRT service through broadband by using address information.

The broadcast receiving apparatus 70 provides the obtained emergency alert information together with related content in operation S213. In more detail, the broadcast receiving apparatus 70 outputs emergency alert information together with related service. At this point, the related service may be one of real time service and NRT service.

Meanwhile, signaling information for broadcast services in the broadcast transmitting apparatus is transmitted to the physical layer by being included in a payload of the link layer packet, and the physical layer may configure the physical layer packet by means of one or more link layer packets, map the physical layer packet into a specific data pipe (that is, PLP) and then transmit the physical layer packet to a receiving side through a coding and modulation process. In the present invention, the packet of the link layer may be referred to as a generic packet, and the packet of the physical layer may be referred to as a baseband packet.

Particularly, as one embodiment of the present invention, the emergency alert message and/or the emergency alert related signaling information is packetized into the link layer packet, and the link layer packet is again packetized into the physical layer packet, mapped into a specific data pipe and then transmitted to the broadcast receiving apparatus through the coding and modulation process.

If a structure of the link layer packet that enables transmission of signaling information is defined in the system, the structure of the corresponding packet is used as one embodiment of the present invention. At this time, as one embodiment, the existing field or a new field is used to transmit signaling information indicating that the corresponding packet is an emergency alert related packet.

Generally, it is convenient that the signaling information related to the emergency alert message is transmitted at one time, and the signaling information may quickly be delivered to the broadcast receiving apparatus. However, if there is no dedicated data path that can transmit emergency alert information in diagram of a structure of the system, or for a structure that is difficult to transmit every kind of emergency alert information at one time, a method for transmitting emergency alert related information through classification and segmentation of the emergency alert related information based on a certain reference may be used.

Figure 42:
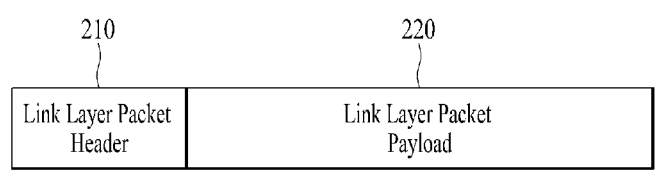
FIG. 42 illustrates a conceptual diagram of a link layer packet according to an embodiment of the present invention.

FIG. 42 illustrates a conceptual diagram of a link layer packet according to one embodiment of the present invention. Referring to FIG. 42, the link layer packet includes a link layer packet header and a link layer packet payload. For convenience of description, the link layer packet header will be used to refer to "header", and the link layer packet payload will be used to refer to "payload".

A header 210 of FIG. 42 may be categorized into a fixed header of 1 byte and an extended header of a variable length.

Figure 43:
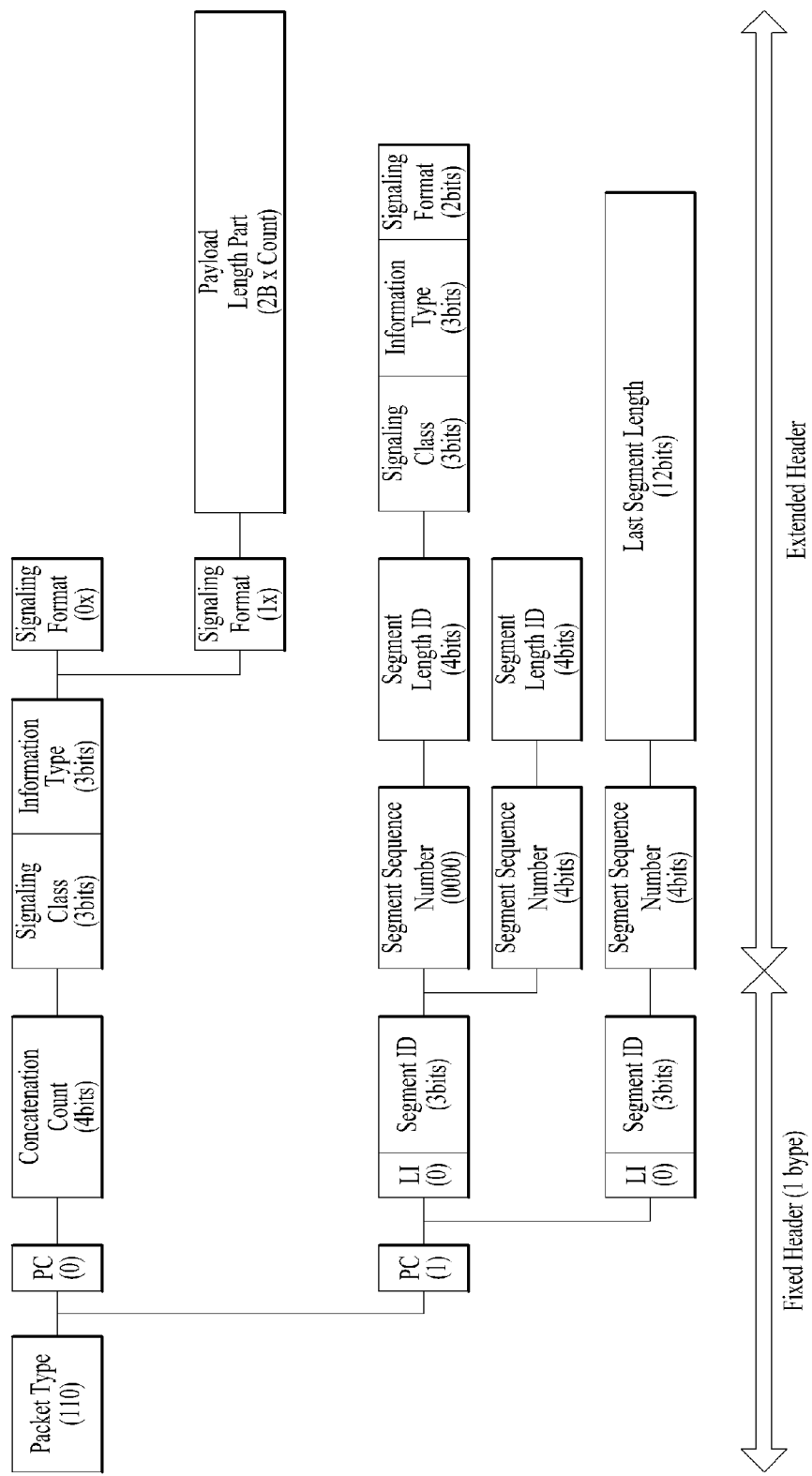
FIG. 43 is a diagram illustrating a structure of a link layer packet header of a link layer packet according to an embodiment of the present invention.

FIG. 44 illustrates a header structure of FIG. 43 as a syntax format, and relates to the same as that of FIG. 43.

Therefore, each field of the link layer header will be described with reference to FIGS. 43 and 44.

That is, a packet type field (3 bits) of the fixed header indicates a type of data transmitted to the corresponding packet.

For example, if a value of a packet_type field is '000', it indicates data of IPv4 transmitted to the corresponding packet. If the value of the packet type field is '010', it indicates data of a header compressed IP packet transmitted to the corresponding packet.

And, if the value of a packet type field is '110', it indicates data transmitted to the corresponding packet is signaling information (or signaling data). The signaling information may be either a signaling table (or descriptor) or a signaling packet. The signaling table may include a signaling table/table section included in DVB_SI (service information), PSI/PSIP, NRT (Non Real Time), ATSC 2.0, and MH (Mobile/Handheld), which exist conventionally.

In the present invention, the case where the value of the packet type field is '110' will be described in detail.

That is, if the value of the packet type field is '110', fields of the fixed header and fields of the extended header, which are subsequent to a payload_config field, are varied depending on a value of the payload_config field (1 bit). That is, information signaled to the fixed header and information signaled to the extended header are determined depending on the value of the payload_config field. The payload_config field may be referred to as a packet configuration (PC) field.

One embodiment indicates whether the signaling information is segmented by the upper layer and then provided to the link layer. According to one embodiment, if the value of the payload_config field is '0', the signaling information is provided without being segmented by the upper layer, and if the value of the payload_config field is '1', the signaling information is provided after being segmented by the upper layer.

If the value of the payload_config field is '0', a concatenation_count field of 4 bits is included in the fixed header. Also, the extended header includes a signaling_class field of 3 bits, an information_type field of 3 bits, and a signaling_format field of 2 bits. The extended field further includes a payload_length_part field of a variable length depending on a value of the signaling_format field.

If the value of the payload_config field is '1', an LI field of 1 bit and a segment_ID field of 3 bits are included in the fixed header. Also, the extended header includes a segment_sequence_number field of 4 bits, a segment_length_ID field of 4 bits, a signaling_class field of 3 bits, an information_type field of 3 bits, and a signaling_format field of 2 bits, or includes a segment_sequence_number field of 4 bits and a segment_length_ID field of 4 bits, or includes a segment_sequence_number field of 4 bits and a last_segment_length field of 12 bits.

The concatenation_count field (4 bits) corresponds to a count field of FIG. 44, and one embodiment of the present invention indicates how many link layer packets through which signaling information provided by the upper layer is transmitted are used. Alternatively, the field may indicate how many kinds of individual signaling information configure one payload.

The signaling_class field (3 bits) indicates a type of the signaling information included in the corresponding link layer packet, especially a payload of the corresponding link layer packet.

FIG. 45 illustrates an example of a type of signaling information defined depending on a value of a signaling_class field according to the present invention.

For example, if the value of the signaling_class field is '000', it indicates that the corresponding packet includes signaling information (for example, SLT) for channel scan and service acquisition. If the value of the signaling_class field is '001', it indicates that the corresponding packet includes signaling information for emergency alert. If the value of the signaling_class field is '010', it indicates that the corresponding packet includes signaling information for header compression.

In the present invention, if the value of the signaling_class field is '001', it indicates that the corresponding packet includes signaling information for emergency alert. However, this is one embodiment for assisting understanding of the present invention, and a reserved value of the signaling_class field may be used to indicate that the corresponding packet includes signaling information for emergency alert.

If the type of the signaling information transmitted to the corresponding packet is determined by the value of the signaling_class field, the information_type field indicates a type of data (that is, emergency alert information) transmitted to the payload of the corresponding packet regarding the determined signaling information. Also, detailed information may additionally be included depending on the type of the data.

In the present invention, if the value of the signaling_class field is 001, the corresponding packet will be referred to as an emergency alert packet.

FIG. 46 illustrates an example of meanings defined depending on a value of the information_type field of the emergency alert packet according to the present invention.

If the value of the information_type field is '000', it indicates that the emergency alert message is transmitted to a payload of the corresponding emergency alert packet. If the value of the information_type field is '001', it indicates that link (or connection) information of the emergency alert message is transmitted to the payload of the corresponding emergency alert packet. If the value of the information_type field is '010', it indicates that information for automatic channel tuning is transmitted to the payload of the corresponding emergency alert packet. If the value of the information_type field is '011', it indicates that emergency alert related NRT service information is transmitted to the payload of the corresponding emergency alert packet.

And, if the value of the information_type field is '111', it indicates that wake_up indication information is transmitted to the payload of the corresponding emergency alert packet. The wake_up indication information is required to indicate whether the corresponding emergency alert message needs a wake-up function. That is, the wake-up indication information is required to support a wake-up function of the broadcast receiving apparatus during the occurrence of disaster. The wake-up function means that the broadcast receiving apparatus should forcibly be switched to an active mode when an emergency alert message is issued, which is serious enough to switch a sleeping mode (or standby mode) to the active mode even though the broadcast receiving apparatus is in the sleeping mode (or standby mode). In order to support the wake-up function, the broadcast receiving apparatus should continue to monitor a broadcast signal even in case of the sleeping mode, and should know how the occurrence of disaster is emergent, as quickly as possible.

In FIG. 46, the value allocated to the information_type field and its meaning are embodiments for assisting understanding of the present invention, and addition and deletion of information included in the information_type field may easily be varied by the person with ordinary skill in the art. Therefore, the present invention will not be limited to the aforementioned embodiments. That is, if a procedure related to emergency alert is additionally provided later, a reserved value of the information_type field may be used to transmit the packet related to the corresponding procedure.

The signaling format field indicates a format of signaling information for emergency alert included in the corresponding packet as one embodiment. Examples of the format that may be indicated by the signaling format field may include a section table such as EAT, a descriptor within an EAT, and XML. For example, if the corresponding signaling information has its length value in the same manner as the section table and the descriptor, a separate length field may not be required. However, a separate length field may be required in case of signaling information having no separate length value. In case of the signaling information having no separate length value, a payload_length_part field (length field in FIG. 44) is used to indicate a length as one embodiment. In this case, the payload_length part includes length fields equivalent to the number of count fields as one embodiment.

That is, if the value of the signaling format field is '1x', the payload_length_part field indicates a length of signaling information included in the payload of the corresponding packet. At this time, the payload length part may be a set of length fields indicating a length of each of signaling information which are concatenated.

Meanwhile, if a value of the PC field is '1', that is, if signaling information for emergency alert is provided by the upper layer through segmentation, fields included in the extended header are determined depending on a value of the LI field.

The LI (last segment indicator) field indicates whether the corresponding segment is the last segment, as one embodiment.

If the value of the LI field is '0', that is, if the corresponding segment is not the last segment, the segment_ID field indicates information for identifying the corresponding segment.

The segment_sequence_number field indicates the order of respective segments when the signaling information for emergency alert is segmented by the upper layer.

If the value of the LI field is '0' and the value of the segment_sequence_number field value is '0000', that is, the first segment of the signaling information for emergency alert, the extended header includes a segment_length_ID field of 4 bits, a signaling_class field of 3 bits, an information_type field of 3 bits, and a signaling_format field of 2 bits. The segment_length_ID field indicates a length of the first segment as one embodiment. Details of the signaling_class field, the information_type field and the signaling_format field will be understood with reference to the aforementioned description.

If the value of the LI field is '0' and the value of the segment_sequence_number field value is not '0000', that is, neither the first segment nor the last segment of the signaling information for emergency alert, the extended header includes a segment_sequence_number field of 4 bits and a segment_length_ID field of 4 bits. As one embodiment, the segment_sequence_number field indicates a segment number indicating an order of a corresponding segment of the signaling information for emergency alert, and the segment_length_ID field indicates a length of the corresponding segment. That is, according to one embodiment, the segment length ID field is used to indicate a length of each segment except the last one of a plurality of segments.

If the value of the LI field is '1', that is, the last segment, the extended header includes a segment_sequence_number field of 4 bits and a last_segment_length field of 12 bits. As one embodiment, the segment_sequence_number field indicates a number of the last segment, and the last_segment_length field indicates a length of the last segment.

Therefore, when the signaling information for emergency alert is segmented, the signaling information for emergency alert may be completed in such a manner that the broadcast receiving apparatus sequentially combines segments having the same segment ID by using the above fields.

FIG. 47 illustrates a syntax of an example of fields included in a payload of a link layer packet when a value of a packet_type field of a corresponding link layer packet header according to the present invention is '110' and a value of an information_type field value is '000'. That is, FIG. 47 illustrates an example of a syntax when the payload of the corresponding link layer packet includes an emergency alert message of the signaling information for emergency alert.

The emergency alert message is intended to mainly deliver a CAP message, and the payload of the link layer packet directly includes the CAP message. At this time, a concatenation method supported by a packet structure of a link layer may be used to transmit several emergency alert messages. In this case, the value of the payload_config field is set to '0' and the value of the count field signals the number of emergency alert messages, as one embodiment. Also, when the emergency alert message is delivered using the link layer packet, version information of the corresponding emergency alert message is given to repeatedly process the emergency alert message.

Each field of the payload of the link layer packet for transmitting the emergency alert message in FIG. 47 will be described as follows.

An EAS_message_id field (32 bits) indicates an identifier for identifying each emergency alert message. As one embodiment, each emergency alert message has an identifier identified from another one.

An EAS_message_encoding_type field (4 bits) indicates encoding type information of the emergency alert message. For example, if a value of the EAS_message_encoding_type field is '000', it indicates that an encoding type of the emergency alert message (or EAS message) has not been specified. If the value of the EAS_message_encoding_type field is '001', it indicates that the emergency alert message has not been encoded. If the value of the EAS_message_encoding_type field is '010', it indicates that the emergency alert message has been encoded by a DEFLATE algorithm. If a new encoding method is used later, a reserved value of the EAS_message_encoding_type field may be used to indicate the new encoding method.

An EAS_message_version field (4 bits) indicates version information of the corresponding emergency alert message. As one embodiment of the present invention, the version information included in the EAS_message_version field is used to determine whether to process the emergency alert messages having the same EAS_message_id. In the present invention, a value increased as much as 1 whenever a new emergency alert message is generated is given to the EAS_message_version field. In this case, if the value of the EAS_message_version field is high, it indicates a new emergency alert message. And, if the value of the EAS_message_version field reaches a maximum value, next value has '0'. If the version information of the emergency alert message can be identified through the EAS_message_id field, the EAS_message_version field may be omitted.

An EAS_message_protocol field (4 bits) indicates a protocol of a corresponding emergency alert message. If the emergency alert message is a CAP message, the EAS_message_protocol field indicates a protocol of the CAP message as one embodiment. Also, if another protocol other than the protocol of the CAP message is used, the EAS_message_protocol field indicates the corresponding protocol. For example, the EAS_message_protocol field may be used for interworking of the emergency alert message with another network such as a mobile network.

An EAS_message_length field (12 bits) indicates a length of an emergency alert message actually included in a payload of a corresponding packet. An emergency alert message which is intended to be actually transmitted is transmitted through an EAS_message_bytes( ) field. That is, the EAS_message_bytes( ) field transmits the emergency alert message as much as a length corresponding to a value of the EAS_message_length field.

Figure 48:
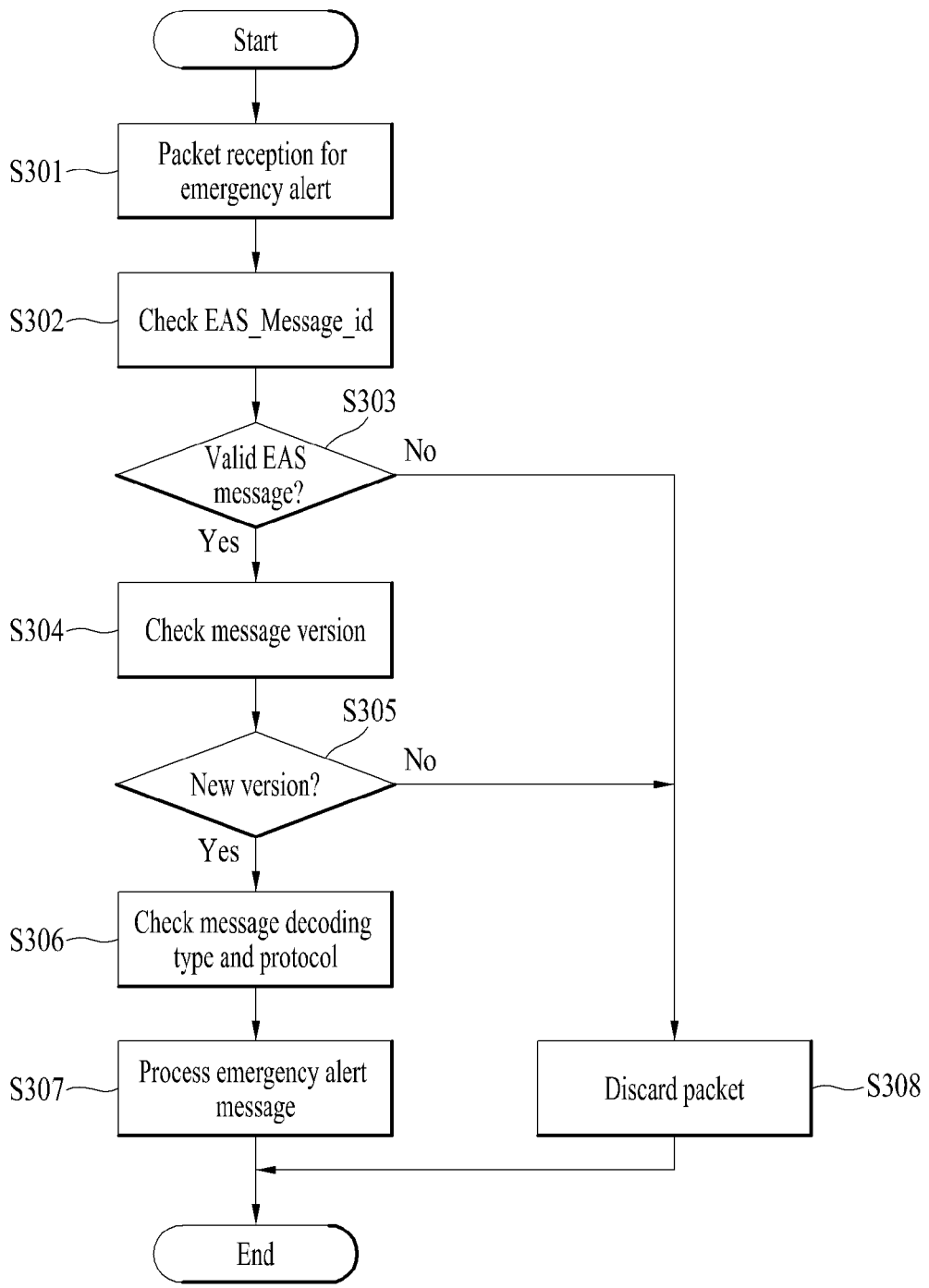
FIG. 48 is a flowchart illustrating a method for receiving and processing a link layer packet in a broadcast receiving apparatus according to an embodiment of the present invention.

FIG. 48 is a flow chart illustrating one embodiment of a method for receiving and processing an emergency alert message in a broadcast receiving apparatus according to the present invention. Particularly, FIG. 48 illustrates one embodiment of a processing method when an emergency alert message is received by being included in a payload of a link layer packet in the same manner as FIG. 47.

That is, if a packet for emergency alert is received (S301), an identifier of the emergency alert message is identified (S302). The packet received in the above step is the link layer packet decapsulated from the physical layer packet, and it is identified whether the packet is a packet for emergency alert, especially a packet for transmitting an emergency alert message, by using information signaled to the header of the link layer packet as one embodiment. The identifier of the emergency alert message is identified using the EAS_message_id field included in the payload of the corresponding packet as one embodiment.

If the identifier of the emergency alert message is identified in the step S302, it is identified whether the emergency alert message (that is, EAS message) included in the payload of the corresponding packet is effective (S303). If it is identified that the emergency alert message is effective, version information of the emergency alert message is identified (S304). That is, if it is identified that the emergency alert message is effective, the version information is identified using the EAS_message_version field included in the payload of the corresponding packet: It is identified whether the corresponding emergency alert message is the updated message or the message which has been conventionally received, based on the identified version information (S305). If the corresponding emergency alert message is a message of a new version, a decoding type and a protocol of the corresponding emergency alert message are identified using the EAS_message_encoding_type field and the EAS_message_protocol field of the payload of the corresponding packet (S306). The corresponding emergency alert message is processed in accordance with the identified decoding type and protocol (S307). However, if it is identified that the emergency alert message is not effective in the step S303, or if it is identified that the corresponding emergency alert message is not new version in the step S305, the packet received in the step S301 is disregarded (S308). That is, if the received emergency alert message is not effective or if the corresponding emergency alert message is not new version newer than the emergency alert message which has been conventionally received, the corresponding packet is disregarded and may return to a standby state for receiving another packet.

FIG. 49 is a syntax illustrating examples of fields included in a payload of a corresponding link layer packet when a packet_type field value of the link layer packet header according to the present invention indicates '110', a signaling_class field value indicates '001' and an information_type field value indicates '001'. That is, FIG. 49 is an example of a syntax when a payload of a corresponding link layer packet includes link or connection information of an emergency alert message among signaling information for emergency alert.

FIG. 49 illustrates an example of transmitting link or connection information of the emergency alert message to the payload of the link layer packet when the emergency alert message is transmitted through a separate path due to a lack of bandwidth.

Each field of the payload of the link layer packet for transmitting link or connection information of the emergency alert message in FIG. 49 will be described as follows.

Since an EAS_message_id field (32 bits), an EAS_message_encoding_type field (4 bits), an EAS_message_version field (4 bits), and an EAS_message_protocol field (4 bits) mean the EAS_message_id field, the EAS_message_encoding_type field, the EAS_message_version field and the EAS_message_protocol field of FIG. 47, their detailed description will be understood with reference to FIG. 47 and thus will be omitted here.

Meanwhile, in FIG. 49, a message_link_type field (4 bits) indicates a type of link information for acquiring the emergency alert message when the emergency alert message is transmitted through another path other than the payload of the corresponding packet.

For example, if a value of the message_link_type field is '0000', it indicates that IP datagram of the emergency alert message is transmitted through a data pipe (that is, PLP). That is, this case may be applied to a case where the emergency alert message is transmitted through a data pipe, which is located within a channel to which the corresponding packet is received, in the form of IP datagram. In this case, access information for accessing IP datagram of the emergency alert message is additionally signaled. The access information includes at least one of an IP address, a UDP port number, and identification information of the corresponding data pipe as one embodiment.

That is, if the value of the message_link_type field is '0000', the corresponding payload includes an IP address field, a UDP_port_num field, and a DP_id field.

The IP address field (32 or 128 bits) indicates an IP address of IPv4 or an IP address of IPv6 of the IP datagram of the emergency alert message, and the UDP_port_num field (16 bits) indicates a UDP port number of the IP datagram of the emergency alert message. The DP_id field (8 bits) indicates an identifier of a data pipe that transmits the IP datagram of the emergency alert message.

If the value of message_link_type field is '0001', it indicates that the emergency alert message is transmitted through another channel not the channel to which the corresponding packet is transmitted. In this case, access information for accessing the emergency alert message transmitted to another channel is additionally signaled. The access information includes at least one of channel information, data pipe identification information, and service information as one embodiment.

That is, if the value of the message_link_type field is '0001', the corresponding payload includes an EAS_channel_number field, an EAS_DP_id field, and an EAS_service_id field.

The EAS_channel_number field (8 bits) indicates channel information to which the emergency alert message is transmitted. In this case, the channel information may be a frequency number, or may be a major channel number and a minor channel number. That is, the EAS_channel_number field indicates a corresponding channel number when the emergency information message is received from another channel not the channel currently received by the broadcast receiving apparatus. If the channel number is related with the frequency number, the corresponding field may be replaced with the frequency number.

The EAS_DP_id field (8 bits) indicates an identifier of a data pipe that transmits the emergency alert message from a channel signaled to the EAS_channel_number field value. The EAS_DP_id field is optionally used. For example, if there is a separate path in the corresponding channel instead of the data pipe to which the emergency alert message is transmitted, the corresponding field may not be provided additionally.

The EAS_service_id field (16 bits) indicates an identifier of a service that includes the emergency alert message. That is, when several services are transmitted to one channel, the EAS_service_id field indicates an identifier of a service for acquiring the emergency alert message. If it is required to acquire a separate service in receiving the emergency alert message, the field may not be provided additionally.

If the value of the message_link_type field is '0010', it indicates that the emergency alert message is transmitted through a broadband when the broadcast receiving apparatus is connected to the broadband. If the value of the message_link_type field is '0010', a broadband_link_info( ) field of a variable length is provided additionally. The broadband_link_info( ) field indicates link information for the emergency alert message transmitted through the broadband.

If the value of the message_link_type field is '0011', it indicates that the emergency alert message is transmitted through another network (for example, mobile network) not a broadcast network and a broadband network. If the value of the message_link_type field '0011', an external_network_information ( ) field of a variable length is provided additionally. The external_network_information ( ) field indicates link information for the emergency alert message transmitted through another network such as a mobile network and information for the corresponding network. The other values of the message_link_type field are reserved for future use. Therefore, the remaining values may be used later depending on new link. Also, if the emergency alert message is transmitted through a network not the broadcast network, the remaining values may be used to transmit additional emergency alert message.

Figure 50:
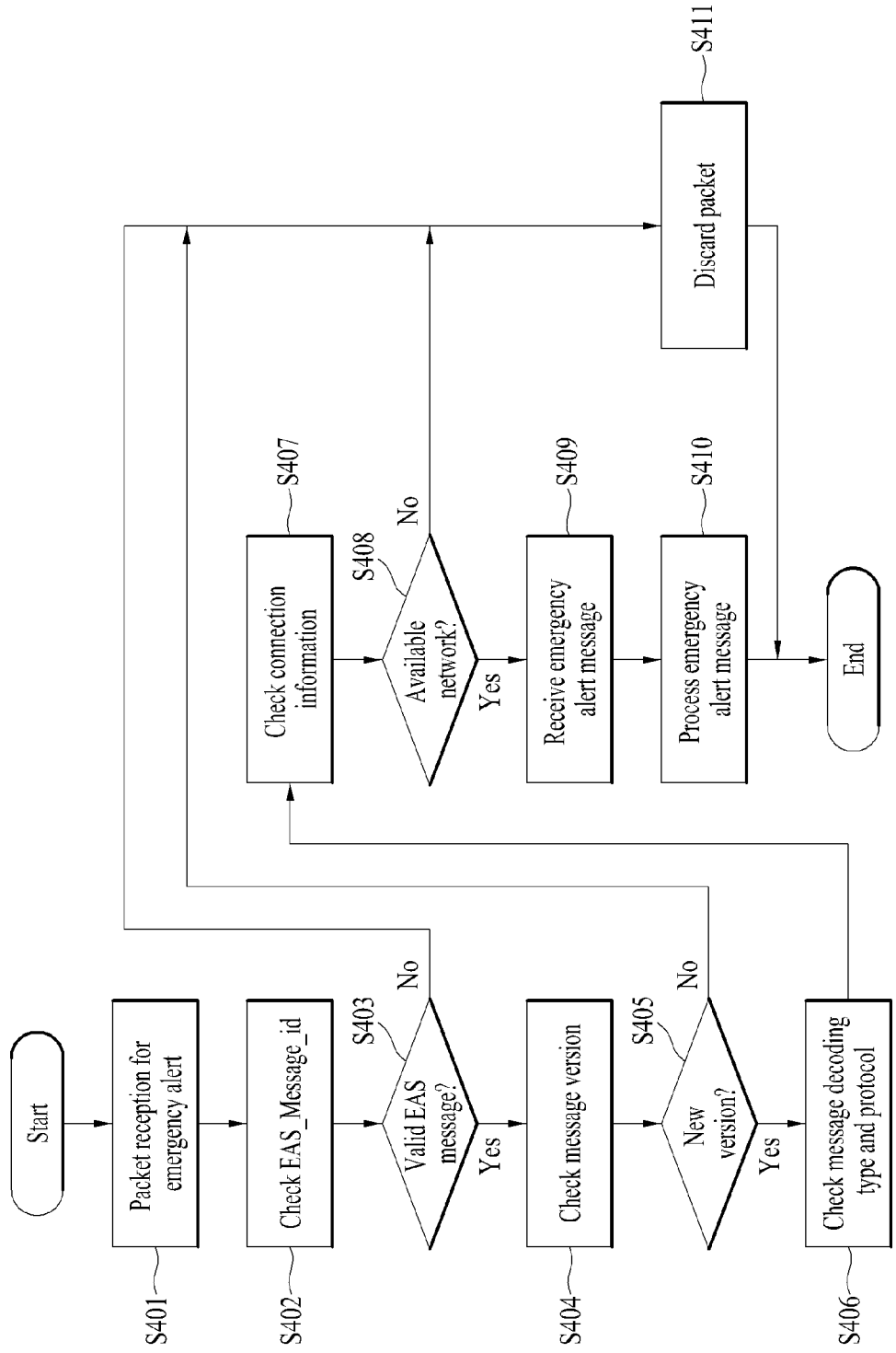
FIG. 50 is a flowchart illustrating a method for receiving and processing a link layer packet in a broadcast receiving apparatus according to another embodiment of the present invention.

FIG. 50 is a flow chart illustrating another embodiment of a method for receiving and processing an emergency alert message in a broadcast receiving apparatus according to the present invention. Particularly, FIG. 50 illustrates an embodiment of a processing method when link information of an emergency alert message is received by being included in a payload of a link layer packet in the same manner as FIG. 49.

That is, if a packet for emergency alert is received (S401), an identifier of the emergency alert message is identified (S402). The packet received in the above step is the link layer packet decapsulated from the physical layer packet, and it is identified whether the packet is a packet for emergency alert, especially a packet for transmitting link information of the emergency alert message, by using information signaled to the header of the link layer packet as one embodiment. The identifier of the emergency alert message is identified using the EAS_message_id field included in the payload of the corresponding packet as one embodiment.

If the identifier of the emergency alert message is identified in the step S402, it is identified whether the emergency alert message (that is, EAS message) is effective (S403). If it is identified that the emergency alert message is effective, version information of the emergency alert message is identified using the EAS_message_version field included in the payload of the corresponding packet (S404). It is identified whether the corresponding emergency alert message is the updated message or the message which has been conventionally received, based on the identified version information (S405). If the corresponding emergency alert message is a message of a new version, a decoding type and a protocol of the corresponding emergency alert message are identified using the EAS_message_encoding_type field and the EAS_message_protocol field which are included in the payload of the corresponding packet (S406).

Connection or link information to which the corresponding emergency alert message is transmitted is identified using the message_link_type field included in the payload of the corresponding packet (S407). It is identified whether a network that transmits the emergency alert message is an available network based on the connection or link information identified in the step S407 (S408). If it is identified that the corresponding network is the available network in the step S408, the emergency alert message is received using access information included in the payload of the corresponding packet (S409). That is, if the corresponding connection or link information is an effective network or a link that may be linked by the broadcast receiving apparatus, the emergency alert message is received using access information of the corresponding link.

For example, if a value of the message_link_type field is '0000', that is, if the emergency alert message is received through a data pipe, which is located within a channel to which the corresponding packet is received, in the form of IP datagram, the access information may be at least one of an IP address, a UDP port number, and identification information of the data pipe.

If the value of the message_link_type field is '0001', that is, if the emergency alert message is received through another channel not the channel to which the corresponding packet is received, the access information may be at least one of channel information, data pipe identification information, and service identification information.

If the value of the message_link_type field is '0010', that is, if the emergency alert message is received through a broadband, the access information may be acquired from a broadband_link_info( ) field included in the payload of the corresponding packet.

If the value of the message_link_type field is '0011', that is, if the emergency alert message is received through another network (for example, mobile network) not a broadcast network and a broadband network, the access information may be acquired from an external_network_information ( ) field included in the packet of the corresponding packet.

If the emergency alert message is received in the step S409, the received emergency alert message is processed in accordance with the decoding type and protocol identified in the step S406 (S410). However, if it is identified that the emergency alert message is not effective in the step S403, if it is identified that the corresponding emergency alert message is not new version in the step S405, or if it is identified that the corresponding network is not available network in the step S408, the packet received in the step S401 is disregarded (S411). That is, if the link for transmitting the emergency alert message is not effective, if it is not possible to access the corresponding link, or if the corresponding emergency alert message is not new version newer than the emergency alert message which has been conventionally received, the corresponding packet is disregarded and may return to a standby state for receiving another packet.

FIG. 51 is a syntax illustrating examples of fields included in a payload of a corresponding link layer packet when a packet_type field value of the link layer packet header according to the present invention indicates '110', a signaling_class field value indicates '001' and an information_type field value indicates '010'. That is, FIG. 51 is an example of a syntax when a payload of a corresponding link layer packet includes information for automatic tuning to a channel for transmitting contents related to an emergency alert message among signaling information for emergency alert.

In other words, FIG. 51 illustrates an example of transmitting automatic tuning information for automatic tuning from a current channel to a channel, to which emergency alert related contents are transmitted, to a payload of a link layer packet in a broadcast receiving apparatus when audio/video contents related to emergency alert are transmitted simultaneously with the emergency alert message.

Each field of the payload of the link layer packet for transmitting automatic tuning information related to emergency alert in FIG. 51 will be described as follows.

A num_associated_EAS_messages field (8 bits) indicates the number of emergency alert messages related to channel tuning information. A 'for' loop (or message identification loop) is performed as much as a value of the num_associated_EAS_messages field, whereby identification information of the related emergency alert message is provided. To this end, an associated_EAS_message_id field (32 bits) is included in the 'for' loop. That is, the associated_EAS_message_id field indicates an identifier of each emergency alert message related to automatic tuning information transmitted to a current packet. The associated_EAS_message_id field may be used to identify whether the broadcast receiving apparatus has received the emergency alert message for channel tuning earlier than the tuning information.

An automatic_tuning_channel_number field (8 bits) indicates channel information which should be tuned to receive audio/video contents related to emergency alert. In this case, the channel information may be a frequency number, or may be a major channel number and a minor channel number. That is, the automatic_tuning_channel_number field may indicate a channel number for transmitting audio/video contents related to emergency alert. If the channel number is related with the frequency number, the corresponding field may be replaced with the frequency number or may be used together with the frequency number.

An automatic_tuning_DP_id field (8 bits) indicates an identifier of a data pipe (that is, physical layer pipe) that transmits audio/video contents related to emergency alert from a channel signaled to the automatic_tuning_channel_number field.

An automatic_tuning_service_id field (16 bits) indicates an identifier of a service for acquiring audio/video contents related to emergency alert.

Figures 52, 53:
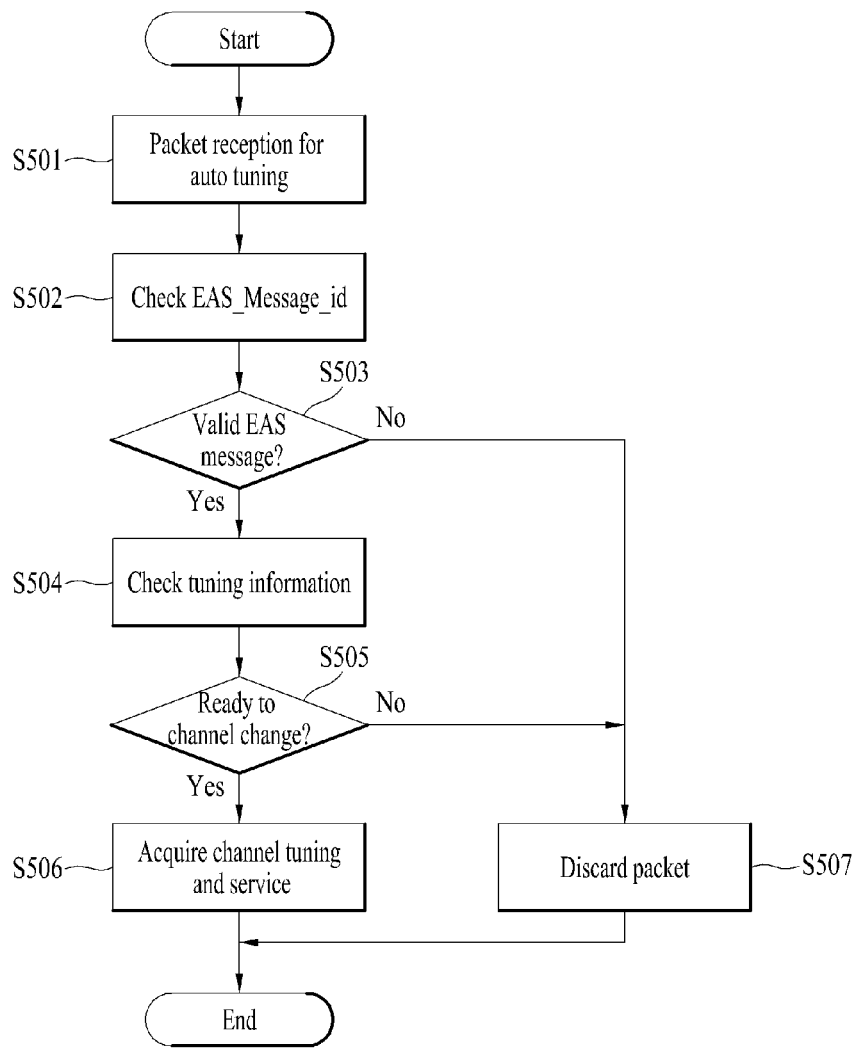
FIG. 52 is a flowchart illustrating a method for receiving and processing a link layer packet in a broadcast receiving apparatus according to another embodiment of the present invention.
FIG. 53 illustrates a syntax of a link layer packet payload of a link layer packet according to another embodiment of the present invention.

FIG. 52 is a flow chart illustrating still another embodiment of a method for receiving and processing an emergency alert message in a broadcast receiving apparatus according to the present invention. Particularly, FIG. 52 illustrates an embodiment of a processing method when automatic tuning information related to emergency alert is received by being included in a payload of a link layer packet in the same manner as FIG. 51.

That is, if a packet for emergency alert is received (S501), an identifier of the emergency alert message is identified (S502). The packet received in the above step is the link layer packet decapsulated from the physical layer packet, and it is identified whether the packet is a packet for emergency alert, especially a packet for transmitting information for automatic tuning, by using information signaled to the header of the link layer packet as one embodiment. The identifier of the emergency alert message is identified using the associated_EAS_message_id field included in the payload of the corresponding packet as one embodiment.

If the identifier of the emergency alert message is identified in the step S502, it is identified whether the emergency alert message (that is, EAS message) is effective (S503). As one embodiment of the present invention, when the packet is received, it is identified whether the related emergency alert message is received earlier than the packet, using the associated_EAS_message_id field, and if not so, it may be identified that the corresponding emergency alert message is not effective. In this case, the corresponding packet is disregarded without being processed as one embodiment.

If it is identified that the emergency alert message is effective, tuning information is acquired from the payload of the corresponding packet (S504). The tuning information may be acquired from at least one of the automatic_tuning_channel_number field, the automatic_tuning_DP_id field, and the automatic_tuning_service_id field.

Then, it is identified whether channel tuning is ready (S505), and if it is identified that channel tuning is ready, a current channel is automatically tuned to a channel for transmitting emergency alert related audio/video contents based on the channel information, whereby emergency alert service is acquired (S506). If the current channel is the channel for transmitting emergency alert related audio/video contents indicated by the channel information, the current channel is maintained without channel tuning. However, if it is identified that the emergency alert message is not effective in the step S503, or if it is identified that channel tuning is not ready in the step S505, the packet received in the step S501 is disregarded and returns to a standby state for receiving another packet (S507).

Meanwhile, as one embodiment of the present invention, if the received packet is a packet for emergency alert, especially a packet for transmitting information for automatic tuning, it may indicate that an automatic tuning flag is enabled. Also, if the corresponding packet is received, it is identified whether the related emergency alert message is received earlier than the packet, and if the related emergency alert message is not received earlier than the packet, the corresponding packet is disregarded. To this end, a list of emergency alert messages related to channel information to be currently tuned may be transmitted to the payload of the corresponding packet by using the associated_EAS_message_id field.

FIG. 53 is a syntax illustrating examples of fields included in a payload of a corresponding link layer packet when a packet_type field value of the link layer packet header according to the present invention indicates '110', a signaling_class field value indicates '001' and an information_type field value indicates '011'. That is, FIG. 53 is an example of a syntax when a payload of a corresponding link layer packet includes NRT service information related to emergency alert among signaling information for emergency alert.

Each field of the payload of the link layer packet for transmitting NRT service information related to emergency alert in FIG. 53 will be described as follows.

A num_associated_EAS_messages field (8 bits) indicates the number of emergency alert messages related to channel tuning information. A 'for' loop (or message identification loop) is performed as much as a value of the num_associated_EAS_messages field, whereby identification information of the related emergency alert message is provided. To this end, an associated_EAS_message_id field (32 bits) is included in the 'for' loop. That is, the associated_EAS_message_id field indicates an identifier of each emergency alert message related to automatic tuning information which is transmitted. The associated_EAS_message_id field may be used to identify whether the broadcast receiving apparatus has received the emergency alert message for channel tuning earlier than the channel tuning information.

An EAS_NRT_service_id field (16 bits) indicates an identifier of NRT service corresponding to a case where NRT contents and data related to the received emergency alert message are transmitted, that is, a case where EAS_NRT_flag is enabled.

Figure 54:
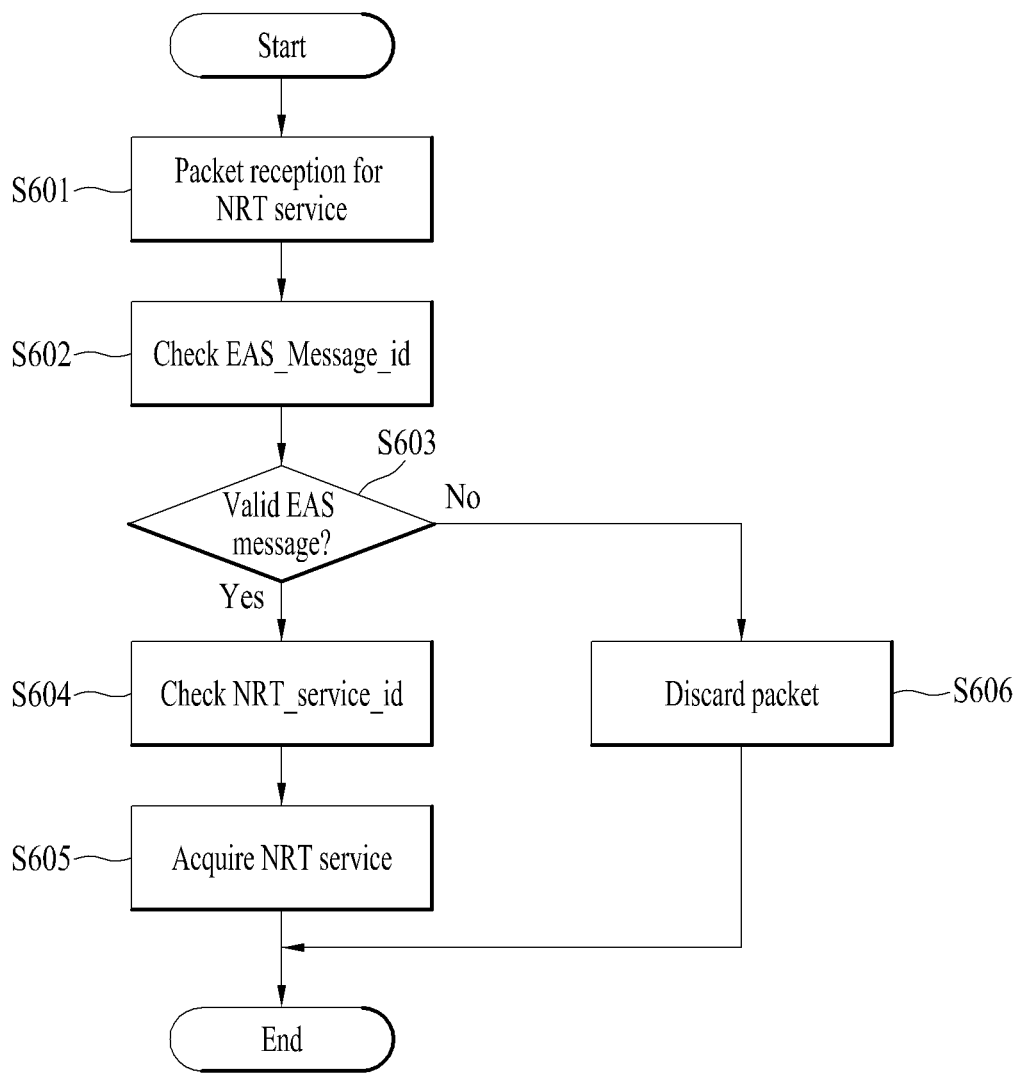
FIG. 54 is a flowchart illustrating a method for receiving and processing a link layer packet in a broadcast receiving apparatus according to another embodiment of the present invention.

FIG. 54 is a flow chart illustrating further still another embodiment of a method for receiving and processing an emergency alert message in a broadcast receiving apparatus according to the present invention. Particularly, FIG. 54 illustrates an embodiment of a processing method when NRT service information related to emergency alert is received by being included in a payload of a link layer packet in the same manner as FIG. 53.

That is, if a corresponding packet is received, the broadcast receiving apparatus may identify an identifier of NRT service and enter a procedure of acquiring NRT service.

That is, if a packet for emergency alert is received (S601), an identifier of the emergency alert message is identified (S602). The packet received in the above step is the link layer packet decapsulated from the physical layer packet, and it is identified whether the packet is a packet for emergency alert, especially a packet for transmitting NRT service information related to emergency alert, by using information signaled to the header of the link layer packet as one embodiment. The identifier of the emergency alert message is identified using the associated_EAS_message_id field included in the payload of the corresponding packet as one embodiment.

If the identifier of the emergency alert message is identified in the step S602, it is identified whether the emergency alert message (that is, EAS message) is effective (S603). As one embodiment of the present invention, when the packet is received, it is identified whether the related emergency alert message is received earlier than the packet, using the associated_EAS_message_id field, and if not so, it may be identified that the corresponding emergency alert message is not effective. In this case, the corresponding packet is disregarded without being processed as one embodiment (S606).

If it is identified that the emergency alert message is effective, an identifier of the NRT service is identified from the payload of the corresponding packet (S604). The identifier of the NRT service may be identified using the EAS_NRT_service_id field included in the payload of the packet.

If the identifier of the NRT service is identified in the step S604, the corresponding NRT service is acquired based on the identified identifier (S605).

Meanwhile, as one embodiment of the present invention, if the received packet is a packet for emergency alert, especially a packet for transmitting NRT service information related to emergency alert, it is identified whether the related emergency alert message is received earlier than the NRT service information, and if the related emergency alert message is not received earlier than the NRT service, the corresponding packet is disregarded. To this end, a list of emergency alert messages related to channel information to be currently tuned may be transmitted to the payload of the corresponding packet by using the associated_EAS_message_id field.

Meanwhile, the method for processing emergency alert information, as described with reference to FIGS. 42 to 54, may be performed by any one of the emergency alert systems of FIGS. 33 to 36 and FIG. 38.

Figure 55:
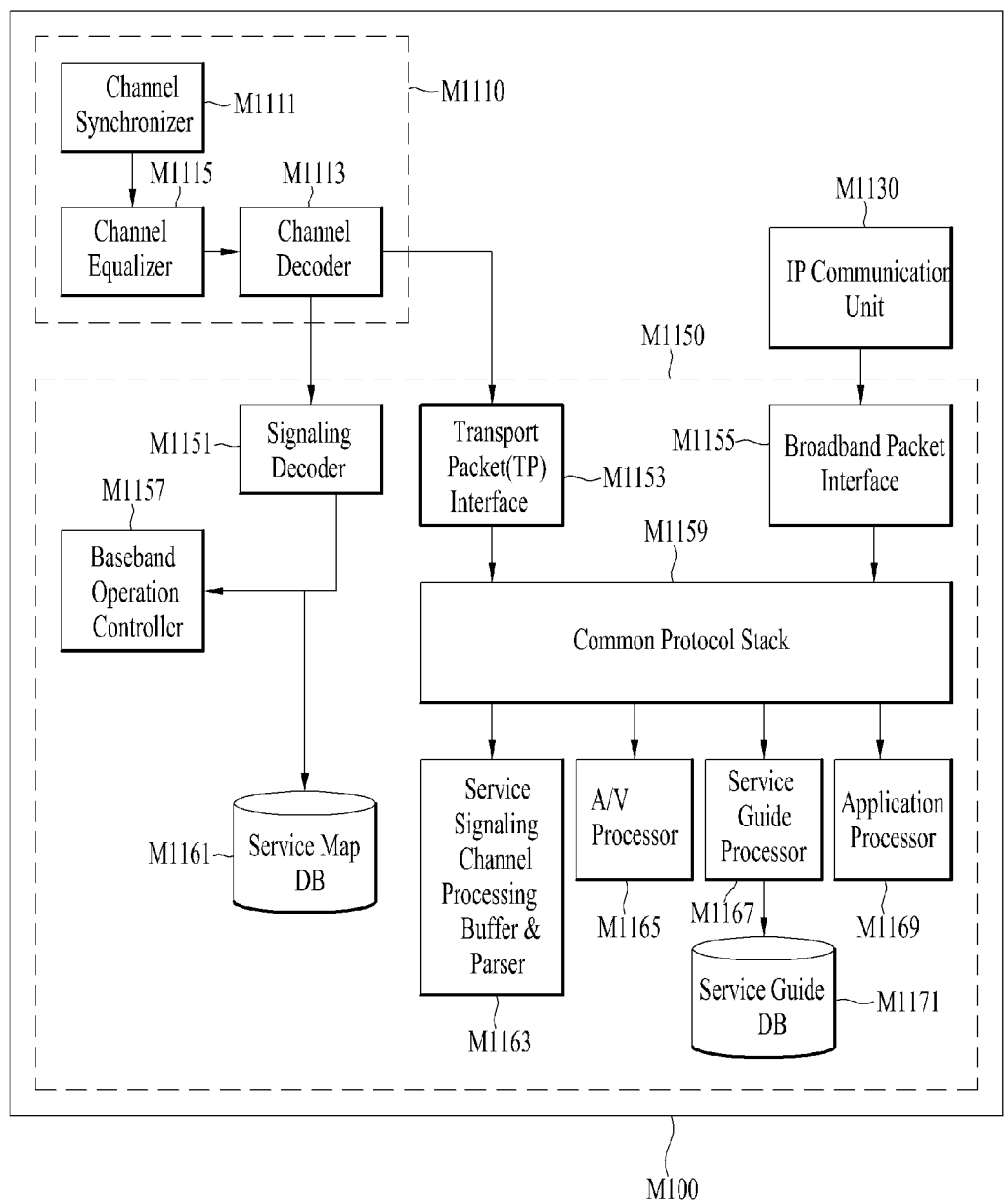
FIG. 55 is a block diagram illustrating a next generation (or future) broadcast receiving apparatus according to an embodiment of the present invention.
Figure 56:
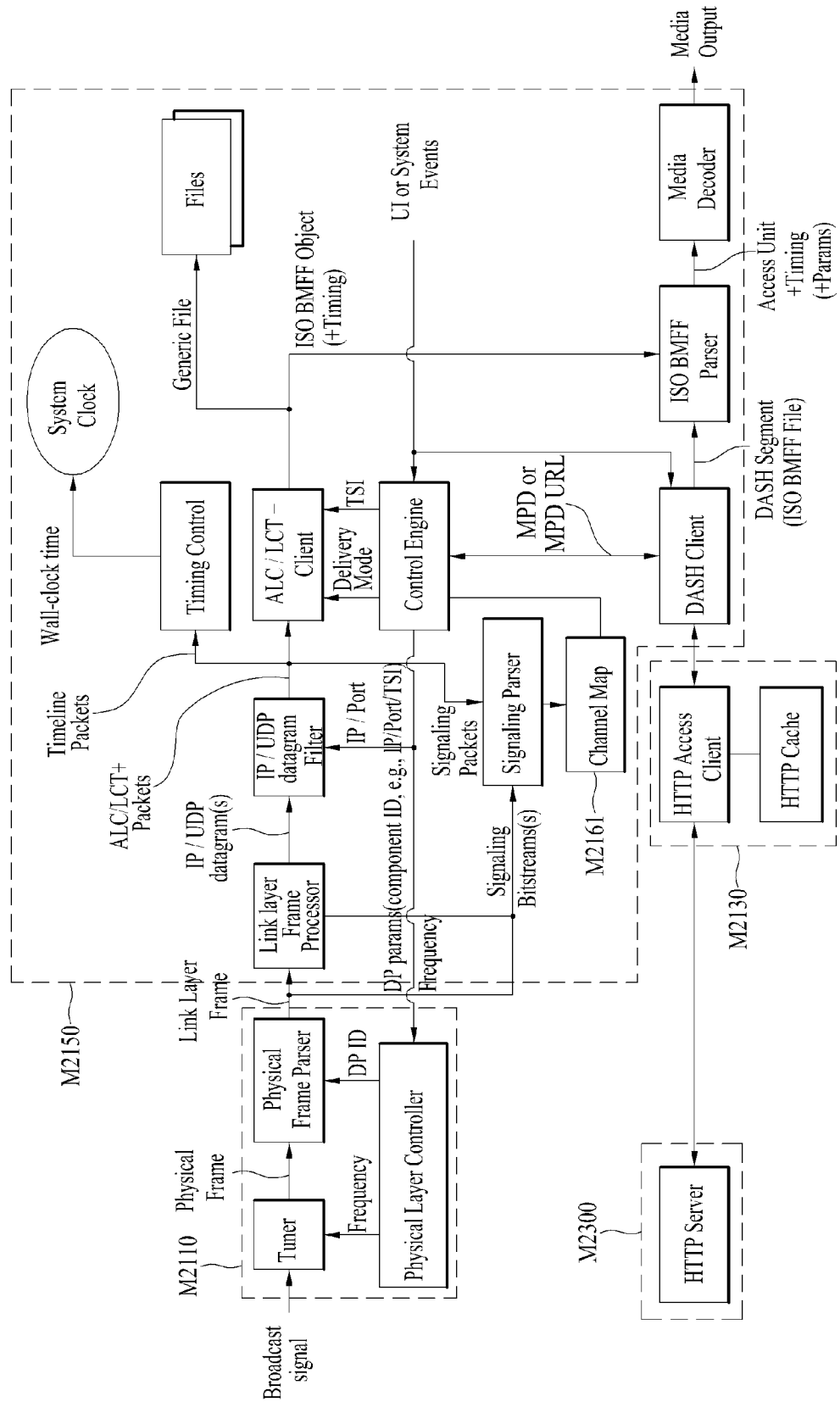
FIG. 56 is a block diagram illustrating a next generation broadcast receiving apparatus according to another embodiment of the present invention.
Figure 57:
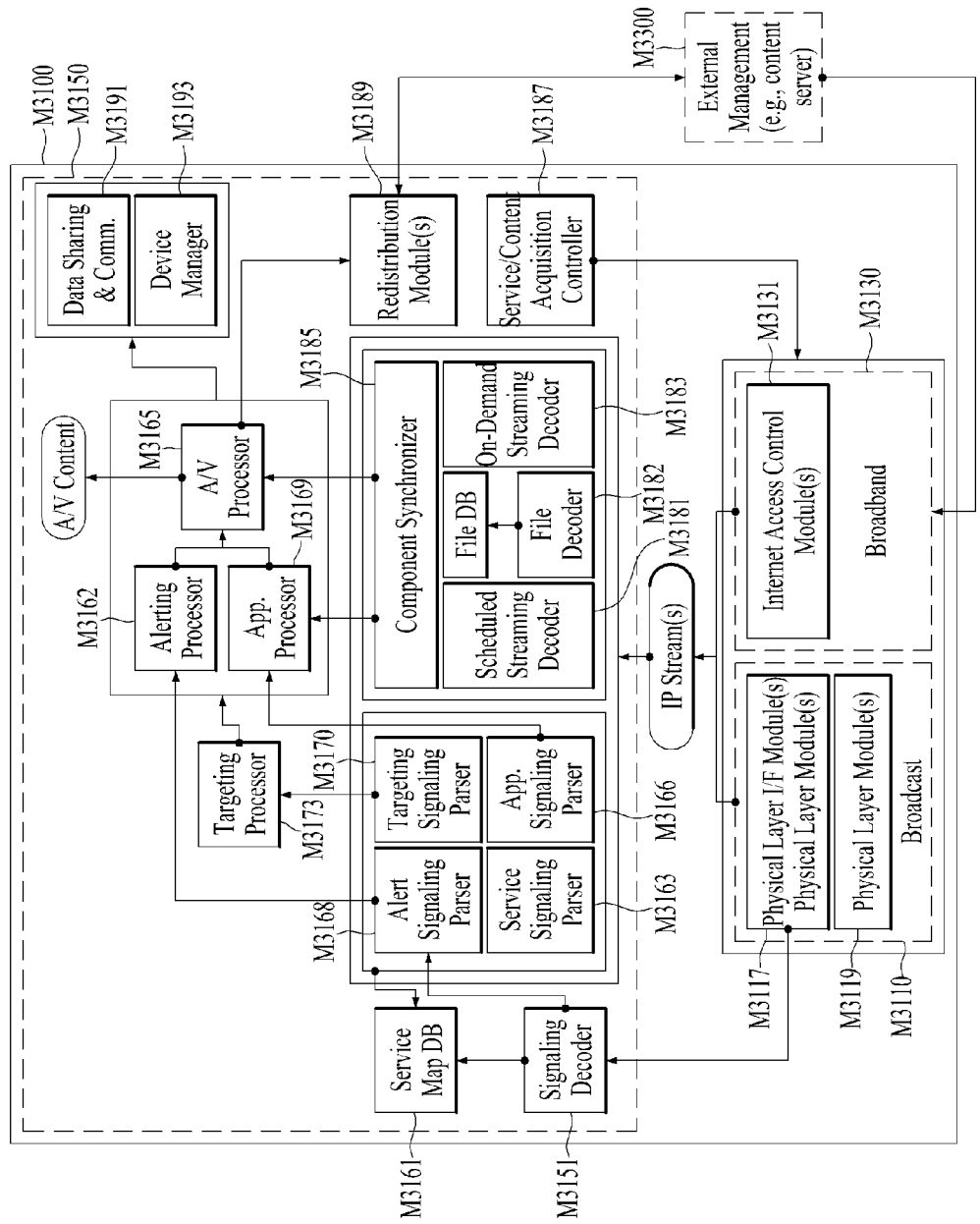
FIG. 57 is a block diagram illustrating a next generation broadcast receiving apparatus according to still another embodiment of the present invention.

FIGS. 55 to 57 illustrate various embodiments of a receiving apparatus of a next generation broadcasting system for processing emergency alert information in accordance with the present invention.

FIG. 55 is a schematic block diagram illustrating a receiving apparatus of a next generation broadcasting system according to one embodiment of the present invention.

A receiving apparatus M100 according to one embodiment of the present invention includes a receiving module M1110, a controller M1150, and an Internet protocol (IP) communication module M1130. The receiving module M1110 includes a channel synchronizer M1111, a channel equalizer M1115, and a channel decoder M1113. The controller M1150 may include a signaling decoder M1151, a baseband operation controller M1157, a service map DB M1161, a transport packet interface M1153, a broadband packet interface M1155, a common protocol stack M1159, a service signaling channel processing buffer & parser M1163, an A/V processor M1165, a service guide processor M1167, an application processor M1169, and/or a service guide DB M1171.

In FIG. 55, the channel synchronizer M1111 of the receiving module M1110 synchronizes symbol frequency with timing to decode a signal received from a baseband. In this case, the baseband indicates an area where a broadcast signal is transmitted and received.

The channel equalizer M1115 performs channel equalization for the received signal. The channel equalizer M1115 serves to compensate for the received signal when the received signal is distorted due to multipath, Doppler effect, etc.

The channel decoder M1113 recovers the received signal to a transport frame which is meaningful. The channel decoder M1113 performs forward error correction (FEC) for data included in the received signal or the transport frame.

The signaling decoder M1151 extracts and decodes signaling data included in the received signal. In this case, the signaling data include signaling data, which will be described later, and/or service information (SI). Also, the signaling data may include an emergency alert message or emergency alert related signaling information.

The baseband operation controller M1157 controls signal processing at the baseband.

The service map DB M1161 stores signaling data and/or service information therein. The service map DB M1161 may store signaling data transmitted by being included in a broadcast signal and/or signaling data transmitted by being included in a broadband packet.

The transport packet interface M1153 extracts a transport packet from the transport frame or the broadcast signal. In this case, the transport packet is a link layer packet acquired by decapsulation of a baseband packet included in the transport frame as one embodiment.

The transport packet interface M1153 extracts signaling data or IP datagram from the transport packet. The broadband packet interface M1155 receives a broadcasting related packet through the broadband. The broadband packet interface M1155 extracts the packet acquired through the broadband, and combines or extracts signaling data or A/V data from the corresponding packet.

The common protocol stack M1159 processes the received packet in accordance with a protocol included in a protocol stack. For example, the common protocol stack M1159 may process the received packet in each protocol in accordance with the aforementioned method.

The service signaling channel processing buffer & parser M1163 extracts signaling data included in the received packet. The service signaling channel processing buffer & parser M1163 extracts signaling information related to scan and/or acquisition of services and/or contents from the IP datagram, and parses the extracted signaling information. The signaling data may exist at a given location or channel within the received packet. This location or channel may be referred to as a service signaling channel. For example, the service signaling channel may have a specific IP address, a UDP port number, a transport session identifier, etc. The receiver may recognize data transmitted to the specific IP address, the UDP port number and the transport session as signaling data.

The A/V processor M1165 performs decoding and presentation processing for received audio and video data.

The service guide processor M1167 extracts announcement information from the received signal, manages a service guide DB M1171, and provides a service guide.

The application processor M1169 extracts application data and/or application related information included in the received packet and processes the extracted application data and application related information.

The service guide DB M1171 stores service guide data therein.

Also, the controller M1150 processes emergency alert related information according to the present invention, which is received from the link layer packet, as one embodiment. To this end, the controller M1150 may further include an emergency alert processor (not shown), and the transport packet interface M1153 may process the emergency alert related information according to the present invention. In FIG. 55, the transport packet interface M1153 processes the emergency alert related information as one embodiment. That is, the transport packet interface M1153 extracts the transport packet from the transport frame (or physical layer frame) or the broadcast signal. At this time, the transport packet may be a physical layer packet or a link layer packet. If the transport packet is a physical layer packet, the link layer packet is acquired by decapsulation of the physical layer packet as one embodiment. The link layer packet depends on the structures of FIGS. 42 to 44 as one embodiment. This is one embodiment for assisting understanding of the present invention, and since the link layer packet structure according to the present invention may be modified by a designer, the present invention is not limited to the aforementioned embodiment.

The transport packet interface M1153 may identify that data received in the link layer packet using each field included in the header of the link layer packet as shown in FIGS. 42 to 46 is signaling information and especially is a packet that includes signaling information for emergency alert. In addition, the transport packet interface M1153 may identify whether the payload of the link layer packet includes an emergency alert message of signaling information for emergency alert, link information of an emergency alert message, emergency alert related automatic tuning information, emergency alert related NRT service information, or wake-up indication information. The method and steps for this identification have been described in detail as above and thus their description will be omitted herein.

If it is identified that the payload of the corresponding link layer packet includes the emergency alert message of signaling information for emergency alert, the transport packet interface M1153 processes the emergency alert message included in the corresponding payload with reference to each field included in the payload of the corresponding packet as described with reference to FIGS. 47 and 48.

If it is identified that the payload of the corresponding link layer packet includes link information of the emergency alert message of signaling information for emergency alert, the transport packet interface M1153 acquires link information and/or access information for acquiring the emergency alert message with reference to each field included in the payload of the corresponding packet as described with reference to FIGS. 49 and 50, and receives and processes the emergency alert message by using the acquired link information and/or access information.

For example, if it is identified that the emergency alert message is received in the form of IP datagram through a data pipe within a channel to which the corresponding packet is received, the link and access information may be at least one of an IP address, a UDP port number and identification information of the data pipe. For another example, if it is identified that the emergency alert message is received through another channel not the channel to which the corresponding packet is received, the link and access information may be at least one of channel information, identification information of the data pipe, and service identification information.

If it is identified that the payload of the corresponding link layer packet includes emergency alert related automatic tuning information of signaling information for emergency alert, the transport packet interface M1153 acquires tuning information, which will be tuned automatically, with reference to each field included in the payload of the corresponding packet as described with reference to FIGS. 51 and 52, and controls channel tuning by using the acquired tuning information.

If it is identified that the payload of the corresponding link layer packet includes emergency alert related NRT service information of signaling information for emergency alert, the transport packet interface M1153 acquires emergency alert related NRT service information with reference to each field included in the payload of the corresponding packet as described with reference to FIGS. 53 and 54, and acquires NRT service based on the acquired information.

FIG. 56 is a schematic block diagram illustrating a broadcast receiving apparatus of a next generation broadcasting system according to another embodiment of the present invention.

In the embodiment of FIG. 56, the broadcast receiving apparatus includes a broadcasting receiving module M2110, an Internet protocol (IP) communication module M2130, and a controller M2150.

The broadcasting receiving module M2110 may include a tuner, a physical frame parser, and a physical layer controller.

The tuner extracts a physical frame by receiving a broadcast signal through a broadcast channel. The physical frame is a transport unit on a physical layer. The physical frame parser acquires a link layer packet by parsing the received physical frame. For example, the physical frame parser acquires the link layer packet by decapsulation of a baseband packet included in the physical frame as one embodiment. The link layer packet may be referred to as a link layer frame, and a link layer packet parser may be referred to as a link layer frame parser. The physical layer controller controls operations of the tuner and the physical frame parser. In one embodiment, the physical layer controller may control the tuner by using RF information of the broadcast channel. In more detail, if the physical layer controller transmits frequency information to the tuner, the tuner may acquire the physical frame corresponding to the received frequency information from the broadcast signal.

In another embodiment, the physical layer controller may control the operation of the physical layer parser through an identifier of a physical layer pipe. In more detail, the physical layer controller transmits identifier information for identifying a specific one of a plurality of physical layer pipes to the physical frame parser. The physical frame parser may identify the physical layer pipe based on the received identifier information and acquire the link layer packet from the identified physical layer pipe.

The controller M2150 includes a link layer packet parser, an IP/UDP datagram filter, a control engine, an ALC/LCT+ client, a timing controller, a DASH client, an ISO BMFF parser, and a media decoder.

The link layer packet parser extracts data from the link layer packet. In more detail, the link layer packet parser may acquire link layer signaling from the link layer packet. Also, the link layer packet parser may acquire IP/UDP datagram from the link layer packet.

The IP/UDP datagram filter filters a specific one from the IP/UDP datagram received from the link layer packet parser.

The ALC/LCT+ client processes an application layer transport packet. The application layer transport packet may include an ALC/LCT+ packet. In more detail, the ALC/LCT+ client may generate one or more ISO BMFF media file format objects by collecting a plurality of application layer transport packets.

The timing controller processes a packet that includes system time information, and controls a system clock in accordance with the processed result.

The DASH client processes real time streaming or adaptive media streaming. In more detail, the DASH client may acquire a DASH segment by processing adaptive media streaming based on HTTP. At this time, the DASH segment may be a format of ISO BMFF object.

The ISO BMFF parser extracts audio/video data from the ISO BMFF object received from the DASH client. At this time, the ISO BMFF parser may extract the audio/video data in a unit of an access unit. Also, the ISO BMFF parser may acquire timing information for audio/video from the ISO BMFF object.

The media decoder decodes the received audio and video data. Also, the media decoder performs presentation for the decoded result through a media output terminal.

The control engine serves as an interface between the respective modules. In more detail, the control engine may control the operation of each module by transmitting a parameter required for the operation of each module.

The Internet protocol communication module M2130 may include an HTTP access client. The HTTP access client may transmit and receive a request to and from an HTTP server, or may transmit and receive a response to the request to and from the HTTP server.

As one embodiment of the present invention, the emergency alert related information according to the present invention, which is received from the link layer packet parser to the link layer packet, is processed. As another embodiment, the present invention may further include an emergency alert processor (not shown). The link layer packet acquired by the physical layer packet parser depends on the structures of FIGS. 42 to 44 as one embodiment. This is one embodiment for assisting understanding of the present invention, and since the link layer packet structure according to the present invention may be modified by a designer, the present invention is not limited to the aforementioned embodiment.

The link layer packet parser may identify that data received in the link layer packet using each field included in the header of the link layer packet as shown in FIGS. 42 to 46 is signaling information and especially is a packet that includes signaling information for emergency alert. In addition, the link layer packet parser may identify whether the payload of the link layer packet includes an emergency alert message of signaling information for emergency alert, link information of an emergency alert message, emergency alert related automatic tuning information, emergency alert related NRT service information, or wake-up indication information. The method and steps for this identification have been described in detail as above and thus their description will be omitted herein.

If it is identified that the payload of the corresponding link layer packet includes the emergency alert message of signaling information for emergency alert, the link layer packet parser processes the emergency alert message included in the corresponding payload with reference to each field included in the payload of the corresponding packet as described with reference to FIGS. 47 and 48.

If it is identified that the payload of the corresponding link layer packet includes link information of the emergency alert message of signaling information for emergency alert, the link layer packet parser acquires link information and/or access information for acquiring the emergency alert message with reference to each field included in the payload of the corresponding packet as described with reference to FIGS. 49 and 50, and receives and processes the emergency alert message by using the acquired link information and/or access information.

If it is identified that the payload of the corresponding link layer packet includes emergency alert related automatic tuning information of signaling information for emergency alert, the link layer packet parser acquires tuning information, which will be tuned automatically, with reference to each field included in the payload of the corresponding packet as described with reference to FIGS. 51 and 52, and controls channel tuning by using the acquired tuning information.

If it is identified that the payload of the corresponding link layer packet includes emergency alert related NRT service information of signaling information for emergency alert, the link layer packet parser acquires emergency alert related NRT service information with reference to each field included in the payload of the corresponding packet as described with reference to FIGS. 53 and 54, and acquires NRT service based on the acquired information.

FIG. 57 is a schematic block diagram illustrating a broadcast receiving apparatus of a next generation broadcasting system according to still another embodiment of the present invention.

In the embodiment of FIG. 57, the broadcast receiving apparatus M3100 includes a broadcasting receiving module M3110, an Internet protocol (IP) communication module M3130, and a controller M3150.

The broadcasting receiving module M3110 may include one or a plurality of processors for performing each of a plurality of functions performed by the broadcasting receiving module M3110, one or a plurality of circuits, and one or a plurality of hardware modules. In more detail, the broadcasting receiving module M3110 may be a system on chip (SOC) in which a plurality of semiconductor parts are integrated into one. At this time, the SOC may be a semiconductor obtained by combining various multimedia parts, such as graphic, audio, video, and modem, with a processor and DRAM. The broadcasting receiving module M3110 may include a physical layer module M3119 and a physical layer IP frame module M3117. The physical layer module M3119 receives and processes a broadcasting related signal through a broadcast channel of a broadcast network. The physical layer IP frame module M3117 converts a data packet such as IP datagram acquired from the physical layer module M3119 to a specific frame. For example, the physical layer IP frame module M3117 may convert the IP datagram to a link layer frame, a link layer packet, or GSE.

The IP communication module M3130 may include one or a plurality of processors for performing each of a plurality of functions performed by the IP communication module M3130, one or a plurality of circuits, and one or a plurality of hardware modules. In more detail, the IP communication module M3130 may be a system on chip (SOC) in which a plurality of semiconductor parts are integrated into one. At this time, the SOC may be a semiconductor obtained by combining various multimedia parts, such as graphic, audio, video, and modem, with a processor and DRAM. The IP communication module M3130 may include an Internet access control module M3131. The Internet access control module M3131 controls the operation of the broadcast receiving apparatus M3100 for acquiring at least one of services, contents and signaling data through an Internet communication network (broadband).

The controller M3150 may include one or a plurality of processors for performing each of a plurality of functions performed by the controller M3150, one or a plurality of circuits, and one or a plurality of hardware modules. In more detail, the controller M3150 may be a system on chip (SOC) in which a plurality of semiconductor parts are integrated into one. At this time, the SOC may be a semiconductor obtained by combining various multimedia parts, such as graphic, audio, video, and modem, with a processor and DRAM.

The controller M3150 may include at least one of a signaling decoder M3151, a service map database M3161, a service signaling channel parser M3163, an application signaling parser M3166, an emergency alert signaling parser M3168, a targeting signaling parser M3170, a targeting processor M3173, an A/V processor M3161, an emergency alert processor M3162, an application processor M3169, a scheduled streaming decoder M3181, a file decoder M3182, a user request streaming decoder M3183, a file database, a component synchronizer M3185, a service/content acquisition controller M3187, a redistribution module M3189, a device manager M3193, and a data sharing module M3191.

The service/content acquisition controller M3187 controls the operation of the receiver for acquiring services, contents, and signaling data related to services or contents, which are acquired through a broadcast network or Internet communication network.

The signaling decoder M3151 decodes signaling information.

The service signaling parser M3163 parses service signaling information.

The application signaling parser M3166 extracts and parses signaling information related to services. At this time, the signaling information related to services may be signaling information related to service scan. Also, the signaling information related to services may be signaling information related to contents provided through services.

The emergency alert signaling parser M3168 extracts and parses emergency alert related signaling information.

The targeting signaling parser M3170 extracts and parses information for personalizing services or contents or information for signaling targeting information.

The targeting processor M3173 processes information for personalizing services or contents.

The emergency alert processor M3162 processes emergency alert related signaling information.

The application processor M3169 controls running of application and application related information. In more detail, the application processor M3169 processes a state of a downloaded application and a display parameter.

The A/V processor M3161 processes a rendering related operation of audio/video on the basis of decoded audio or video, application data, etc.

The scheduled streaming decoder M3181 previously decodes scheduled streaming which is a content streamed in accordance with a schedule determined by a content provider such as a broadcasting station.

The file decoder M3182 decodes downloaded files. Particularly, the file decoder M3182 decodes files downloaded through a broadband.

The user request streaming decoder M3183 decodes an on demand command provided by a user request.

The file database stores files therein. In more detail, the file database may store files downloaded through the broadband.

The component synchronizer M3185 synchronizes contents or services. In more detail, the component synchronizer M3185 performs synchronization for a play time of a content acquired through at least one of the scheduled streaming decoder M3181, the file decoder M3182 and the user request streaming decoder M3183.

The service/content acquisition controller M3187 controls the operation of the receiver for acquiring at least one of services, contents, and signaling information related to services or contents.

The redistribution module M3189 performs an operation for supporting acquisition of at least one of service, content, service related information and content related information if service or content is not received through a broadcast network. In more detail, the redistribution module M3189 may request an external management device M3300 of at least one of service, content, service related information and content related information. At this time, the external management device M3300 may be a content server.

The device manager M3193 manages an interworking external device. In more detail, the device manager M3193 may perform at least one of addition, deletion and update of the external device. Also, the external device may enable connection and data exchange with the broadcast receiving apparatus M3100.

The data sharing module M3191 performs a data transmission operation between the broadcast receiving apparatus M3100 and the external device, and processes exchange related information. In more detail, the data sharing module M3191 may transmit A/V data or signaling information to the external device. Also, the data sharing module M3191 may receive A/V data or signaling information from the external device.

Meanwhile, the physical layer IP frame module 117 converts a baseband packet included in a physical layer frame to a link layer packet through decapsulation as one embodiment. As one embodiment, the emergency alert signaling parser M3168 extracts and parses emergency alert related signaling information from the link layer packet, and the emergency alert processor M3162 processes the parsed emergency alert related signaling information.

The link layer packet parsed by the emergency alert signaling parser M3168 depends on the structures of FIGS. 42 to 44 as one embodiment. This is one embodiment for assisting understanding of the present invention, and since the link layer packet structure according to the present invention may be modified by a designer, the present invention is not limited to the aforementioned embodiment.

The emergency alert signaling parser M3168 may identify that data received in the link layer packet using each field included in the header of the link layer packet as shown in FIGS. 42 to 46 is signaling information and especially is a packet that includes signaling information for emergency alert. In addition, the emergency alert signaling parser M3168 may identify whether the payload of the link layer packet includes an emergency alert message of signaling information for emergency alert, link information of an emergency alert message, emergency alert related automatic tuning information, emergency alert related NRT service information, or wake-up indication information. The method and steps for this identification have been described in detail as above and thus their description will be omitted herein.

If it is identified that the payload of the corresponding link layer packet includes the emergency alert message of signaling information for emergency alert, the emergency alert processor M3162 processes the emergency alert message included in the corresponding payload with reference to each field included in the payload of the corresponding packet as described with reference to FIGS. 47 and 48.

If it is identified that the payload of the corresponding link layer packet includes link information of the emergency alert message of signaling information for emergency alert, the emergency alert processor M3162 acquires link information and/or access information for acquiring the emergency alert message with reference to each field included in the payload of the corresponding packet as described with reference to FIGS. 49 and 50, and receives and processes the emergency alert message by using the acquired link information and/or access information.

If it is identified that the payload of the corresponding link layer packet includes emergency alert related automatic tuning information of signaling information for emergency alert, the emergency alert processor M3162 acquires tuning information, which will be tuned automatically, with reference to each field included in the payload of the corresponding packet as described with reference to FIGS. 51 and 52, and controls channel tuning by using the acquired tuning information.

If it is identified that the payload of the corresponding link layer packet includes emergency alert related NRT service information of signaling information for emergency alert, the emergency alert processor M3162 acquires emergency alert related NRT service information with reference to each field included in the payload of the corresponding packet as described with reference to FIGS. 53 and 54, and acquires NRT service based on the acquired information.

The features, structures and advantages described in the aforementioned embodiments are included in at least one embodiment of the present invention, and are not limited to only one embodiment. Moreover, the features, structures and advantages described in each embodiment may be carried out in the other embodiments in combination or modification by those skilled in the art to which the embodiments pertain. The above embodiments are therefore to be construed in all aspects within the scope of the present invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

MODE FOR INVENTION

As mentioned in the foregoing description, the related is described in the best mode for invention.

INDUSTRIAL APPLICABILITY

The present invention can be applied to a whole of broadcast and communication industries.

The invention claimed is:

1. A method of processing data in a broadcast transmitting apparatus, the method comprising:
   encapsulating broadcast service data for a broadcast service and signaling data into link layer packets, wherein the signaling data include at least a service list table or an emergency alert table, wherein the service list table includes information for rapid channel scans and service acquisition, and wherein the emergency alert table includes an emergency alert message of a text form for emergency notification and service identification information for identifying an emergency-related service that is composed of an emergency-related broadcast content;
   performing error correction encoding on data of multiple Physical Layer Pipes (PLPs), wherein one of the multiple PLPs delivers at least one link layer packet including the signaling data and remaining PLPs deliver at least one link layer packet including the broadcast service data;
   performing error correction encoding on physical layer parameters, wherein the physical layer parameters include information for identifying the PLP that delivers the at least one link layer packet including the signaling data and encoding information of the multiple PLPs;
   building a signal frame that includes the error correction encoded data and the error correction encoded physical layer parameters; and
   transmitting a broadcast signal that includes the built signal frame.

2. The method according to claim 1, wherein each of the link layer packets consists of a header and a payload and wherein the header includes packet type information for indicating a packet type of input data before encapsulation into a corresponding link layer packet.

3. The method according to claim 1, wherein the service list table further includes information to bootstrap service layer signaling information that includes information to discover and access at least one component of the broadcast service.

4. The method according to claim 3, wherein the service layer signaling information is carried through a Layered Coding Transport (LCT) channel of a Real-time Object Delivery over Unidirectional Transport (ROUTE) session.

5. The method according to claim 4, wherein the ROUTE session is identified based on at least one of source address information, destination address information and destination port information.

6. The method according to claim 1, wherein the information for rapid channel scans and service acquisition includes service category information for indicating a type of the broadcast service and status information for indicating whether the broadcast service is hidden.

7. The method according to claim 6, wherein, when emergency alert information is transmitted as an emergency alert service, the service category information indicates that the type of the broadcast service is the emergency alert service.

8. The method according to claim 1, further comprising:
   bit interleaving the error correction encoded data; and
   time interleaving the bit-interleaved data.

9. A broadcast transmitting apparatus comprising:
   a link layer processor for encapsulating broadcast service data for a broadcast service and signaling data into link layer packets, wherein the signaling data include at least a service list table or an emergency alert table, wherein the service list table includes information for rapid channel scans and service acquisition, and wherein the emergency alert table includes an emergency alert message of a text form for emergency notification and service identification information for identifying an emergency-related service that is composed of an emergency-related broadcast content;
   an encoding module for performing error correction encoding on data of multiple PLPs, wherein one of the multiple PLPs delivers at least one link layer packet including the signaling data and remaining PLPs deliver at least one link layer packet including the broadcast service data;
   a signaling encoding module for performing error correction encoding on physical layer parameters, wherein the physical layer parameters include information for identifying the PLP that delivers the at least one link layer packet including the signaling data and encoding information of the multiple PLPs;

a frame builder for building a signal frame that includes the error correction encoded data and the error correction encoded physical layer parameters; and a transmitting module for transmitting a broadcast signal that includes the built signal frame.

10. The broadcast transmitting apparatus according to claim 9, wherein each of the link layer packets consists of a header and a payload and wherein the header includes packet type information for indicating a packet type of input data before encapsulation into a corresponding link layer packet.

11. The broadcast transmitting apparatus according to claim 9, wherein the service list table further includes information to bootstrap service layer signaling information that includes information to discover and access at least one component of the broadcast service.

12. The broadcast transmitting apparatus according to claim 11, wherein the service layer signaling information is carried through a Layered Coding Transport (LCT) channel of a Real-time Object Delivery over Unidirectional Transport (ROUTE) session.

13. The broadcast transmitting apparatus according to claim 12, wherein the ROUTE session is identified based on at least one of source address information, destination address information and destination port information.

14. The broadcast transmitting apparatus according to claim 9, wherein the information for rapid channel scans and service acquisition includes service category information for indicating a type of the broadcast service and status information for indicating whether the broadcast service is hidden.

15. The broadcast transmitting apparatus according to claim 14, wherein, when emergency alert information is transmitted as an emergency alert service, the service category information indicates that the type of the broadcast service is the emergency alert service.

16. The broadcast transmitting apparatus according to claim 9, further comprising:

a bit interleaver for bit interleaving the error correction encoded data; and a time interleaver for time interleaving the bit-interleaved data.

* * * * *